(12) United States Patent
Muramatsu et al.

(10) Patent No.: US 8,306,331 B2
(45) Date of Patent: Nov. 6, 2012

(54) IMAGE PROCESSING APPARATUS AND METHOD, AND PROGRAM

(75) Inventors: Yasuhiro Muramatsu, Tokyo (JP); Akihito Masumura, Kanagawa (JP); Takuma Morita, Kanagawa (JP); Akihiko Urushihara, Tokyo (JP)

(73) Assignee: Sony Corporation, Tokyo (JP)

( * ) Notice: Subject to any disclaimer, the term of this patent is extended or adjusted under 35 U.S.C. 154(b) by 994 days.

(21) Appl. No.: 11/900,112

(22) Filed: Sep. 10, 2007

(65) Prior Publication Data

US 2008/0075338 A1    Mar. 27, 2008

(30) Foreign Application Priority Data

Sep. 11, 2006    (JP) .................... 2006-246175

(51) Int. Cl.
  *G06K 9/46* (2006.01)
  *G06K 9/00* (2006.01)
  *G06K 9/52* (2006.01)
  *G06K 9/62* (2006.01)

(52) U.S. Cl. ........ 382/190; 382/118; 382/195; 382/206; 382/224

(58) Field of Classification Search .................. 382/118, 382/224, 190, 195, 206
  See application file for complete search history.

(56) References Cited

U.S. PATENT DOCUMENTS

| | | | |
|---|---|---|---|
| 5,852,669 A * | 12/1998 | Eleftheriadis et al. | 382/118 |
| 6,035,074 A * | 3/2000 | Fujimoto et al. | 382/282 |
| 2003/0002715 A1 * | 1/2003 | Kowald | 382/118 |
| 2004/0008258 A1 | 1/2004 | Aas et al. | |
| 2004/0131235 A1 * | 7/2004 | Chen et al. | 382/115 |
| 2004/0196298 A1 | 10/2004 | Nagahashi et al. | |
| 2005/0102246 A1 | 5/2005 | Movellan et al. | |
| 2005/0213810 A1 | 9/2005 | Sabe et al. | |
| 2005/0220336 A1 | 10/2005 | Sabe et al. | |
| 2006/0064635 A1 * | 3/2006 | Reid et al. | 715/517 |
| 2006/0251292 A1 * | 11/2006 | Gokturk et al. | 382/103 |
| 2007/0147681 A1 * | 6/2007 | Van De Sluis | 382/190 |
| 2008/0019575 A1 * | 1/2008 | Scalise et al. | 382/118 |
| 2008/0166021 A1 | 7/2008 | Suito et al. | |
| 2009/0034805 A1 * | 2/2009 | Perlmutter et al. | 382/118 |

FOREIGN PATENT DOCUMENTS

JP    11-177802 A    7/1999

(Continued)

OTHER PUBLICATIONS

WO 02/052835, Cheatle, Stephen "Automated Cropping of Electronic Images", published Jul. 4, 2002.*

Primary Examiner — Anand Bhatnagar
Assistant Examiner — Soo Park
(74) Attorney, Agent, or Firm — Wolf, Greenfield & Sacks, P.C.

(57) ABSTRACT

An image processing apparatus includes a management unit configured to manage a template arranged to determine the placement of an image, a clipping unit configured to clip a part of a first image, and a placement unit configured to dispose a second image clipped from the first image by the clipping unit on the template, wherein the clipping unit clips the second image from the first image so as to include a region which maintains the aspect ratio of a region of the template where an image is disposed, and also includes the first image as much as possible.

8 Claims, 55 Drawing Sheets

FOREIGN PATENT DOCUMENTS

| | | |
|---|---|---|
| JP | 2000-295568 A | 10/2000 |
| JP | 2001-197289 A | 7/2001 |
| JP | 2001-211315 A | 8/2001 |
| JP | 2002-016792 A | 1/2002 |
| JP | 2002-354428 A | 12/2002 |
| JP | 2003-187257 A | 7/2003 |
| JP | 2003-242486 | 8/2003 |
| JP | 2004-062868 | 2/2004 |
| JP | 2004-178163 A | 6/2004 |
| JP | 2004-274428 A | 9/2004 |
| JP | 2004-312663 A | 11/2004 |
| JP | 2004-363656 A | 12/2004 |
| JP | 2005-044330 | 2/2005 |
| JP | 2005-107885 A | 4/2005 |
| JP | 2005-173471 A | 6/2005 |
| JP | 2005-175684 A | 6/2005 |
| JP | 2005-176230 A | 6/2005 |
| JP | 3690391 | 6/2005 |
| JP | 2005-267454 A | 9/2005 |
| JP | 2005-269563 | 9/2005 |
| JP | 3719247 | 9/2005 |
| JP | 2005-284348 | 10/2005 |
| JP | 2005-284487 | 10/2005 |
| JP | 2005-311888 A | 11/2005 |
| JP | 2005-332244 A | 12/2005 |
| JP | 2005-341412 A | 12/2005 |
| JP | 2006-072506 A | 3/2006 |
| JP | 2006-109119 A | 4/2006 |
| JP | 2006-237919 A | 9/2006 |

* cited by examiner

FIG. 26
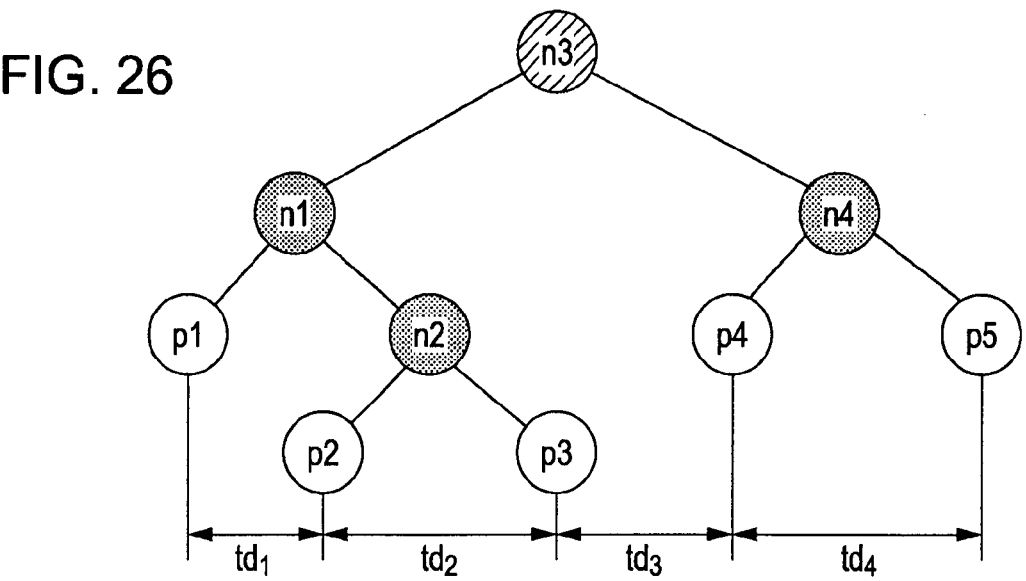
FIG. 27
HIGHER THRESHOLD → GRAIN SIZE BECOMES COARSE
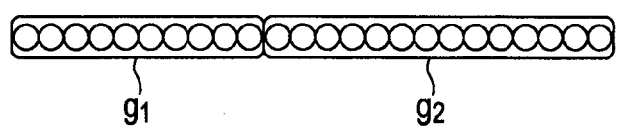
LOWER THRESHOLD → GRAIN SIZE BECOMES FINE
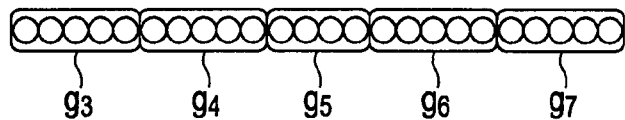

GROUP A DIVISION FLAGS

EVENT CLUSTERS A

GROUP B DIVISION FLAGS

SUB-EVENT CLUSTERS B

NESTING RELATION BETWEEN EVENT CLUSTERS A AND SUB-EVENT CLUSTERS B

FIG. 35

GROUP 1 { MARCH 1    0:10 \
                            0:12 \
                            0:13 } 3 PHOTOS

GROUP 2 { MARCH 2    10:20 \
                            13:10 } 2 PHOTOS

GROUP 3 { MARCH 3    3:03 \
                            3:43 \
                            4:03 } 3 PHOTOS

GROUP 4 {                19:30 \
                            19:32 } 2 PHOTOS

GROUP 5 { MARCH 4    3:00 \
                            4:00 \
                            4:01 \
                            4:03 \
                            4:05 } 5 PHOTOS

GROUP 6 { MARCH 5    23:59 \
                            0:00 \
                            0:00 \
                            0:00 \
                            0:01 } 5 PHOTOS

FIG. 40

GROUP 1 { MARCH 1   0:10 / 0:12 / 0:13 } 3 PHOTOS ⟶ PLACEMENT TEMPLATE 231

GROUP 2 { MARCH 2   10:20 / 13:10 } 2 PHOTOS

GROUP 3 { MARCH 3   3:03 / 3:43 / 4:03 } 3 PHOTOS ⟶ PLACEMENT TEMPLATE 232

GROUP 4 { 19:30 / 19:32 } 2 PHOTOS

GROUP 5 { MARCH 4   3:00 / 4:00 / 4:01 / 4:03 / 4:05 } 5 PHOTOS ⟶ PLACEMENT TEMPLATE 235

GROUP 6 { MARCH 5   23:59 / 0:00 / 0:00 / 0:00 / 0:01 } 5 PHOTOS ⟶ PLACEMENT TEMPLATE 234

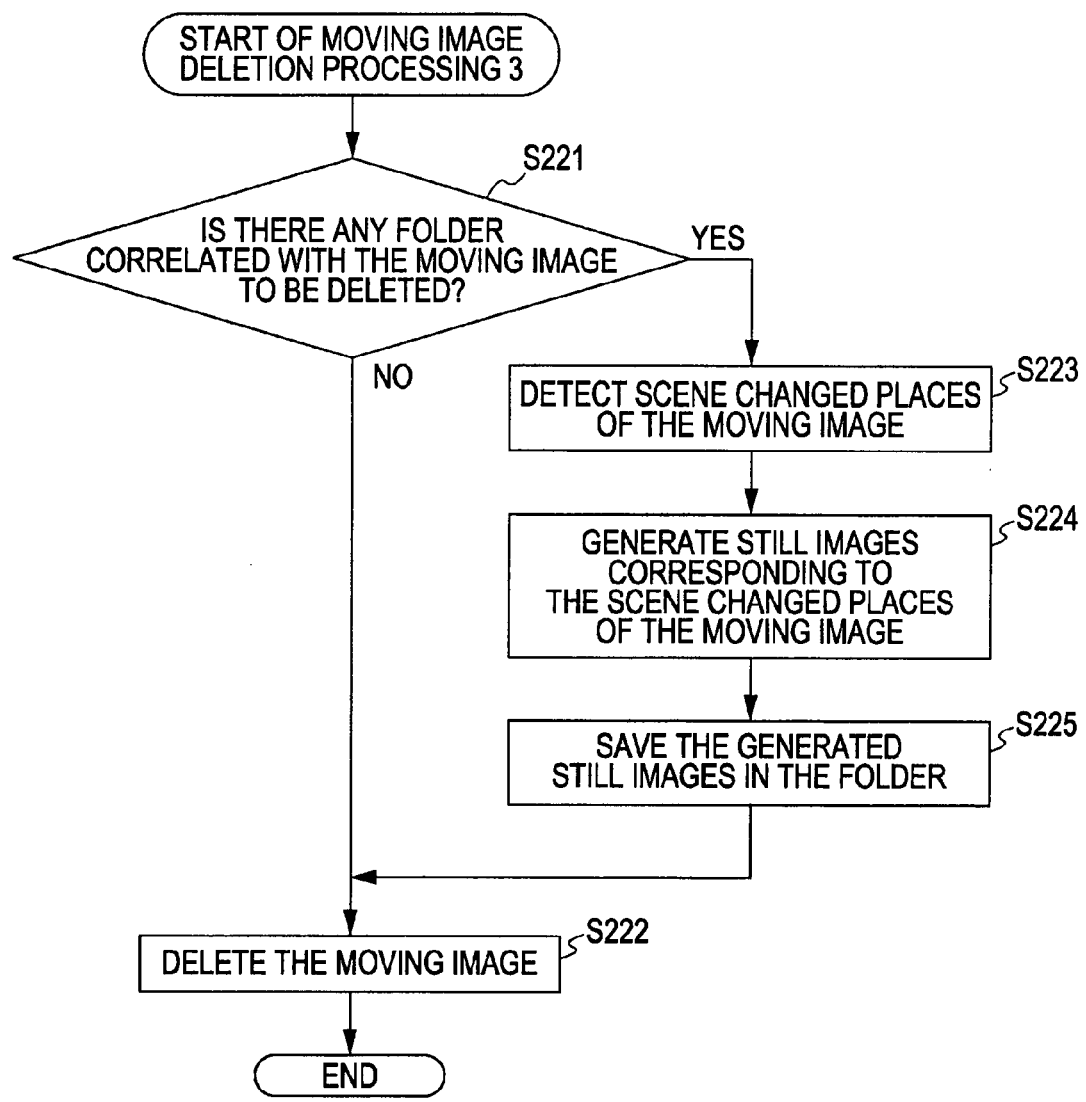

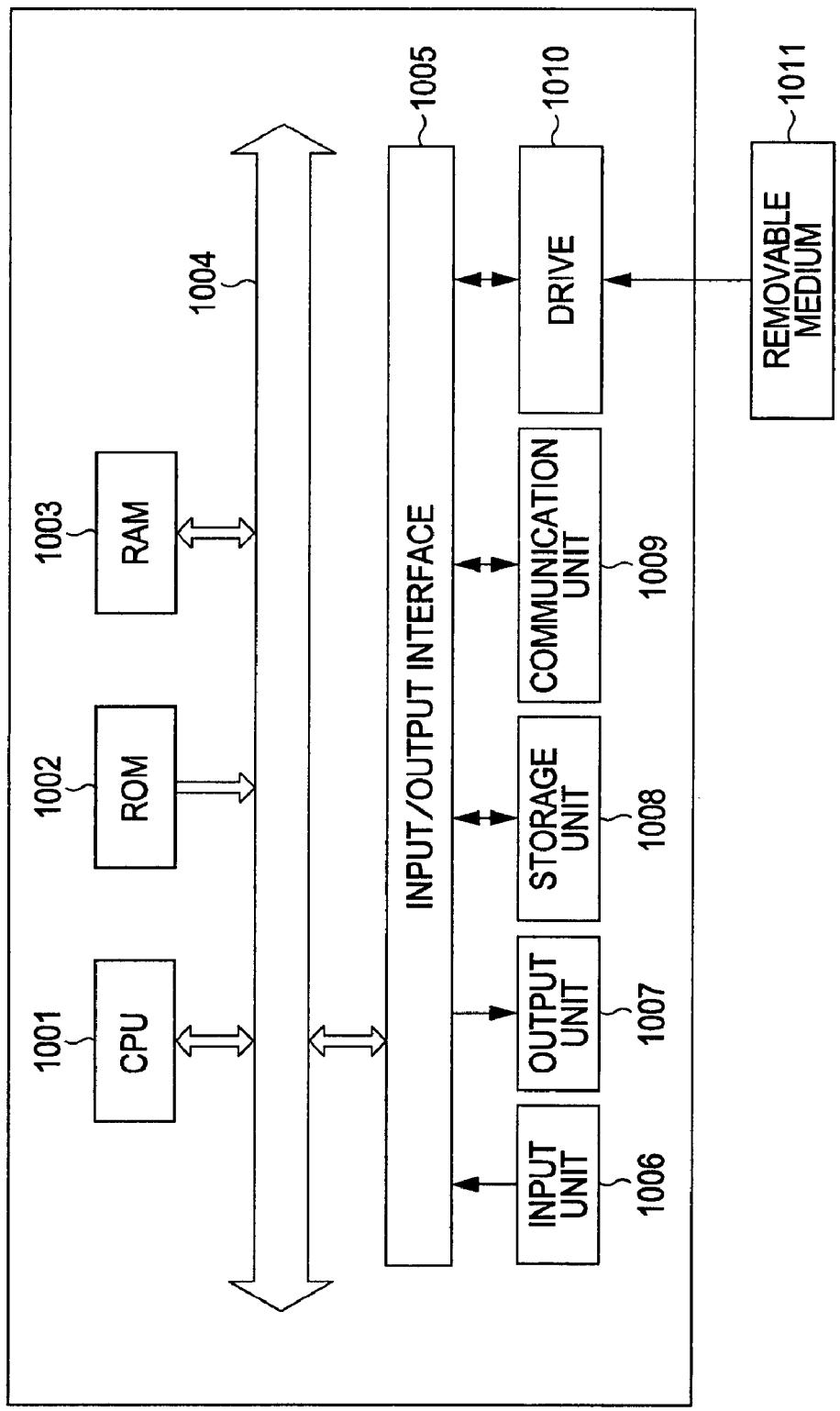

IMAGE PROCESSING APPARATUS AND METHOD, AND PROGRAM

CROSS REFERENCES TO RELATED APPLICATIONS

The present invention contains subject matter related to Japanese Patent Application JP 2006-246175 filed in the Japanese Patent Office on Sep. 11, 2006, the entire contents of which are incorporated herein by reference.

BACKGROUND OF THE INVENTION

1. Field of the Invention

The present invention relates to an image processing apparatus and method, and a program, and particularly relates to an image processing apparatus and method, and a program, whereby an album, where images appropriately clipped such as a human face are appropriately disposed, can be created.

2. Description of the Related Art

Digital cameras and so forth have come into widespread use, and images photographed by a digital camera can be casually observed with a personal computer or the like.

Cameras such as so-called film cameras were commonly employed before digital cameras came into widespread use. The images (photographs) photographed with a film camera have been commonly observed in a state of being printed on predetermined paper. Those photographs have been sometimes managed in a format called an album or the like in a state of being adhered to a mount.

An album employed when observing images photographed with such a film camera has been being proposed for observing images photographed with a digital camera as well. An album whereby images photographed with a digital camera are observed sometimes referred to as an electronic album or the like.

An electronic album can be observed with the display of a personal computer, a television receiver, or the like. Also, an electronic album is commonly made up of multiple pages, and includes an indication form such that the following page will be displayed if a page is turned over, so as to handle the electronic album with the same feeling as that in an album made up of a paper medium. A user can enjoy an electronic album with the same feeling as that in an album made up of a paper medium.

An album made up of a paper medium is created by the user pasting photographs on a mount by himself/herself. In the event of an electronic album, images are pasted on a screen which images a page displayed on a display by the user performing a predetermined operation, whereby an album can be created, but also a proposal has been made wherein images are disposed within a page without necessitating involvement of the user in creating of an album. Further, a proposal has been made wherein some sort of processing is performed to paste appropriate images on a page when creating an album or the like. Such known arrangements are disclosed in, e.g., Japanese Patent No. 3,390,391 and Japanese Unexamined Patent Application Publication No. 2005-269563.

SUMMARY OF THE INVENTION

In the event of creating an electronic album without necessitating involvement of a user, some sort of processing is sometimes performed to paste appropriate images on a page, but it is desirable to perform processing in a form reflecting the intentions of the photographer.

It has been found desirable to enable processing to be performed when subjecting an image to processing, so as to reflect the intention of the photographer who photographed the image.

An image processing apparatus according to an embodiment of the present invention includes a management unit configured to manage a template arranged to determine the placement of an image, a clipping unit configured to clip a part of a first image, and a placement unit configured to dispose a second image clipped from the first image by the clipping unit on the template, wherein the clipping unit clips the second image from the first image so as to include a region which maintains the aspect ratio of a region of the template where an image is disposed, and also includes the first image as much as possible.

The image processing apparatus may further include a detecting unit configured to detect a region which is determined as a face from the first image, wherein the clipping unit clips the second image from a region including the region determined as the face detected by the detecting unit.

In the event that a plurality of regions determined to be a face by the detecting unit are detected, the clipping unit may clip the second image from a region including a face having the maximum region.

In the event that a plurality of regions determined to be a face by the detecting unit are detected, the clipping unit may clip the second image from a region including those regions to the utmost.

In the event that a plurality of regions determined to be a face by the detecting unit are detected, the clipping unit may clip the second image from a region including a region having the highest probability as a face.

The detecting unit may further detect the features of a face included in the first image, with the clipping unit clipping the second image from a region including a face of which the features satisfy a specific condition.

An image processing method according to an embodiment of the present invention includes the steps of managing a template arranged to determine the placement of an image, clipping a part of a first image, and disposing a second image clipped from the first image by the processing in the managing step, wherein in the clipping step the second image is clipped from the first image so as to include a region which maintains the aspect ratio of a region of the template where an image is disposed, and also includes the first image as much as possible.

A program according to an embodiment of the present invention causing a computer to execute processing includes the steps of managing a template arranged to determine the placement of an image, clipping a part of a first image, and disposing a second image clipped from the first image by the processing in the managing step, wherein in the clipping step the second image is clipped from the first image so as to include a region which maintains the aspect ratio of a region of the template where an image is disposed, and also includes the first image as much as possible.

With an image processing apparatus and method, and a program according to an embodiment of the present invention, a template arranged to determine the position of an image is managed, and the second image is clipped from the first image so as to include a region which maintains the aspect ratio of a region of the template where an image is disposed, and also includes the first image as much as possible.

According to an embodiment of the present invention, when clipping an image, clipping can be performed in a state maintaining the aspect ratio set as a region to be clipped, and also so as to include an original image as much as possible, whereby clipping of an image can be performed in a form reflecting an intention of a photographer.

BRIEF DESCRIPTION OF THE DRAWINGS

FIG. 26 is a diagram describing clustering based on grouping conditions;

FIG. 27 is a diagram illustrating examples of grain sizes of clusters;

FIG. 35 is a diagram describing the processing result of clustering;

FIG. 40 is a diagram illustrating specific examples of a relation between a photographing interval and a placement template;

FIG. 66 is a flowchart describing processing relating to deletion of a moving image; and FIG. 67 is a diagram describing a recording medium.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

Figure 54:
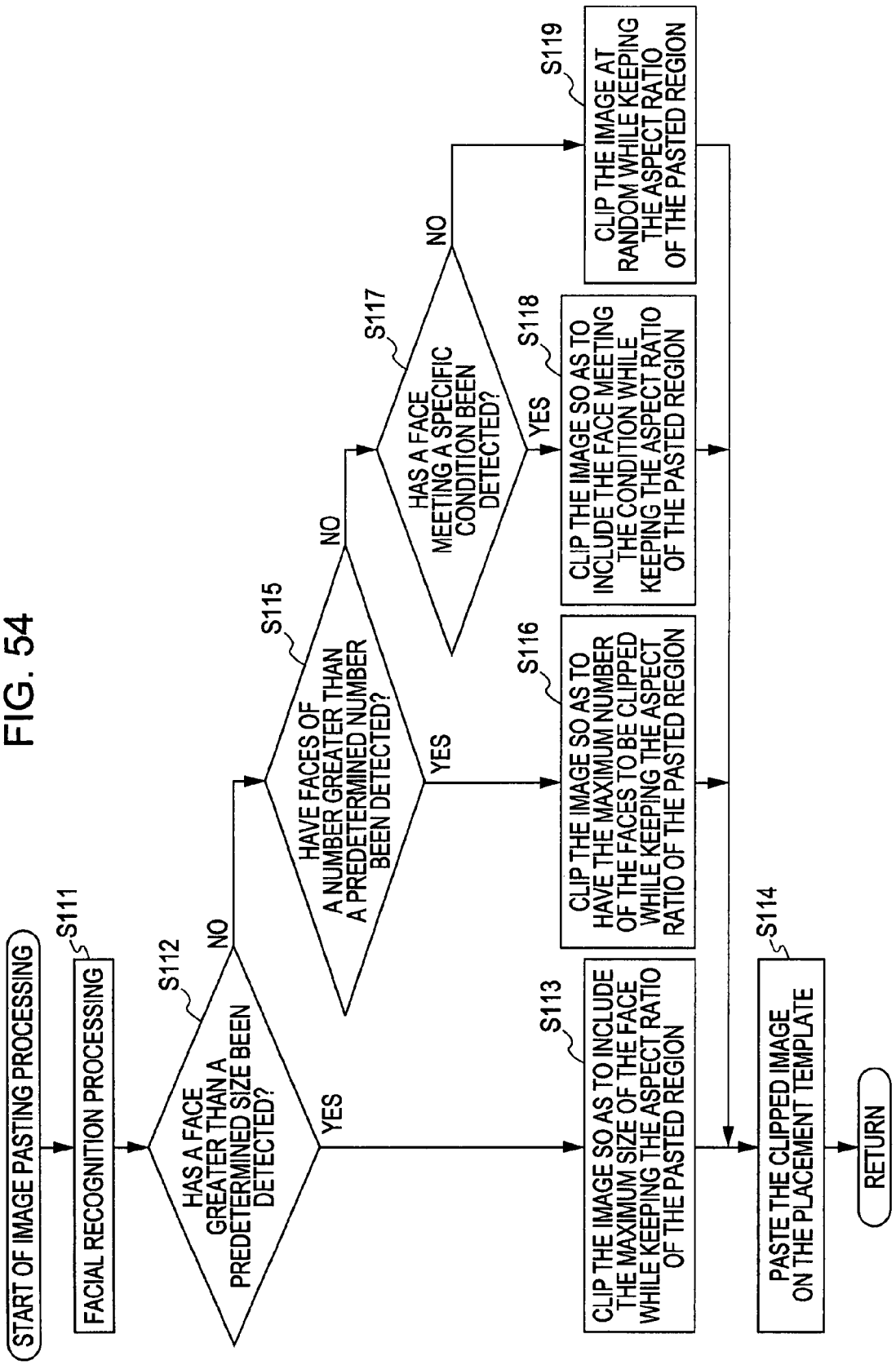
FIG. 54 is a flowchart describing image clipping processing.

An image processing apparatus according to an embodiment of the present invention (e.g., image processing apparatus 1 shown in FIG. 1) includes management means configured to manage a template arranged to determine the placement of an image (e.g., template DB 33 shown in FIG. 2), clipping means configured to clip a part of a first image (e.g., steps S113, S116, S118, and S119 shown in FIG. 54), and placement means configured to dispose a second image clipped from the first image by the clipping means (e.g., step S114 shown in FIG. 54).

Figure 1:
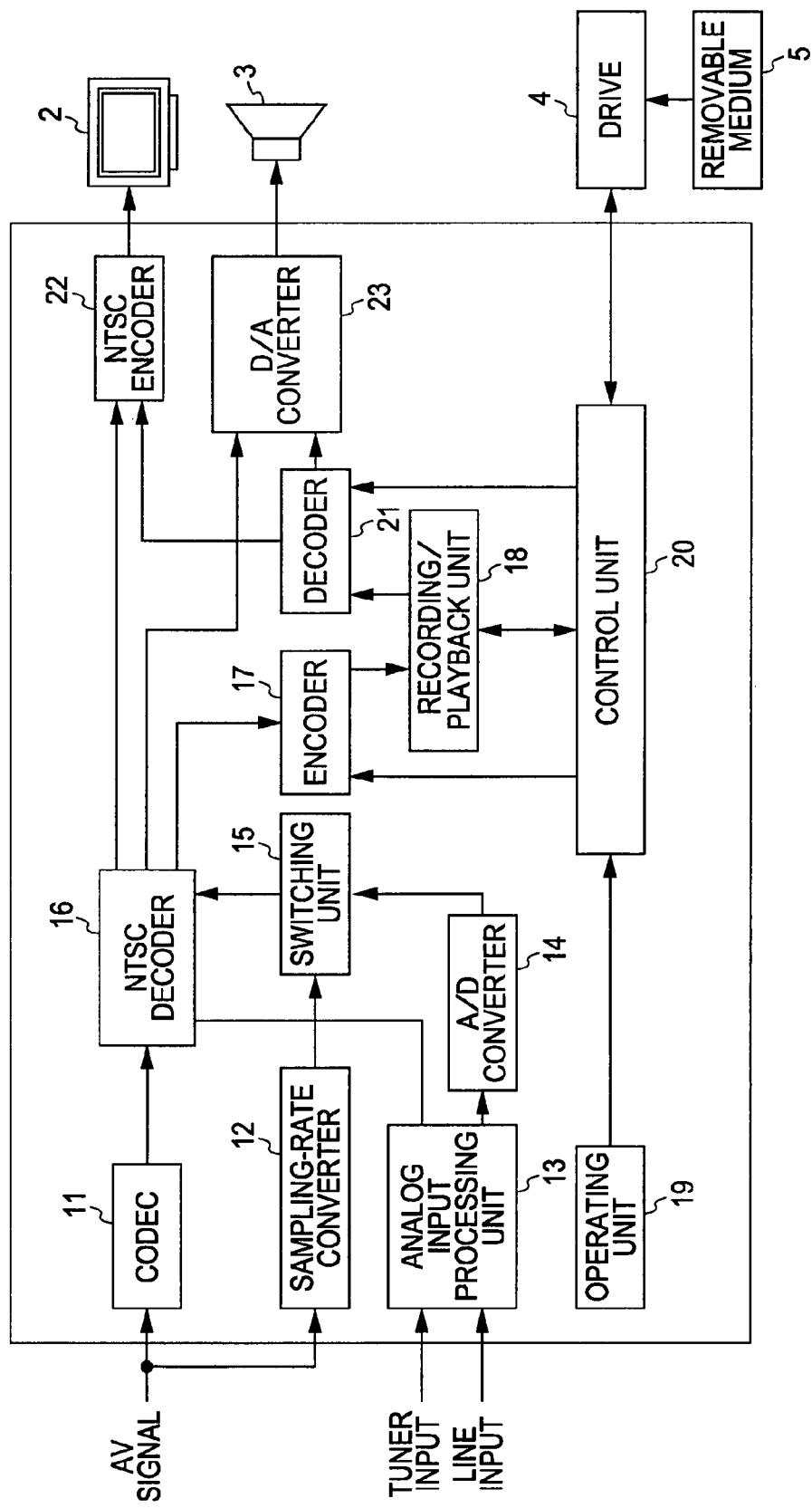
FIG. 1 is a diagram of the configuration of an image processing apparatus according to an embodiment of the present invention.

Description will be made below regarding embodiments of the present invention with reference to the drawings.
Configuration of Image Processing Apparatus FIG. 1 is a diagram illustrating the configuration of the image processing apparatus according to an embodiment of the present invention. The image processing apparatus 1 is an HDD (Hard Disc) recorder or the like.

The image processing apparatus 1 shown in FIG. 1 records or plays a picture signal or audio signal which is input as the AV (Audio Video) signal supplied from an unshown external apparatus, or as the analog signal supplied from an unshown analog tuner or unshown line tuner. The image processing apparatus 1 outputs the played picture signal to a monitor 2 connected to the outside. Also, the image processing apparatus 1 outputs the played audio signal to speakers 3 connected to the outside.

Examples of external apparatuses which supply AV signals include, for example, an external apparatus connected via i.LINK®, a digital BS (Broadcasting Satellite) tuner, a digital CS (Communications Satellite) tuner, a digital video camera, a digital still camera, and a scanner.

A drive 4 is connected to the image processing apparatus 1 as necessary. Mounted on the drive 4 is a removable medium 5 such as a magnetic disk (including a flexible disk), an optical disc (including CD-ROM (Compact Disc-Read Only Memory), DVD (Digital Versatile Disc), a magneto-optical disc), semiconductor memory, or the like, as necessary, thereby sending or receiving data.

The image processing apparatus 1 shown in FIG. 1 includes a codec 11, a sampling-rate converter 12, an analog input processing unit 13, an A/D converter 14, a switching unit 15, an NTSC (National Television System Committee) decoder 16, an encoder 17, a recording/playback unit 18, an operating unit 19, a control unit 20, a decoder 21, an NTSC encoder 22, and a D/A converter 23.

The codec 11 expands the compression of the digital video signal of the AV signal supplied from an unshown external apparatus, and supplies this to the NTSC decoder 12.

The sampling-rate converter 12 converts the sampling rate of the digital audio signal of the AV signal supplied from the unshown external apparatus into a different sampling rate. The sampling-rate converter 12 supplies the converted digital audio signal to the switching unit 15.

The analog input processing unit 13 selects one of the analog signal supplied from an unshown analog tuner or the analog signal supplied from an unshown line tuner based on a signal indicating an operation from a user at the operating unit 19, which is supplied from the control unit 20. The analog input processing unit 13 supplies an analog video signal of the selected analog signal to the NTSC decoder 16. Also, the analog input processing unit 13 supplies an analog audio signal of the selected analog signal to the A/D converter 14.

The A/D converter 14 subjects the analog audio signal supplied from the analog input processing unit 13 to analog-to-digital conversion. The A/D converter 14 supplies the digital audio signal, which is the result of the analog-to-digital conversion, to the switching unit 15.

The switching unit 15 selects one of the digital audio signal supplied from the sampling-rate converter 12 or the digital audio signal supplied from the A/D converter 14 based on a signal indicating an operation from the user at the operating unit 19, which is supplied from the control unit 20. The switching unit 15 supplies the selected digital audio signal to the NTSC decoder 16.

The NTSC decoder 16 converts the digital video signal supplied from the codec 11 or the analog video signal input from the analog input processing unit 13 into a digital video signal conforming to NTSC. The NTSC decoder 16 synthesizes the converted digital video signal conformed to the NTSC method and the digital audio signal supplied from the switching unit 15.

In the event of recording a picture signal and an audio signal which are input to the image processing apparatus 1, the NTSC decoder 16 supplies the digital AV signal which is the synthesized signal to the encoder 17. On the other hand, in the event of not recording but playing a picture signal and an audio signal which are input to the image processing apparatus 1 as they are, the NTSC decoder 16 supplies the digital AV signal which is the synthesized signal to the later-described NTSC encoder 22 and D/A converter 23.

The encoder 17 subjects the digital AV signal supplied from the NTSC decoder 16 to encoding processing conformed to a predetermined method such as the MPEG (Moving Picture Experts Group) method or the like, for example. The encoder 17 supplies the compressed and encoded signal data which is the result of encoding processing to the recording/playback unit 18

The recording/playback unit 18 is made up of a hard disk (HDD), an optical disc, or the like, for example. The recording/playback unit 18 records the signal data supplied from the encoder 17. Also, the recording/playback unit 18 supplies the recorded signal data to the decoder 21. That is to say, the recording/playback unit 18 plays the recorded signal data.

The operating unit 19 is made up of, for example, various types of operating buttons, keys, a touch panel or the like. The user operates the operating unit 19 to input an instruction as to the image processing apparatus 1. The operating unit 19 supplies a signal indicating an operation of the user to the control unit 20 in response to the operation from the user.

The control unit 20 is configured, for example, to include a microprocessor, and controls each unit within the image processing apparatus 1 based on a signal indicating an operation of the user, supplied from the operating unit 19.

The decoder 21 subjects the signal data supplied from the recording/playback unit 18 to decoding processing conformed to the method corresponding to the MPEG method or the like, for example. The decoder 21 supplies the digital video signal of the expanded and decoded digital AV signal which is the result of the processing to the NTSC encoder 22. Also, the decoder 21 supplies the digital audio signal of the expanded and decoded digital AV signal, which is the result of the processing, to the D/A converter 23.

The NTSC encoder 22 converts the digital video signal supplied from the decoder 21 into a video signal conformed to the NTSC method. The NTSC encoder 22 supplies the converted video signal to the monitor 2.

The D/A converter 23 subjects the digital audio signal supplied from the decoder 21 to digital-to-analog conversion. The D/A converter 23 supplies the audio signal which is the result of the conversion to the speakers 3.

According to such a configuration, a picture signal and an audio signal which are input to the image processing apparatus 1 can be recorded or played. Also, the image processing apparatus 1 can play the picture signal and audio signal recorded in the recording/playback unit 18.

The image processing apparatus 1 includes a function to input, record, or play the signal (data) of a still image other than a picture signal. That is to say, the image processing apparatus 1 according to the present embodiment is an apparatus capable of handling a moving image and a still image, and for example, the encoder 17 and the decoder 21 are configured to support a method suitable for a moving image and a method suitable for a still image.

Also, with the configuration example shown in FIG. 1, the configuration wherein a picture signal is processed is principally illustrated, but with the same configuration, an arrangement may be made wherein the image data of a still image can be processed, or for example, an arrangement may be made wherein still image data is directly recorded in the recording/playback unit 18, i.e., the configuration shown in FIG. 1 can be modified as appropriate.

Figure 2:
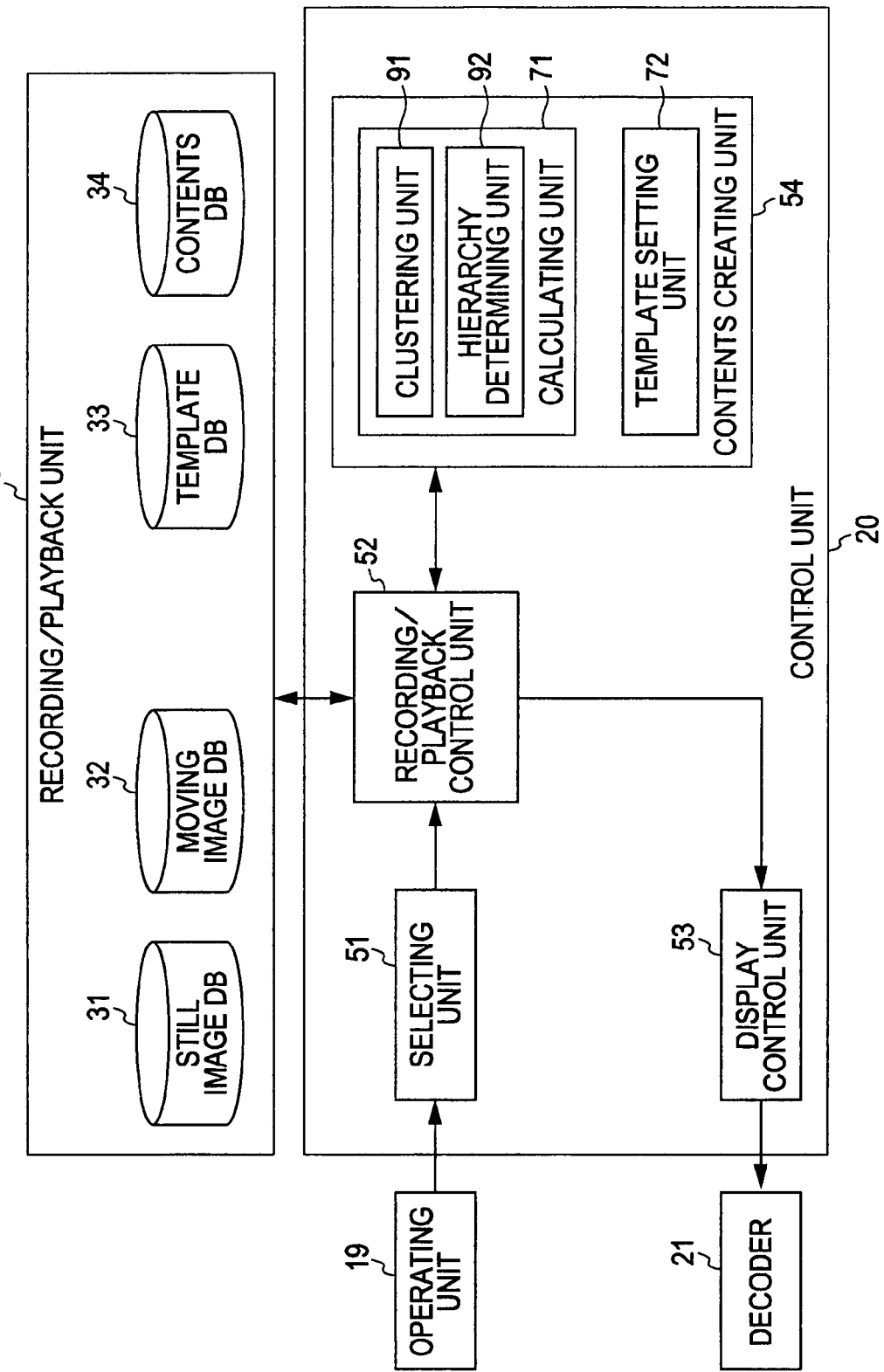
FIG. 2 is a block diagram illustrating configuration examples of a recording/playback unit and a control unit of the image processing apparatus.

FIG. 2 is a diagram illustrating configuration examples of the recording/playback unit 18 and the control unit 20 of the image processing apparatus 1 shown in FIG. 1.

The recording/playback unit 18 is configured to include a still image database 31, a moving image database 32, a template database 33, and a contents database 34. Hereafter, the still image database 31 will be referred to as the still image DB 31, the moving image database 32 will be referred to as the moving image DB 32, the template database 33 will be referred to as the template DB 33, and the contents database 34 will be referred to as the contents DB 34.

The still image DB 31 records the still image data which is the data of the still image supplied from an external apparatus, or the still image data of a still image (the thumbnail data of a thumbnail image) extracted from a moving image as described later. The moving image DB 32 stores the moving image data which is the data of the moving image supplied from the encoder 17 shown in FIG. 1. Let us say that with the following description, for example, an expression such as "an image recorded in the still image DB 31" will be used, but this term "image" is an expression including the meaning of "image data".

In the event of displaying an album which is a content to be recorded in the contents DB 34, the template DB 33 stores a background template which is the data of a background image serving as the background of an image to be disposed on the album, and a placement template which is information to set the placement of an image on the album.

The contents DB 34 records the data of an album. While description will be made later regarding the details of an album, an album is made up of pages where still images are pasted, whereby a user can handle this album with the same feeling as that in an album made up of a paper medium, so this album is sometimes referred to as an "electronic album" or the like.

The control unit 20 is configured to include a selecting unit 51, a recording/playback control unit 52, a display control unit 53, and a contents creating unit 54.

The selecting unit 51 generates information indicating the content to be operated by the user based on the signal indicating an operation of the user which is supplied from the operating unit 19, and supplies this to the recording/playback control unit 52.

For example, the selecting unit 51 generates information indicating the album selected by the user based on the signal indicating an operation of the user to select an album to be displayed on the monitor 2 or the like, which is supplied from the operating unit 19, and supplies this to the recording/playback control unit 52.

Also, for example, the selecting unit 51 generates information indicating a predetermined folder to be selected by the user based on the signal indicating an operation of the user to select a predetermined folder where images are saved, which is supplied from the operating unit 19, and supplies this to the recording/playback control unit 52.

The recording/playback control unit 52 controls recording or playback performed by the recording/playback unit 18. Also, the recording/playback control unit 52 reads out image data, a background template, a placement template, or album data, from the recording/playback unit 18.

For example, the recording/playback control unit 52 reads out image data stored in a predetermined folder from the still image DB 31 or moving image DB 32 based on information indicating a predetermined folder to be selected by the user, which is supplied from the selecting unit 51.

Also, the recording/playback control unit 52 supplies the readout image data, background template, placement template, or album data to the contents creating unit 54. Also, the recording/playback control unit 52 supplies contents (album data) created by the contents creating unit 54 to the contents DB 34, and controls the contents DB 34 to store the contents.

The display control unit 53 controls the decoding processing of the decoder 21 based on the image data, background template, placement template, or album data read out by the recording/playback control unit 52.

The contents creating unit 54 creates contents employing the image data supplied from the recording/playback unit 18 under the control of the recording/playback control unit 52. The contents creating unit 54 is configured of a calculating unit 71 and a template setting unit 72.

The calculating unit 71 classifies multiple images into groups (clustering) based on the data accompanying the image supplied from the recording/playback control unit 52. The calculating unit 71 is configured of a clustering unit 91 and a hierarchy determining unit 92.

The clustering unit 91, based on the data accompanying the image supplied from the recording/playback control unit 52, subjects the image to clustering. The hierarchy determining unit 92 determines the hierarchy of a cluster which is the clustering result of the clustering unit 91.

The template setting unit 72 gives an instruction to the recording/playback control unit 52 for reading out a background template and a placement template from the template DB 33, sets the background template and placement template that have been read out to the generated cluster.

Also, the contents creating unit 54 records an album to which a background template and placement templates are set in the contents DB 34 of the recording/playback unit 18 via the recording/playback control unit 52.

Description will be made regarding the operations of the image processing apparatus 1 having such a configuration. In the following descriptions, the operations of the image processing apparatus 1 when creating an album will be described as an example.

Creation of Album (Contents)

Description will be added regarding the outline of processing relating to creation of an album with reference to the flowchart shown in FIG. 3, and subsequently, description will be made regarding the details of the processing of each step with reference to other drawings.

In step S11, image data is read out. The recording/playback control unit 52 reads out image data from the still image DB 31. In this step S11, not image data itself but the data accompanying the image data necessary for clustering processing performed in step S12 is read out. An example of the data accompanying image data is an EXIF (Exchangeable Image File Format) tag.

A timing wherein image data is read out, i.e., in this case, there are timings such as shown in the following as a timing wherein an album is created.

A timing 1 is when an instruction is given by the user. When attempting to create an album, the user gives an instruction of creating an album by operating the operating unit 19. Even in the event of the user giving an instruction, for example, an arrangement may be made wherein an album is created at a timing when the user gives an instruction of creating an album, or an arrangement may be made wherein an album is created when the user gives an instruction of playing an album, and is played.

A timing 2 is when a folder which manages still images is newly created. When a folder is created, an album is created as to images managed with the folder thereof.

A timing 3 is when a new image is added to an already created folder. In the event of a new image being added to an existing folder, an album including the new image thereof is created. In other words, the existing album is reedited into an album including the new image.

The timings 1 through 3 are timing examples, and are not restrictive. Accordingly, an arrangement may be made wherein the creation of an album (processing in step S11) is started at timing other than the timings 1 through 3. Also, this timing is not restricted to single timing, and rather a combination of the timings 1 through 3 and other timings may be employed.

Upon the information necessary for the clustering processing which is accompanied with image data being read out in step S11, the clustering processing is started in step S12. The details of the clustering processing will be described later. The clustering processing is executed, whereby multiple images are classified into multiple groups. Also, when one group is observed, clustering is performed so as to have some sort of correlation among the images within the observed group. Here, some sort of correlation is a temporal correlation, as described below.

Upon clustering being performed in step S12, a background template is read out in step S13 based on the processing result. Also, in step S14, a placement template is read out.

Now, description will be further made regarding a background template and a placement template.

Figure 4:
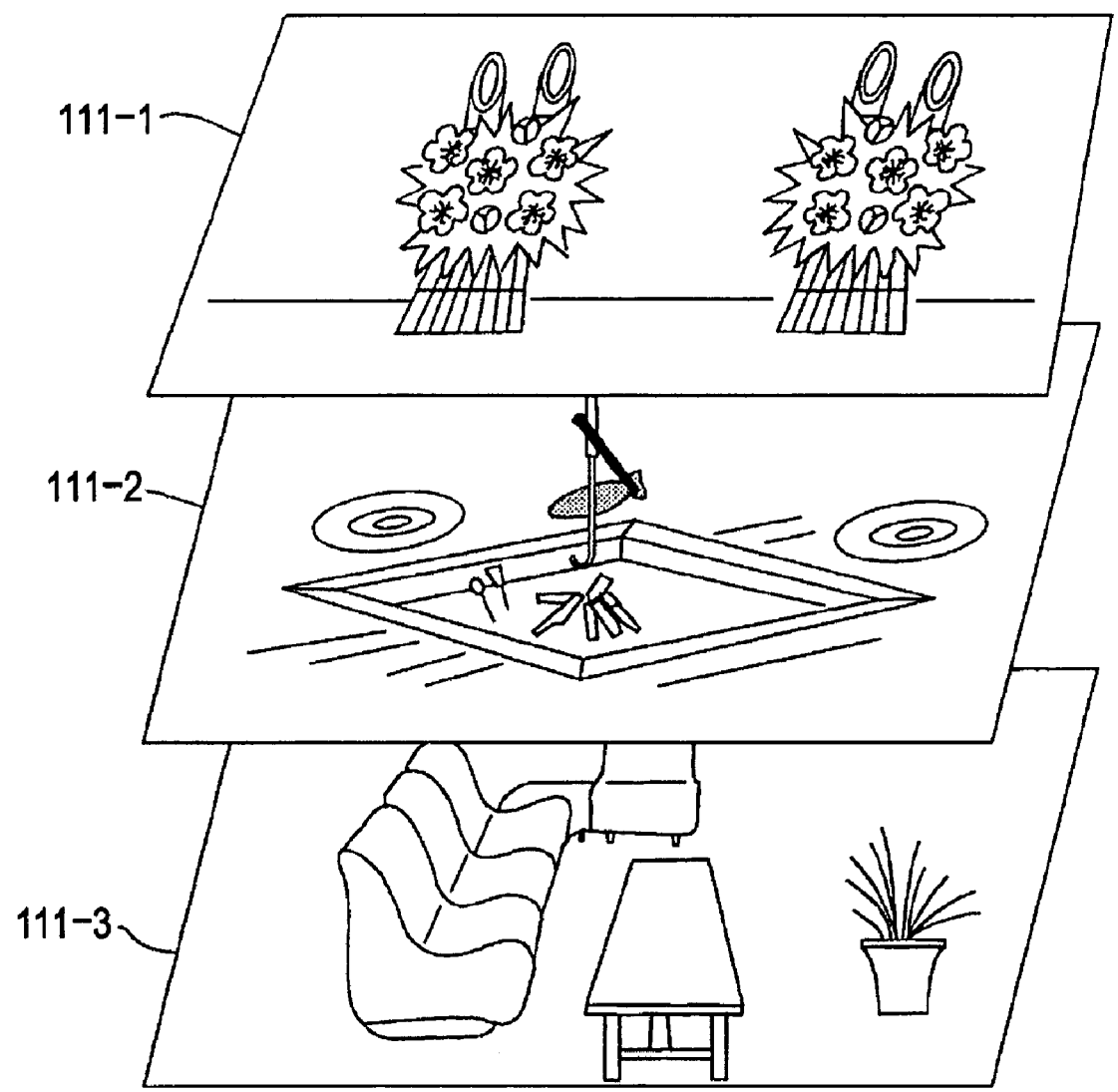
FIG. 4 is a diagram illustrating an example of a background template.

FIG. 4 is a diagram illustrating a configuration example of a background template. Each of background templates 111-1 through 111-3 shown in FIG. 4 includes a different picture, and includes accompanying information. In the following descriptions, in the event that there is no need to distinguish each of the background templates 111-1 through 111-3, these will be simply referred to a background template 111. The same description will be made regarding later-described placement templates.

For example, in the event that each of the background templates 111-1 through 111-3 includes information relating to date and time as accompanied information, and an image is subjected to clustering based on the photographed date and time, the background template 111 wherein the date and time information of the image subjected to clustering is identical to the date and time information accompanying the background templates 111-1 through 111-3 is selected and set by the template setting unit 72.

For example, in the event that the background template 111-1 includes date and time information such as "January 1", and the photographed date and time of a predetermined image is near January 1, the background template 111-1 is set to the image thereof.

Also, in the event that the background template 111 includes information relating to an event, and an image is subjected to clustering with an event (e.g., in the event of clustering based on an event name (title) given by a user), the background template wherein the event information of the image subjected to clustering is identical to the event information accompanying the background template 111 is set by the template setting unit 72.

For example, in the event that the background template 111-1 includes event information such as "New Year", and New Year is appended to a predetermined image as an event name, the background template 111-1 is set to the image thereof.

The background template 111 is not restricted to the background templates 111-1 through 111-3 shown in FIG. 4, and three or more background templates are stored in the template DB 33, which are set by the template setting unit 72 as appropriate. Also, for example, such as the background template 111-1 shown in FIG. 4, the background template 111 of white color alone for example is also stored in the template DB 33 as the background template 111 as well as the background template 111 wherein a picture is drawn, which becomes an object to be set by the template setting unit 72.

FIGS. 5 through 9 are diagrams illustrating examples of the placement templates stored in the template DB 33. Each placement template is a template employed when a predetermined number of images are disposed, and multiple templates are prepared for each of the number of images to be disposed. Now, when expressing multiple templates arranged to dispose a predetermined number of images, e.g., one image collectively, these are referred to as a placement template group.

Placement templates 131-1 through 131-3, placement templates 132-1 through 132-3, placement templates 133-1 through 133-3, placement templates 134-1 through 134-3, and placement templates 135-1 through 135-3 included in each placement template group shown in FIGS. 5 through 9 each have accompanied information. An example of the accompanied information is information relating to date and time or an event, as with the background template 111.

Figure 5:
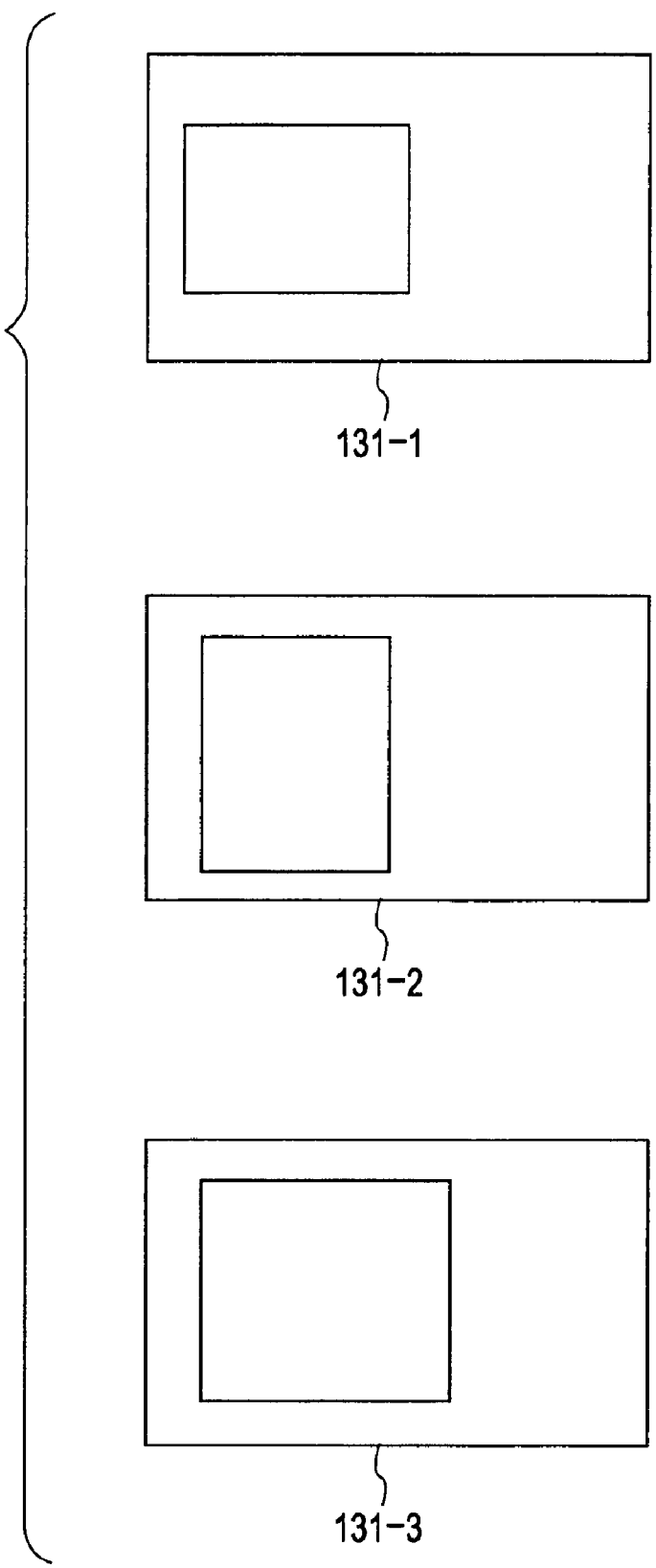
FIG. 5 is a diagram illustrating an example of a placement template.

The placement template group including the three templates of the placement templates 131-1 through 131-3 shown in FIG. 5 is a placement template 131 when one image is disposed on one page. The placement templates 131-1 through 131-3 are common in that one image is disposed, but are templates of which the position and size of the one image thereof are set differently within a page.

Figure 6:
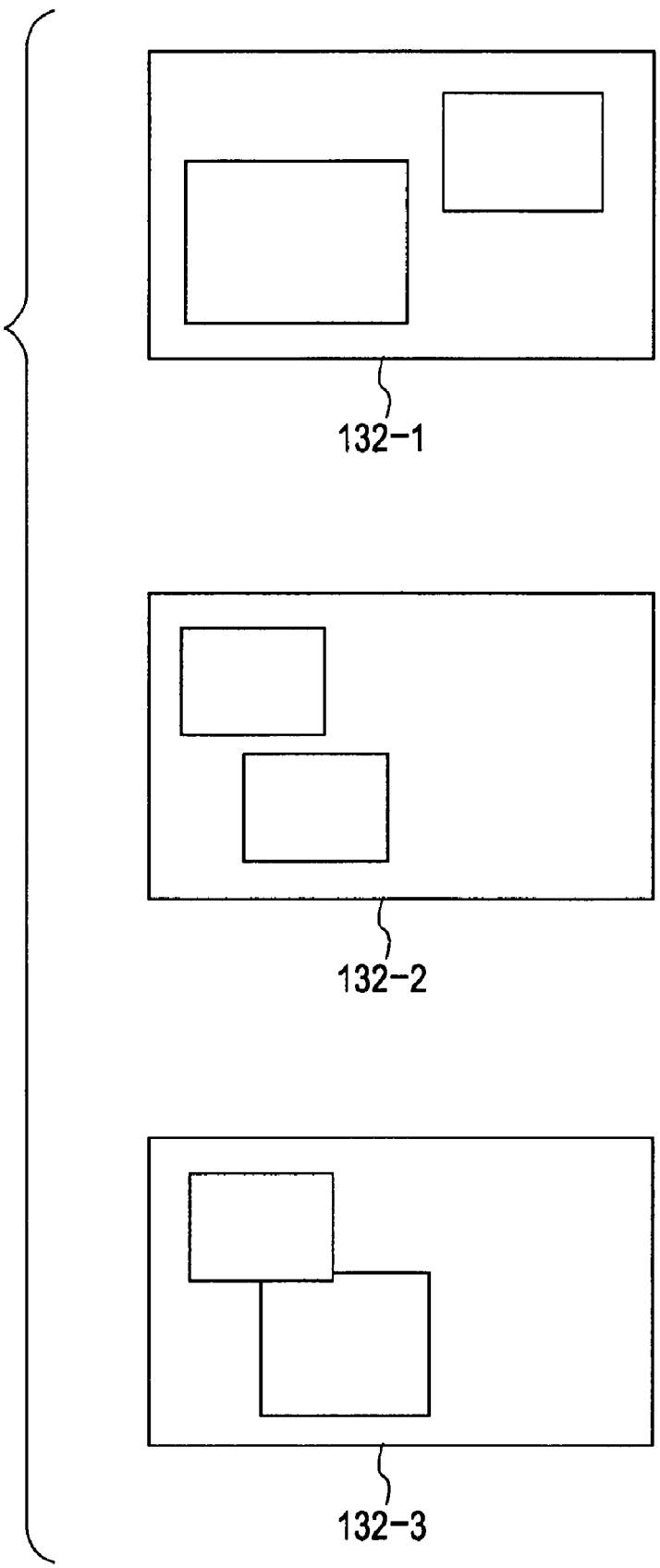
FIG. 6 is a diagram illustrating an example of a placement template.

The placement template group including the three templates of the placement templates 132-1 through 132-3 shown in FIG. 6 is a placement template 132 when two images are disposed on one page. The placement templates 132-1 through 132-3 are common in that two images are disposed, but are templates of which the position and size of each of the two images thereof are set differently within a page.

Figure 7:
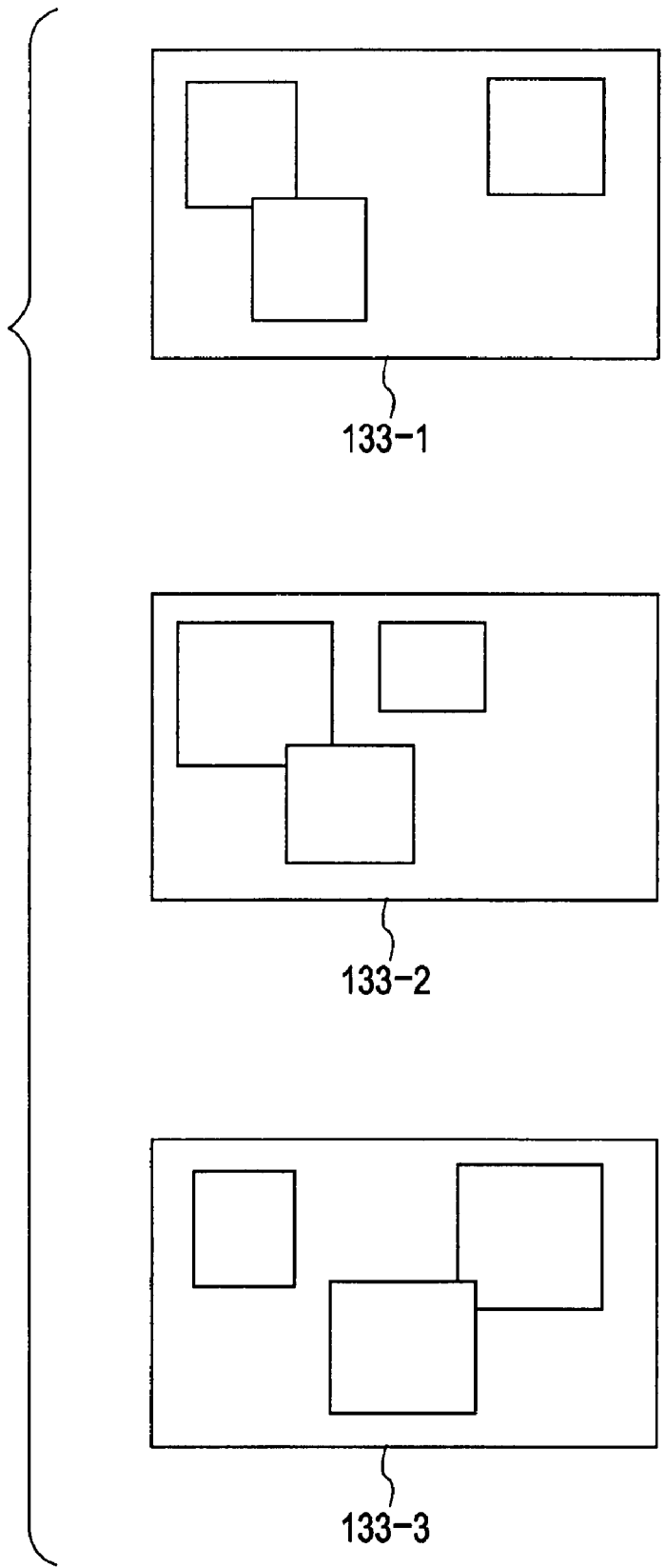
FIG. 7 is a diagram illustrating an example of a placement template.

The placement template group including the three templates of the placement templates 133-1 through 133-3 shown in FIG. 7 is a placement template 133 when three images are disposed on one page. The placement templates 133-1 through 133-3 are common in that three images are disposed, but are templates of which the position and size of each of the three images thereof are set differently within a page.

Figure 8:
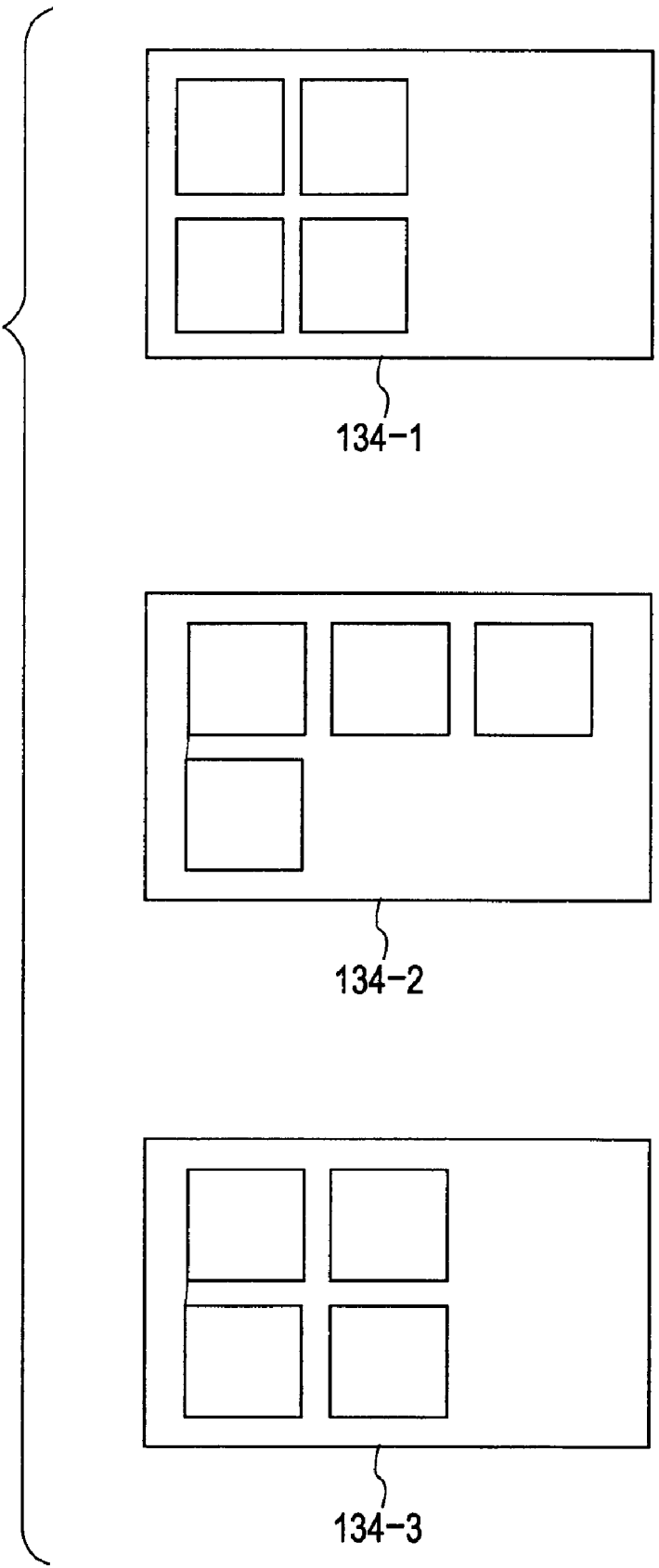
FIG. 8 is a diagram illustrating an example of a placement template.

The placement template group including the three templates of the placement templates 134-1 through 134-3 shown in FIG. 8 is a placement template 134 when four images are disposed on one page. The placement templates 134-1 through 134-3 are common in that four images are disposed, but are templates of which the position and size of each of the four images thereof are set differently within a page.

Figure 9:
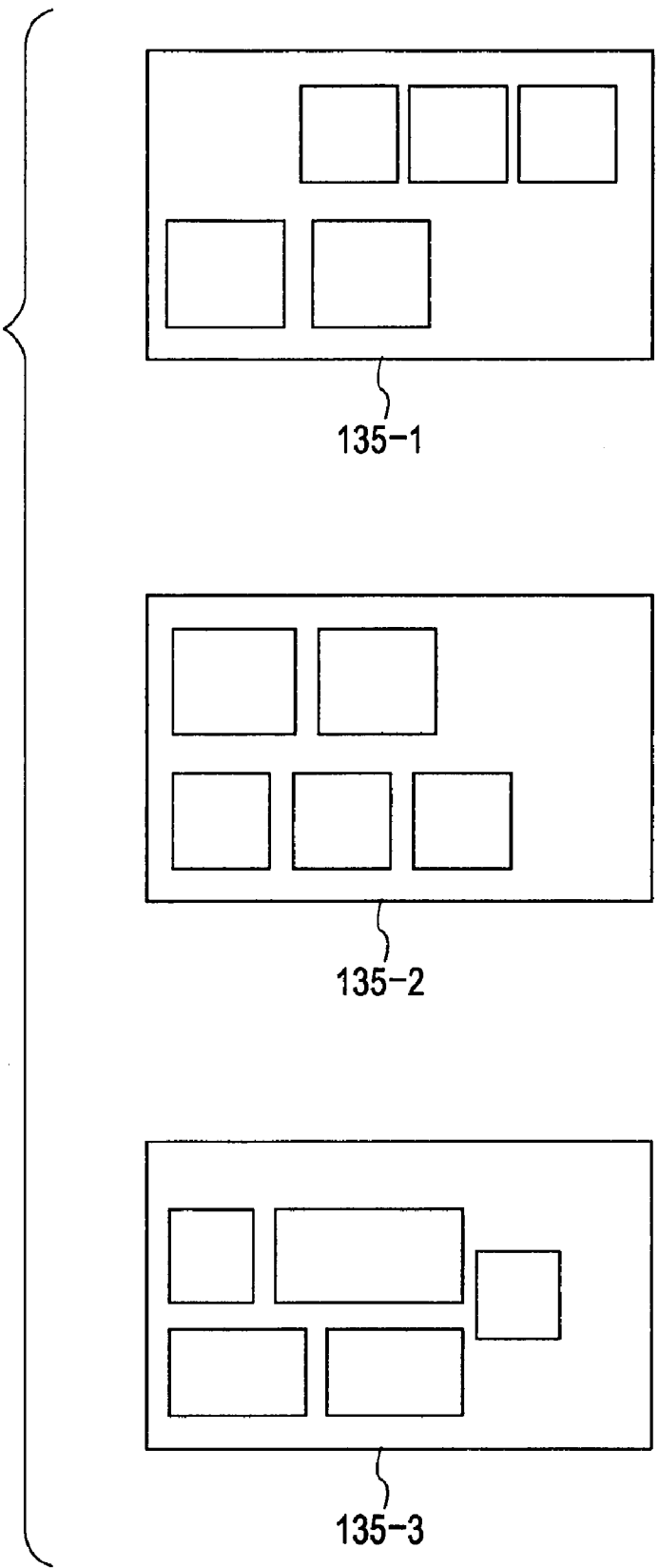
FIG. 9 is a diagram illustrating an example of a placement template.

The placement template group including the three templates of the placement templates 135-1 through 135-3 shown in FIG. 9 is a placement template 135 when five images are disposed on one page. The placement templates 135-1 through 135-3 are common in that five images are disposed, but are templates of which the position and size of each of the five images thereof are set differently within a page.

With each of the placement templates 131 through 135, the position and region (size) where each image is displayed are fixed. For example, one image is displayed on the placement template 131-1, but the position and size where the image thereof is displayed are fixed, so even if an image having a size greater than the size to be displayed is disposed on the placement template 131-1, the size of the region where the image thereof is displayed is not changed. Accordingly, in the event that an image having a great size is pasted on the placement template, a part of the image thereof is clipped, pasted on the placement template, and displayed.

The placement templates 131 through 135 shown in FIGS. 5 through 9 are examples, and do not illustrate a restriction. Also, up to a case wherein the five images are displayed on one page at a maximum has been exemplified, but an arrangement may be made wherein a placement template where five or more images are displayed on one page is stored in the template DB 33, and employed. However, upon images to be displayed on one page being increased, a display region per one image becomes small, and thus there is a possibility that the images are not readily viewed, so it is not desirable to prepare a placement template such that too much images are disposed on one page.

The template setting unit 72 sets an appropriate placement template of the placement templates 131 through 135 shown in FIGS. 5 through 9 stored in the template DB 33. Description will be made later regarding processing arranged to set an appropriate placement template, but this processing is performed employing the results of clustering.

Figure 3:
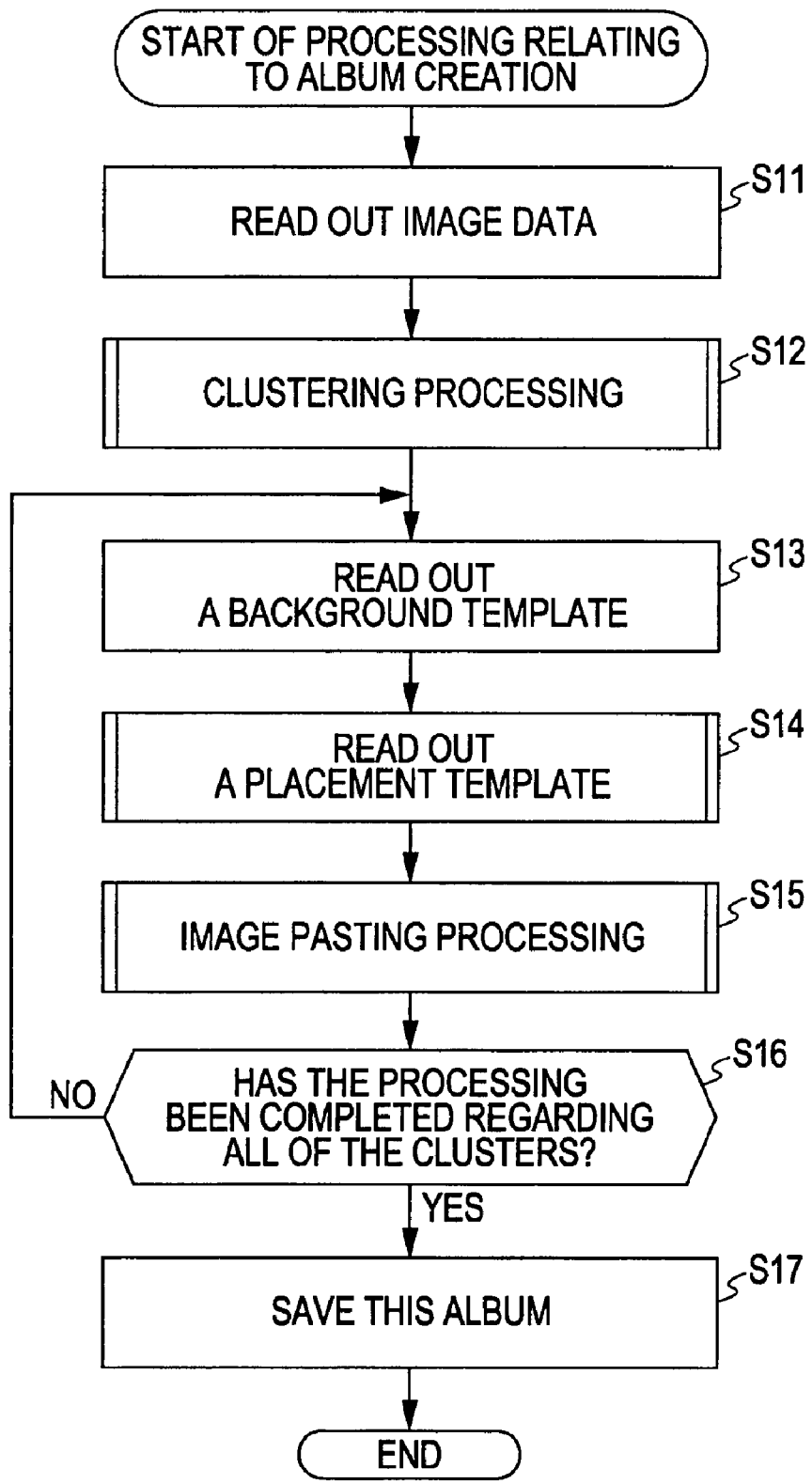
FIG. 3 is a flowchart describing processing relating to the creation of an album.

Now, description will return to the flowchart shown in FIG. 3, where in step S13 a background template is set, in step S14 a placement template is set, and then in step S15 image pasting processing is performed. While detailed description will be made later regarding the image pasting processing executed in step S15, this processing is processing wherein an image is pasted on the placement template which has been set, and this is synthesized with the background template which has been set.

Thus, a predetermined one page within an album is created. The processing in steps S11 and S12 are performed upon a predetermined folder, and consequently, the multiple still images within the one folder are classified into multiple clusters. Subsequently, the processing in steps S13 through S15 is executed upon one cluster, thereby creating one page within the album.

Figure 10:
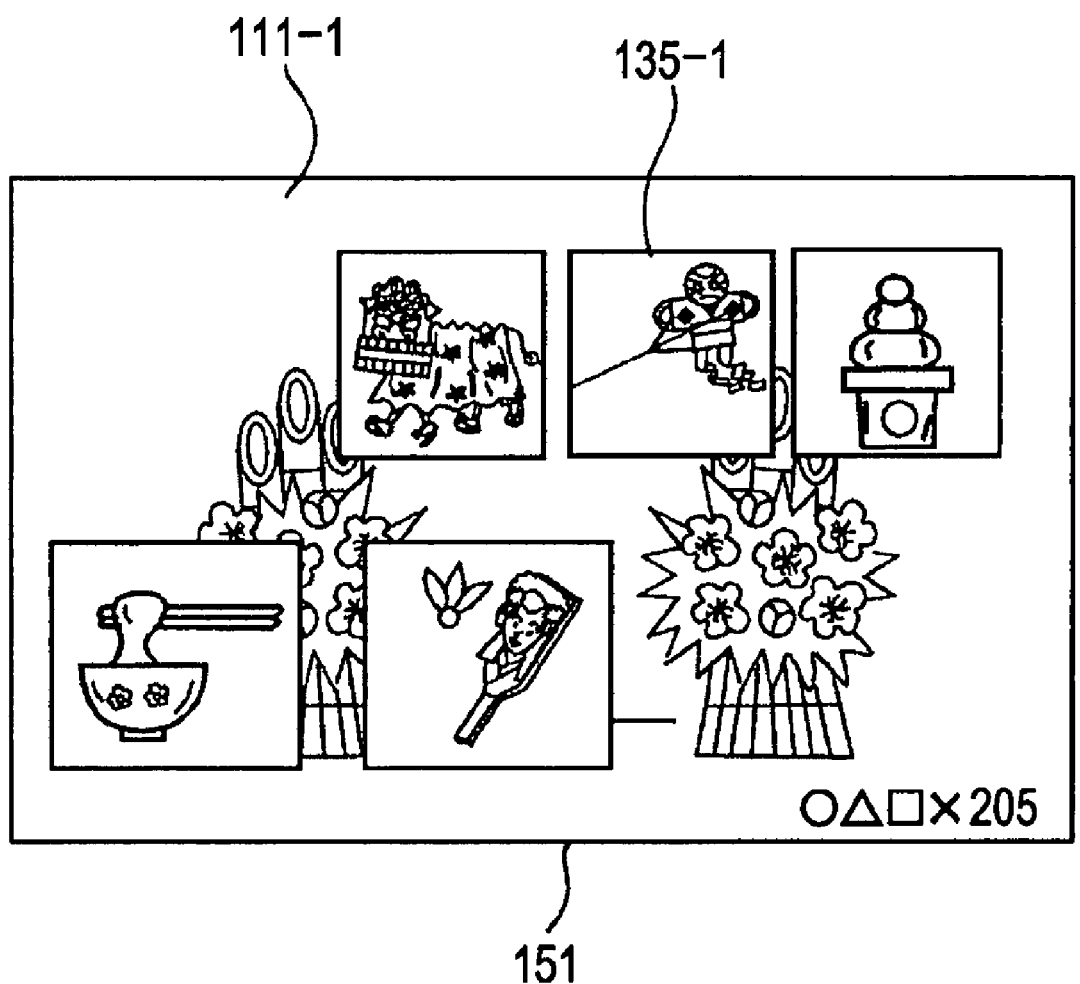
FIG. 10 is a diagram illustrating an example of the configuration of a predetermined page of an album.

An example of the created one page within the album is shown in FIG. 10. With the example shown in FIG. 10, the background template 111-1 and the placement template 135-1 are set on a page 151. The background template 111-1 includes, for example, the same cluster information as the cluster information of five images disposed on the page 151. Also, according to the placement template 135-1, for example, the placements of the five images are determined. Also, on the page 151 a comment of "○Δ□×205" is displayed. Thus, an arrangement may be made wherein the user operates the operating unit 19, whereby an arbitrary comment can be set at an arbitrary position of the page 151.

Thus, one predetermined page within an album is made up of an image such as images being pasted based on the placement template which has been set on the background template which has been set.

Also, images to be disposed on the placement template, in other words, images to be displayed on predetermined one page within an album are still images, but the still images thereof may include not only the still images stored in the still image DB 31 but also a still image extracted from a moving image stored in the moving image DB 32.

For example, an arrangement may be made wherein when creating the indexes or the like of the moving images stored in the moving image DB 32, an image illustrating the content of a moving image is provided to the user, and a still image illustrating one scene of a moving image is displayed on a page within an album. Such a still image is sometimes referred to as a thumbnail image. Also, multiple thumbnail images are sometimes created from one moving image, and all of the multiple thumbnail images may be displayed within a page making up an album, or only the selected one thumbnail image may be displayed.

Figure 11:
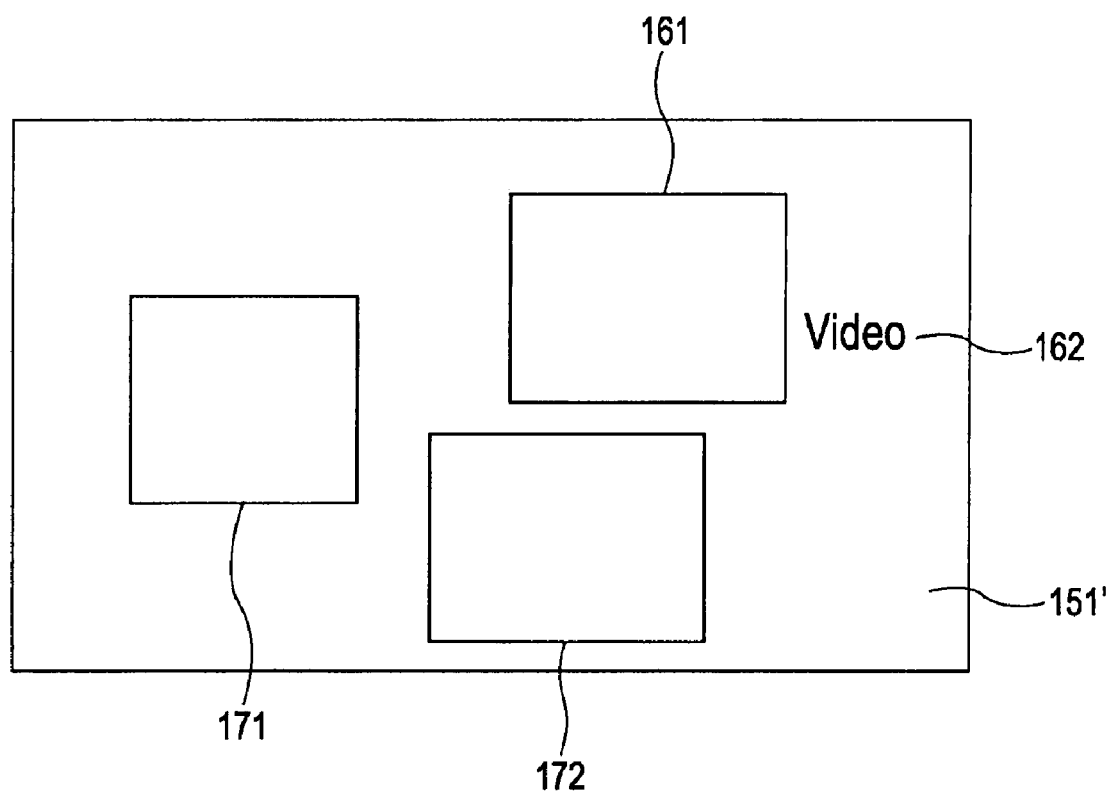
FIG. 11 is a diagram illustrating another example of the configuration of a predetermined page of an album.

A screen example of a page when a still image extracted from a moving image is displayed is shown in FIG. 11. In FIG. 11, of three still images displayed on a page 151', a still image 161 is a still image (thumbnail image) extracted from a moving image. A mark 162 such as "Video" is displayed in the vicinity of the still image 161 as display arranged to allow the user to recognize that this still image 161 is a still image extracted from a moving image.

Thus, upon the still image 161 where the mark 162 is displayed being selected by the user, playback of the original moving image of the still image 161 thereof is started. The term "selected by the user" means that a predetermined operation is performed by the user, for example, such as a mouse (not shown) being double clicked when an unshown cursor is positioned on the still image 161.

Also, in the event that the still image 171 or still image 172 displayed on the page 151' is selected, the selected still image 171 (still image 172) thereof is enlarged and displayed.

Now, description will return to the flowchart shown in FIG. 3, where in step S16 determination is made whether or not the processing has been completed as to all of the clusters. The processing in step S16 can be described in the other words as processing wherein determination is made whether or not all of the pages within an album have been created.

In the event that determination is made in step S16 that the processing has not been completed as to all of the clusters, the flow returns to the processing in step S13, where the subsequent processing is executed. That is to say, creation of the next page is performed.

On the other hand, in the event that determination is made in step S16 that the processing has been completed as to all of the clusters, the flow proceeds to the processing in step S17. The flow proceeds to the processing in step S17 in the event that creation of all pages within an album has been completed, in other words, the album being completed. Accordingly, in step S17 the created album is stored (saved) in the contents DB 34.

Figure 12:
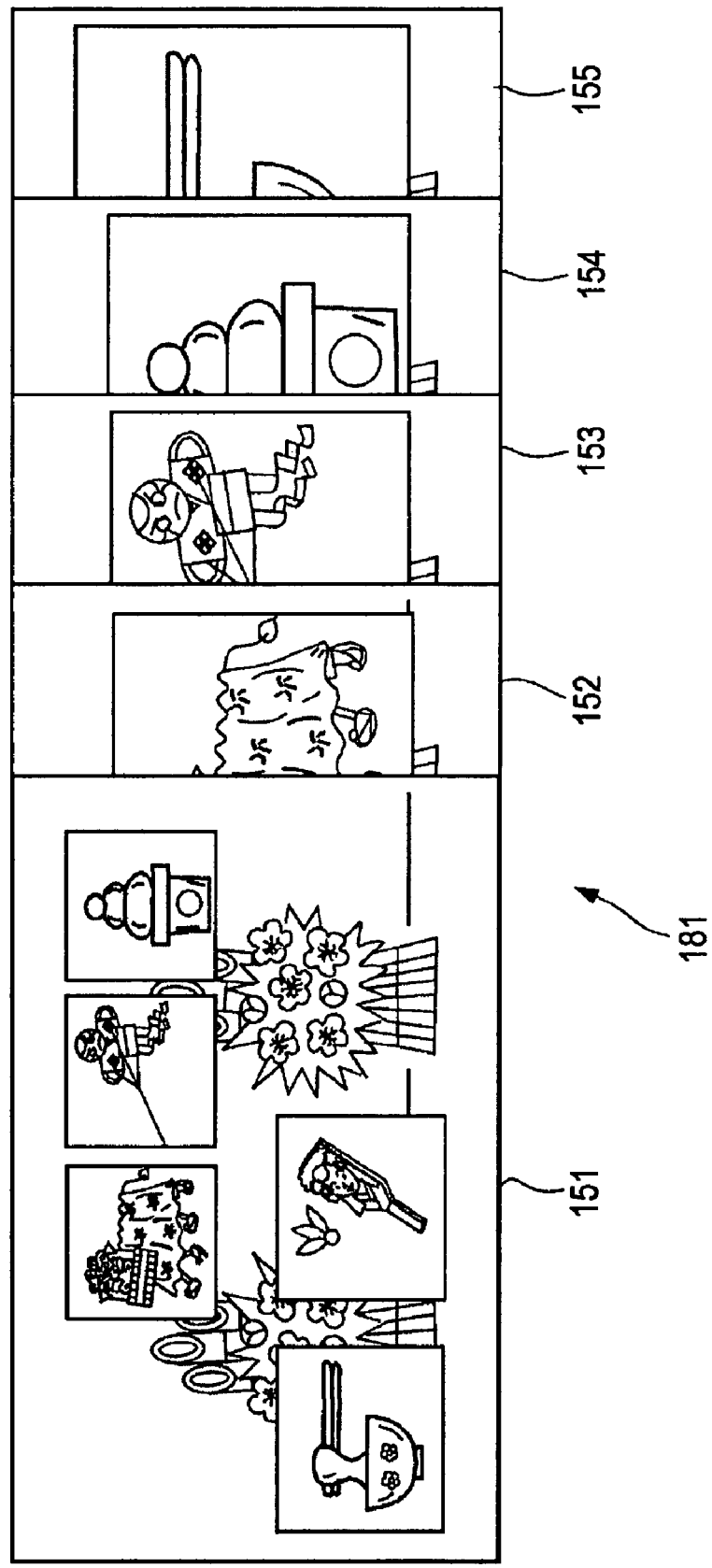
FIG. 12 is a diagram illustrating an example of the configuration of an album.

Thus, the album is created. FIG. 12 illustrates one example of the configuration of the created album.

With the example shown in FIG. 12, an album 181 is made up of the five pages of pages 151 through 155. The images disposed on the pages 151 through 155 of the album 181 are the images stored within the same folder. On the pages 151 through 155 a predetermined number of images determined with each placement template are disposed.

Next, detailed description will be made regarding the processing of each step described with reference to the flowchart shown in FIG. 3.

Clustering Processing

First, description will be made regarding the clustering processing executed in step S12.

Description will be made first regarding the concept of clustering performed with the present embodiment. Note that a clustering technique which will be described below is one example, and it does not mean that the present invention is applied to a clustering technique alone which will be described below.

Figure 13:
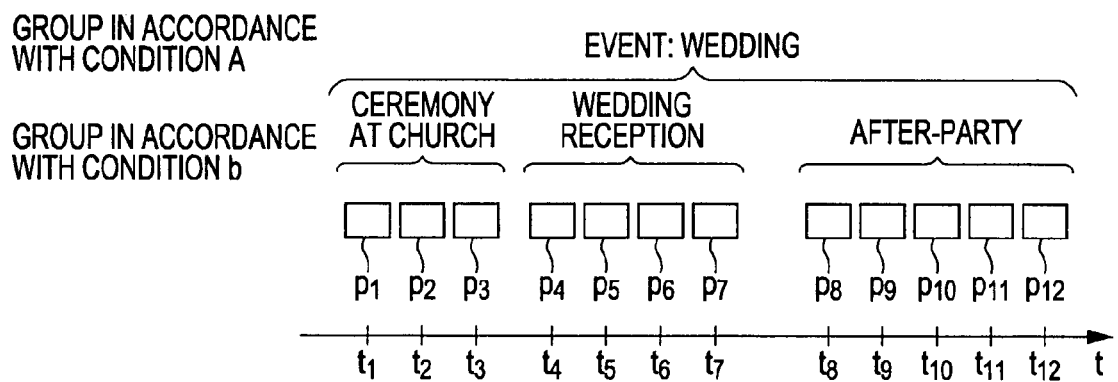
FIG. 13 is a diagram illustrating examples of clusters.

FIG. 13 is a diagram illustrating an example of an image group (cluster). In FIG. 13, the horizontal axis denotes a temporal axis.

FIG. 13 illustrates an example of a case wherein images p1 through p12 photographed at each timing of points-in-time t1 through t12 are taken as clustering objects. For example, a still image recorded in the still image DB 31, and a still image extracted from a moving image recorded in the moving image DB 32 are taken as clustering objects. One square in FIG. 13 represents one image.

With the image processing apparatus 1, the time interval of the photographing point-in-time of each image is obtained, and with a time interval distribution, one cluster is made up of consecutive images satisfying a certain condition. An EXIF (Exchangeable Image File Format) tag is added to each photographed image as attribute information, and photographing point-in-time information included in this EXIF tag is employed for clustering.

With the example shown in FIG. 13, a condition A and a condition B are set as conditions which stipulate a cluster, and of these, the condition A stipulates one cluster made up of the all of the images p1 through P12. An event name "WEDDING" is set to the cluster stipulated with the condition A.

Though description will be made later regarding the details of clustering, the cluster to which the event name of "WEDDING" is set is a cluster stipulated since the degree of scattering of the time intervals of the respective photographing points-in-time of the images p1 through p12 is smaller than a certain threshold.

Also, with the example shown in FIG. 13, according to the condition B, one cluster is stipulated from the images p1 through p3 of the images p1 through p12, and one cluster is stipulated from the images p4 through p7. Also, one cluster is stipulated from the images p8 through p12.

The event name of "CELEBRATION AT CHURCH" is set to the cluster made up of the images p1 through p3, the event name of "WEDDING RECEPTION" is set to the cluster made up of the images p4 through p7, and the event name of "AFTER-PARTY" is the cluster made up of the images p8 through p12, respectively.

The cluster to which the event name of "CELEBRATION AT CHURCH" is set is a cluster stipulated since the degree of scattering of the time interval of the photographing point-in-time of each image of the images p1 through p3 making up the cluster is close, and on the other hand, the time interval between the image p3, and the image p4 which is the first image of the images p4 through p7 which is a group of images of which the degree of the scattering of the time intervals of the photographing points-in-time is close next (next on the temporal axis) is relatively great, and at that portion determination is made that change in frequency of photographing is detected.

Also, the cluster to which the event name of "WEDDING RECEPTION" is set is a cluster stipulated since the degree of scattering of the time interval of the photographing point-in-time of each image of the images p4 through p7 making up the cluster is close, and on the other hand, the time interval between the image p7, and the image p8 which is the first image of the images p8 through p12 which is a group of images of which the degree of the scattering of the time intervals of the photographing points-in-time is close next is relatively great, and at that portion determination is made that change in frequency of photographing is detected.

The cluster to which the event name of "AFTER-PARTY" is set is a cluster stipulated since the degree of scattering of the time intervals of the respective photographing points-in-time of the images p8 through p12 making up the cluster is close, and on the other hand, the time interval between the image p12, and the first image of a group of images of which the degree of the scattering of the time intervals of the photographing points-in-time is close next is relatively great, and at that portion determination is made that change in frequency of photographing is detected.

Note that each event name of "WEDDING", "CELEBRATION AT CHURCH", "WEDDING RECEPTION", and "AFTER-PARTY" is set, for example, manually by the user.

Thus, with the image processing apparatus 1, multiple conditions are set as conditions arranged to subject the same target image to clustering, and a cluster having a different grain size is stipulated based on each of the conditions. With the example shown in FIG. 13, the condition A is a condition arranged to stipulate a cluster having a low (rough) grain size, and the condition B is a condition arranged to stipulate a cluster having a higher (finer) grain size than that of the condition A.

An image included in each cluster thus stipulated is managed collectively with one virtual folder, and is provided to the user in a form having a hierarchical structure.

Figure 14:
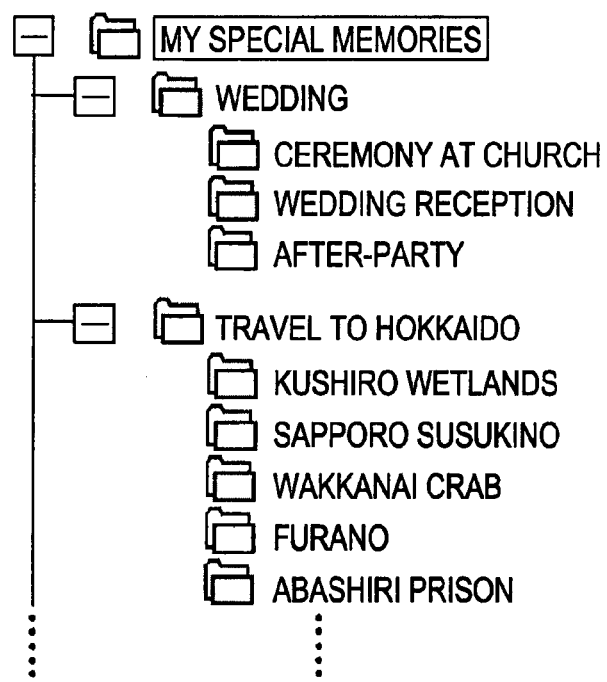
FIG. 14 is a diagram illustrating an example of a hierarchical structure.

FIG. 14 is a diagram illustrating a hierarchical structure example.

With the example shown in FIG. 14, as hierarchically lower folders of a folder to which the name of "MY SPECIAL MEMORIES" is set, a folder representing a cluster to which the event name of "WEDDING" stipulated with the condition A, and a folder representing a cluster to which the event name of "TRAVEL TO HOKKAIDO" is set, are displayed.

Also, as hierarchically lower folders of the folder representing the cluster to which the event name of "WEDDING" is set, folders representing clusters to which the event names of "CELEBRATION AT CHURCH", "WEDDING RECEP- TION", and "AFTER-PARTY" are set, which are stipulated with the condition B, are displayed.

Further, as hierarchically lower folders of the folder representing the cluster to which the event name of "TRAVEL TO HOKKAIDO" is set, folders representing clusters to which the event names of "KUSHIRO WETLANDS", "SAPPORO SUSUKINO", "WAKKANAI CRAB", and "ABASHIRI PRISON" are set, which are stipulated with the condition B, are displayed. Each of the clusters represented with these folders is also stipulated with a time interval distribution of the photographing point-in-time of an image making up each cluster.

Thus, with the image processing apparatus 1, a folder is created for each event, images photographed at the time of each event are included in the created folder, whereby the user can observe and classify images in increments of event by selecting a predetermined folder from folders having a hierarchical structure.

Figure 15:
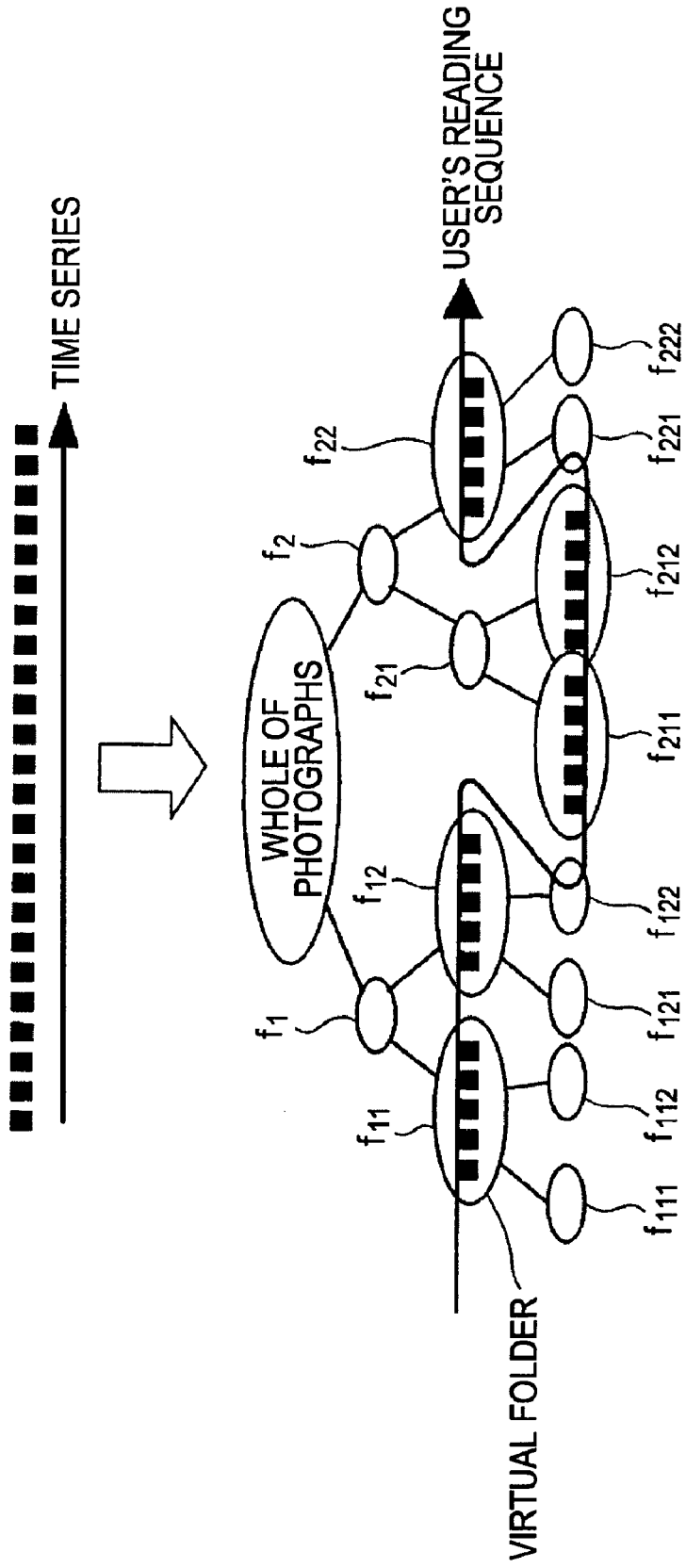
FIG. 15 is a diagram describing the observing sequence of images.

For example, the user does not simply observe the photographed and obtained images in time series such as shown in the upper side of FIG. 15, and such as illustrated under a white arrow, can observe images in order of images included in each of folders f11, f12, f22, f211, f212, and f22, i.e., in preferable order by selecting a folder having a preferable grain size.

One circle shown in FIG. 15 represents one folder. In FIG. 15, the whole of the photographed and obtained images is divided into the images included in the folder f1 and the images included in the folder f2, and of these, the images included in the folder f1 are further divided into the images included in the folder f11 and the images included in the folder and the images included in the folder f12. The images included in the folder f11 are divided into the images included in the folder f111 and the images included in the folder f112, and the images included in the folder f12 are divided into the images included in the folder f121 and the images included in the folder f122. Similarly, the images included in the folder f2 are divided into the images included in hierarchically lower folders.

Figure 16:
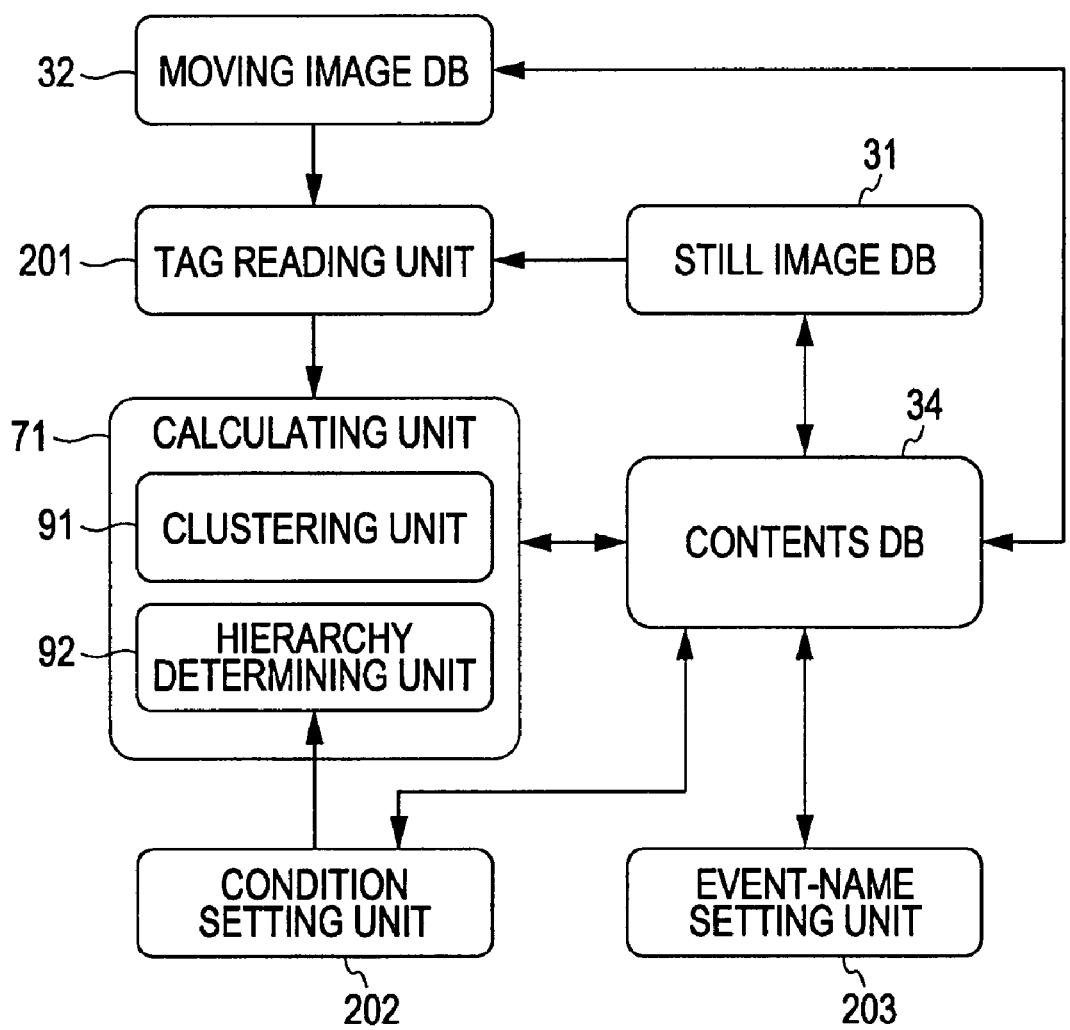
FIG. 16 is a configuration example of portions configured to execute processing relating to clustering.

FIG. 16 is a diagram wherein portions configured to execute the clustering processing are extracted from the configuration of the image processing apparatus 1 shown in FIGS. 1 and 2, and also portions necessary for executing the clustering processing are added.

The portions shown in FIG. 16 configured to execute the clustering processing is configured so as to include a still image DB 31, a moving image DB 32, a calculating unit 71 (a clustering unit 91 and a hierarchy determining unit 92), a tag reading unit 201, a condition setting unit 202, and an event name setting unit 203.

EXIF tags each including information such as photographing point-in-time, photographed date, and so forth are recorded in the still image DB 31 in a manner correlated with a photographed image.

The tag reading unit 201 reads out the photographing point-in-time of each image which will be subjected to clustering from an EXIF tag recorded in the still image DB 31, and outputs the readout photographing point-in-time to the calculating unit 71. Also, as described later, in the event of receiving an instruction from the user, or the like, the tag reading unit 201 reads out information relating to the photographing point-in-time of an image recorded in the moving image DB 32, and outputs the readout photographing point-in-time to the calculating unit 71.

Clustering of an image may be performed each time one image is photographed, or may be performed at a predetermined timing such as when the user instructs to perform clustering. With the present embodiment, let us say that clustering of an image is performed at timing when an album is created (performed as the processing in step S12).

The calculating unit 71 is configured so as to include a clustering unit 91 and a hierarchy determining unit 92. The clustering unit 91 obtains cluster data recorded in the contents DB 34, and performs clustering of an image based on the obtained cluster data, and the photographing point-in-time supplied from the tag reading unit 201. For example, a clustering result is obtained by the clustering unit 91, which is managed in a form where the whole of images including images of which the clustering was performed in the past has a binary tree structure.

The cluster data recorded in the contents DB 34 includes information representing to which cluster each of the images obtained so far belongs, and information representing the binary tree structure of the whole of the images.

The hierarchy determining unit 92 determines a cluster appropriate for the condition set by the condition setting unit 202 based on the information representing the binary tree structure which is a clustering result obtained by the clustering unit 91. For example, information representing which image each cluster includes, information representing to which cluster each image belongs, or the like is obtained by the hierarchy determining unit 92, and is recorded in the contents DB 34 as cluster data representing the binary tree structure of the whole of the images, and also representing a final clustering result.

The condition setting unit 202 sets a grouping condition which is a condition arranged to stipulate a cluster, and outputs this to the hierarchy determining unit 92. A grouping condition may be set by the user selecting from multiple conditions prepared beforehand, and in the event that the history of editing of a cluster performed by the user, such as coupling of multiple clusters into one cluster, dividing one cluster into multiple clusters, or the like, is managed, the grain size of a cluster which will be considered as the user's favorite is obtained by study using the history of editing, a condition by which a cluster having such a grain size can be obtained may be set dynamically.

The contents DB 34 records the cluster data supplied from the hierarchy determining unit 92 in a manner correlated with the image data recorded in the still image DB 31. The event name supplied from the event-name setting unit 203 is also recorded in each cluster represented with the clustering result in a manner correlated with the image data recorded in the still image DB 31. Thus, with the image processing apparatus 1, image data body and cluster data are arranged to be managed separately.

The event-name setting unit 203 outputs the event name set by the user to the contents DB 34, and controls the contents DB 34 to record the event name in a manner correlated with a cluster. Also, in the event that an event name is not set by the user, the event-name setting unit 203 identifies images belonging to each cluster using the cluster data recorded in the contents DB 34, and controls the contents DB 34 to record an event name including the photographed date and photographed time zone (such as AM, PM, or the like) of the identified image in a manner correlated with a cluster.

Now, description will be made regarding the details of processing performed by the calculating unit 71.

For example, description will be made regarding processing wherein with 100 images p1 through p100 to be subjected to clustering, these images are divided into an event cluster A (the cluster of images satisfying the grouping condition A) and a sub-event cluster B (the cluster of images satisfying the grouping condition B).

First, description will be made regarding creation of a binary tree structure performed by the clustering unit 91 with reference to FIGS. 17 through 25.

In FIGS. 17 through 25, one circle in which a character "p" and a numeric are written represents one image, and one circle in which a character "n" and a numeric are written represents one node. Also, let us say that the right side of the drawing is temporally in the backward direction as compared with the left side of the drawing. Now, description will be made regarding a case wherein the images p1 through p100 are subjected to clustering in photographing point-in-time order (the image p1 is the oldest, and the image p100 is the newest data). Description will be made later regarding clustering wherein following the images p1 and p2 being subjected to clustering (following being inserted into a binary tree structure), each image is subjected to clustering such that the image p3, which is newer than the image p1, and is older than the image p2, is newly subjected to clustering regardless of photographing point-in-time order.

Figure 17:
FIG. 17 is a diagram describing the creation of a binary tree structure.

When the image p1 obtained at the first photographing is inserted into the tree (when being subjected to clustering) in a state in which clustering has not been performed, there is no node which becomes the root of the tree in an initial state, so as shown in FIG. 17, the image p1 itself becomes a root node.

Figure 18:
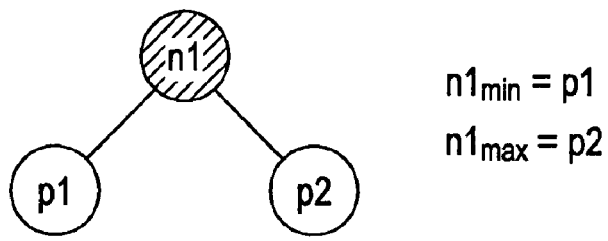
FIG. 18 is a diagram which is continued from FIG. 17 describing the creation of a binary tree structure.

When the image p2 photographed following the image p1 is inserted into the tree, as shown in FIG. 18, a node n1 is newly created, and the photographing point-in-time of the image p2 is after the photographing point-in-time of the image p1, so the image p1 is connected to the node n1 as a left child node, and the image p2 is connected thereto as a right child node. The node n1 becomes a root node instead of the image p1.

The photographing point-in-time of the image p1 is recorded as the minimum point-in-time of the node n1, and the photographing point-in-time of the image p2 is recorded as the maximum point-in-time thereof. As the point-in-time of a node, the mean value (intermediate point-in-time) of the photographing points-in-time of two child nodes of which the parent node is the node thereof may be recorded.

Figure 19:
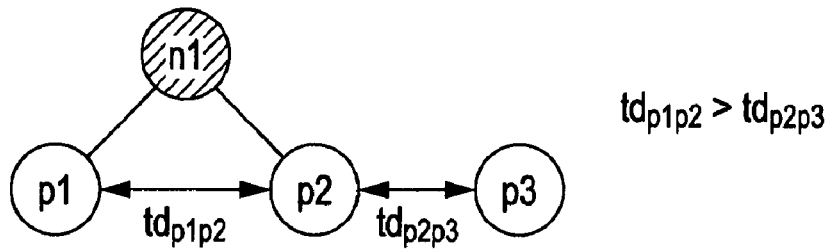
FIG. 19 is a diagram which is continued from FIG. 18 describing the creation of a binary tree structure.
Figure 20:
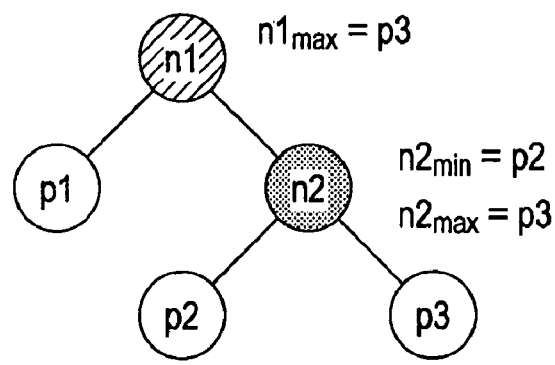
FIG. 20 is a diagram which is continued from FIG. 19 describing the creation of a binary tree structure.

When the image p3 photographed following the image p2 is inserted into the tree, and as shown in FIG. 19, the time interval $td_{p2p3}$ between the photographing point-in-time of the image p3 and the photographing point-in-time of the image p2 is shorter than the time interval $td_{p1p2}$ between the photographing point-in-time of the image p2 and the photographing point-in-time of the image p1, as shown in FIG. 20, a node n2 is newly created, the image p2 is connected to the node n2 as the left child node thereof, and the image p3 is connected thereto as the right child node thereof. Also, the node n2 is connected to the node n1 as a right child node instead of the image p2.

The photographing point-in-time of the image p2 is recorded as the minimum point-in-time of the node n2, and the photographing point-in-time of the image p3 is recorded as the maximum point-in-time thereof. Also, at this time, the maximum point-in-time of the node n1 which is the parent node of the node n2 is overwritten with the photographing point-in-time of the image p3.

Figure 21:
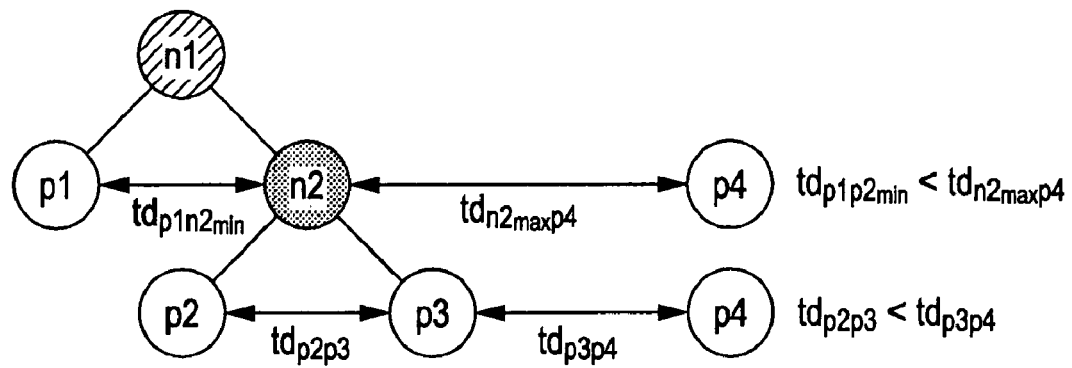
FIG. 21 is a diagram which is continued from FIG. 20 describing the creation of a binary tree structure.
Figure 22:
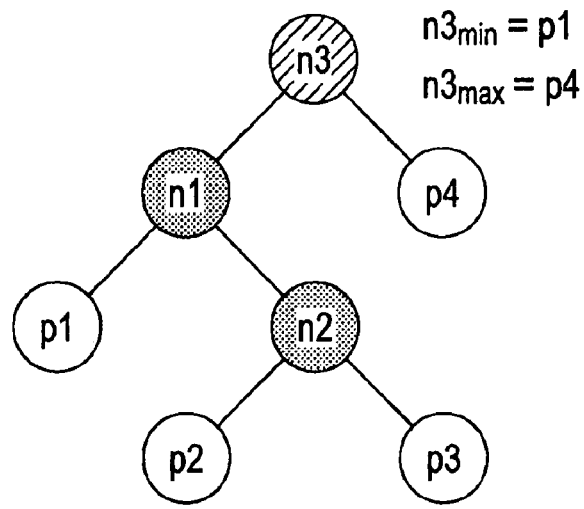
FIG. 22 is a diagram which is continued from FIG. 21 describing the creation of a binary tree structure.

When the image p4 photographed following the image p3 is inserted into the tree, and as shown in FIG. 21, the time interval $td_{p3p4}$ between the photographing point-in-time of the image p4 and the photographing point-in-time of the image p3 is longer than the time interval $td_{p2p3}$ between the photographing point-in-time of the image p3 and the photographing point-in-time of the image p2, and also the time interval $td_{n2maxp4}$ between the photographing point-in-time of the image p4 and the maximum point-in-time of the node n2 is longer than the time interval $td_{p1n2min}$ between the minimum point-in-time of the node n2 and the photographing point-in-time of the image p1, as shown in FIG. 22, a node n3 is newly created. Also, the node n1 is connected to the node n3 as the left child node thereof, and the image p4 is connected thereto as the right child node thereof.

The minimum point-in-time of the node n1 is recorded as the minimum point-in-time of the node n3, and the photographing point-in-time of the image p4 is recorded as the maximum point-in-time.

Figure 23:
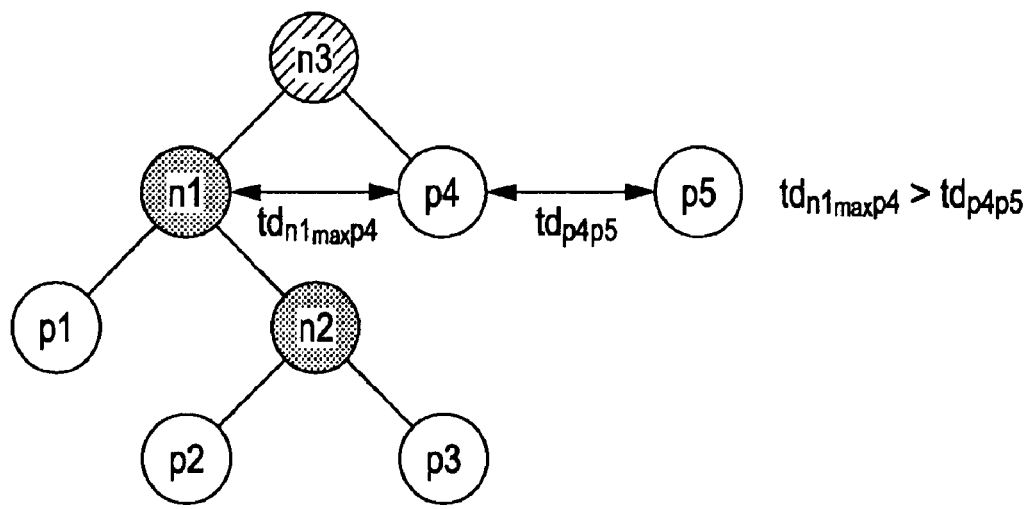
FIG. 23 is a diagram which is continued from FIG. 22 describing the creation of a binary tree structure.
Figure 24:
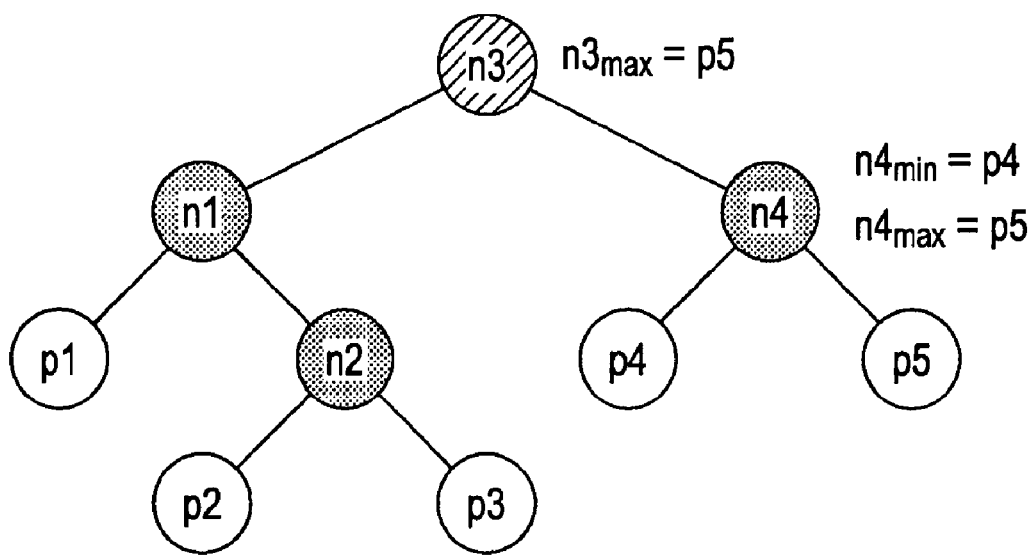
FIG. 24 is a diagram which is continued from FIG. 23 describing the creation of a binary tree structure.

When the image p5 photographed following the image p4 is inserted into the tree, and as shown in FIG. 23, the time interval $td_{n1maxp4}$ between the photographing point-in-time of the image p4 and the maximum point-in-time of the node n1 is longer than the time interval $td_{p4p5}$ between the photographing point-in-time of the image p5 and the photographing point-in-time of the image p4, as shown in FIG. 24, a node n4 is newly created. Also, the image p4 is connected to the node n4 as the left child node thereof, and the image p5 is connected thereto as the right child node thereof. Further, the node n4 is connected to the node n3 as the right child node instead of the image p4.

The photographing point-in-time of the image p4 is recorded as the minimum point-in-time of the node n4, and the photographing point-in-time of the image p5 is recorded as the maximum point-in-time. Also, at this time, the maximum point-in-time of the node n3 which is the parent node of the node n4 is overwritten with the photographing point-in-time of the image p5.

At this point, a binary tree structure is formed with the nodes n1 through n4 including the five images of the images p1 through p5.

The images included in each node are images which are directly connected to each node, or indirectly connected to each node via another node, so when a tree such as shown in FIG. 24 is created, the images included in the node n3 are the five images of the images p1 through p5, and the images included in the node n1 are the three images of the images p1 through p3. Also, the images included in the node n2 are the two images of the images p2 and p3, and the images included in the node n4 are the two images of the images p4 and p5.

Thus, each time an image is newly inserted, images of which the time interval of photographing point-in-time is shorter, or an image and a node of which the time interval between the photographing point-in-time and the point-in-time which is set is shorter, are connected to the same node so as to hang down therefrom.

Figure 25:
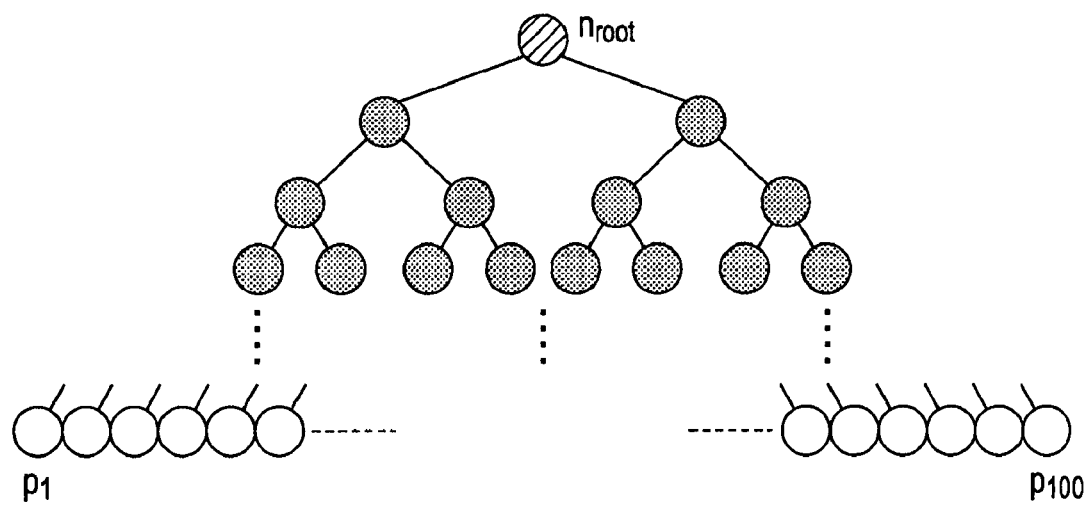
FIG. 25 is a diagram which is continued from FIG. 24 describing the creation of a binary tree structure.

When photographing is repeatedly performed, and the images p6 through p100 are inserted into the tree, the processing is performed in the same way, and finally, a binary tree structure such as shown in FIG. 25 is obtained, whereby the images p1 through p100 are included in a root node $n_{rout}$.

Next, description will be made regarding clustering based on a grouping condition performed by the hierarchy determining unit 92 with reference to FIGS. 26 through 32.

With the hierarchy determining unit 92, each node within a binary tree structure is observed, and the standard deviation sd of the time intervals of photographing points-in-time of all the images within a node is calculated with the following Expression (1).

$$sd = \sqrt{\frac{\sum_{n=1}^{N}(td_n - \overline{td})^2}{N}} \quad (1)$$

N denotes the number of the time intervals of the photographing points-in-time of images, and is represented with "the number of images included in a node −1". $td_n$ denotes the n'th time interval, as viewed from the previous time interval in time, of the N time intervals. The td with an overline is the mean value of the time intervals td within a node.

Also, the deviation dev of the time interval between child nodes of which the parent node is a node of interest (the absolute value of the difference between the time interval between child nodes and the mean time interval of photographing points-in-time) is calculated with the following Expression (2).

$$dev = |td_c - \overline{td}| \quad (2)$$

N denotes the number of the time intervals of the photographing points-in-time of images, and is represented with "the number of images included in a node −1". $td_n$ denotes the time interval between child nodes. The td with an overline is the mean value of the time intervals td within a node. Note that the term "the time interval between child nodes" means the time interval between the photographing point-in-time of the image last in time included in the child node former in time of two child nodes of which the parent node is a node of interest, and the photographing point-in-time of the image first in time included in the child node latter in time. Description will be made later regarding a specific example.

Further, the ratio of the deviation dev calculated with Expression (2) as to the standard deviation sd calculated with Expression (1) is set to a node of interest as a division parameter th. The division parameter th is represented with the following Expression (3), and is a parameter which serves as a reference to determine whether or not child nodes of which the parent node is a node of interest are divided assuming that each node belongs to a different cluster.

$$th = \frac{dev}{sd} \quad (3)$$

Now, description will be made specifically regarding a value obtained with the above-described expression with reference to FIG. 26.

FIG. 26 is a diagram illustrating the configuration of the same range as FIG. 24, which is a part of the overall of the binary tree structure created by the clustering unit 91.

In FIG. 26, $td_1$ denotes the time interval between the photographing point-in-time of the image p1 and the photographing point-in-time of the image p2, and $td_2$ denotes the time interval between the photographing point-in-time of the image p2 and the photographing point-in-time of the image p3. Similarly, $td_3$ denotes the time interval between the photographing point-in-time of the image p3 and the photographing point-in-time of the image p4, and $td_4$ denotes the time interval between the photographing point-in-time of the image p4 and the photographing point-in-time of the image p5.

For example, in the event that the node n3 which is a node closest to the root node of FIG. 26 is observed, first each value is assigned to Expression (1), and the standard deviation sd is represented with the following Expression (4). Also, the mean value of the time intervals of photographing points-in-time is represented with the following Expression (5).

$$sd = \sqrt{\frac{(td_1 - \overline{td})^2 + (td_2 - \overline{td})^2 + (td_3 - \overline{td})^2 + (td_4 - \overline{td})^2}{4}} \quad (4)$$

$$\overline{td} = \frac{td_1 + td_2 + td_3 + td_4}{4} \quad (5)$$

The deviation dev is represented with the following Expression (6).

$$dev = |td_3 - \overline{td}| \quad (6)$$

That is to say, the two child nodes of which the parent node is the node n3 of interest are the nodes n1 and n4, and the time interval $td_3$ between the photographing point-in-time of the image p3 last in time included in the node n1 which is former in time of both, and the photographing point-in-time of the image p4 first in time included in the node n4 which is latter in time, is the time interval between the node n1 and the node n4, and is employed for calculation of the deviation dev at the time of observing the node n3.

The division parameter th when observing the node n3 is calculated from the standard deviation sd calculated with Expression (4), and the deviation dev calculated with Expression (6), and is set to the node n3.

As described above, when the settings of division parameters as to all the nodes are completed, with the hierarch determining unit 92, a threshold is set next as a grouping condition.

For example, in the event that a threshold a is set as the grouping condition A, and a threshold b is set as the grouping condition B, when the condition of "a>b" such as "a=3.0 and b=2.6", or the like, as shown in FIG. 27, "cluster stipulated with group condition A>cluster stipulated with group condition B" holds (of clusters stipulated with the group condition A, several clusters stipulated with the grouping condition B are created consequently).

With the example shown in FIG. 27, the entirety of images to be processed is divided into two clusters of groups $g_1$ and $g_2$ using the grouping condition A, and is divided into five clusters of group $g_3$ through $g_7$ using the grouping condition B.

That is to say, as described later, in the event that the value of the division parameter which is set is greater than a threshold, a node portion to which the division parameter thereof is set becomes a boundary portion of clusters, so the greater the threshold is, the more the node portion thereof is prevented from becoming a boundary portion of clusters, and accordingly, the grain size of a cluster becomes coarse when viewing as a whole. Conversely, the smaller the threshold is, the more the node portion thereof readily becomes a boundary portion of clusters, and accordingly, the grain size of a cluster becomes fine when viewing as a whole.

Note that in the event that the time interval between the photographing point-in-time of a certain image, and the photographing point-in-time of an image next photographed is equal to or longer than 30 minutes (time interval td≧30 minutes) or equal to or longer than one day (time interval td≧one day), a grouping condition causing a portion having the time interval thereof to become a boundary portion of clusters, and in other words, a grouping condition which stipulates the upper limit of the time interval of the photographing point-in-time of an image included in one cluster may be set. Thus, each of images of which the time interval of photographing point-in-time is equal to or longer than 30 minutes or one day becomes an image belonging to a different cluster.

Following a threshold serving as a grouping condition being set, with the hierarchy determining unit 92, next, a division flag is set to each node based on the threshold which has been set, and the division parameter th which has been set to each node as described above.

For example, a group A division flag having a value of 1 is set to a node exceeding a threshold a which has been set as the grouping condition A, and a group A division flag having a value of 0 is set to a node not exceeding the threshold a.

A value of 1 being set as a division flag represents that the time interval between childe nodes of which the parent node is a node to which the division flag thereof is set is longer than the time interval of the photographing point-in-time of the entirety of images within a node of interest. Conversely, a value of 0 being set as a division flag represents that the time interval between childe nodes of which the parent node is a node to which the division flag thereof is set is not so much changed from the time interval of the photographing point-in-time of the entirety of images within a node of interest.

When the settings of the values of group A division flags are completed, a node within the binary tree structure is observed in ascending order (in order in the direction of a leaf to the root), images are sectioned with a child node of which the time interval is relatively longer than the time interval of photographing point-in-time of the entirety of images, i.e., a node to which a value of 1 is set as a group A division flag as a boundary, and clusters are stipulated with the grouping condition A.

Figure 28:
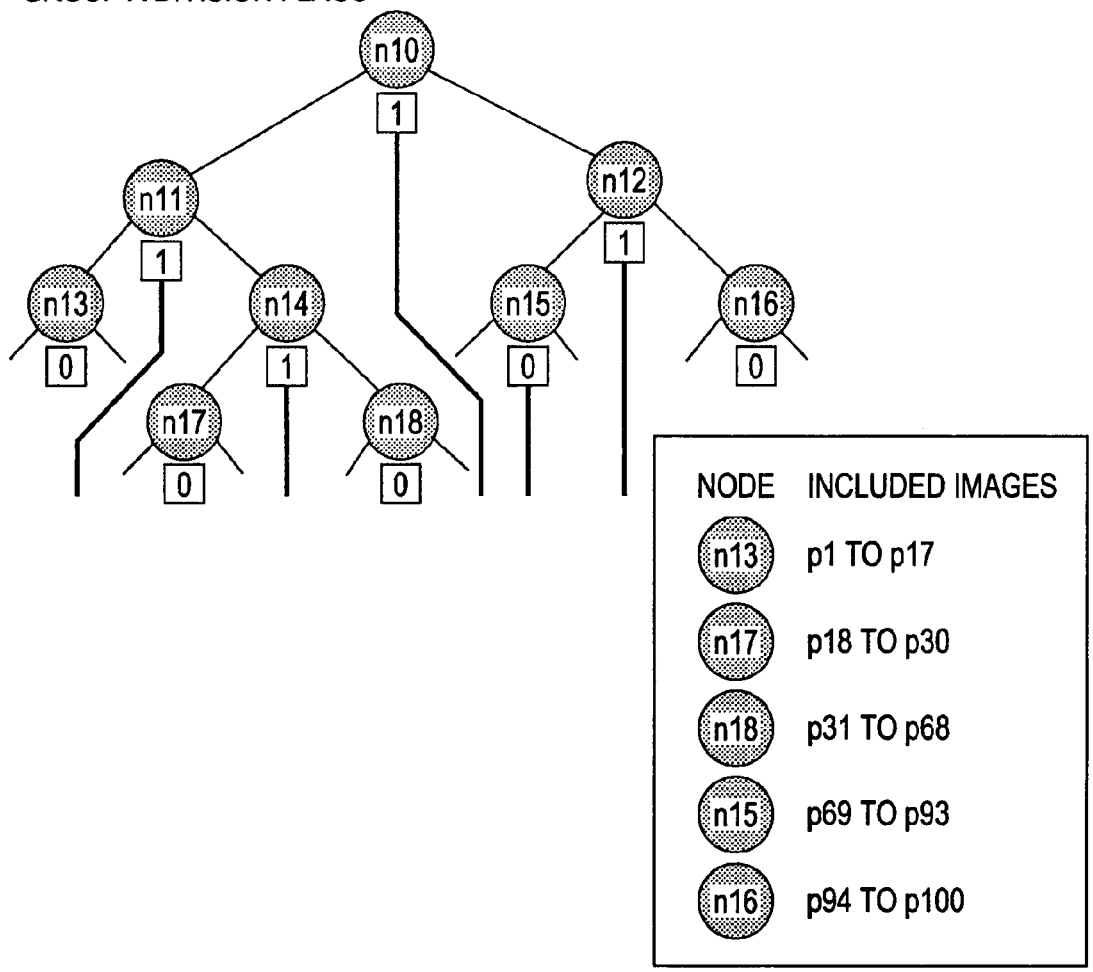
FIG. 28 is a diagram illustrating examples of the settings of group A division flags.

FIG. 28 is a diagram illustrating setting examples of group A division flags.

With the example shown in FIG. 28, a node n10 which is a node closest to the root node is connected with nodes n11 and n12 as left and right child nodes respectively, and a node n11 is connected with nodes n13 and n14 as left and right child nodes respectively. Also, a node n12 is connected with nodes n15 and n16 as left and right child nodes respectively, and a node n14 is connected with nodes n17 and n18 as left and right child nodes respectively.

Also, with the example shown in FIG. 28, of these nodes, a value of 1 is set to each of the nodes n10, n11, n12, and n14 as a group A division flag, and with these node portions as boundaries, clusters are divided such as shown with solid lines.

Now, as shown to the right of FIG. 28, the node n13 is a node including images p1 through p17, and the node n17 is a node including images p18 through p30. Also, the node n18 is a node including images p31 through p68, and the node n15 is a node including images p69 through p93. The node n16 is a node including images p94 through p100.

Figure 29:
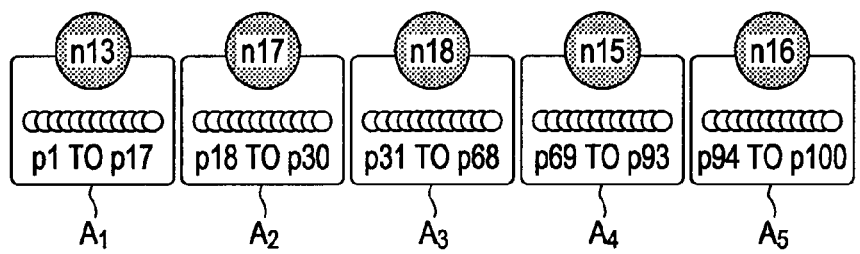
FIG. 29 is a diagram illustrating the result of clustering based on the group A division flags.

Accordingly, in the event that clusters are divided with the node portions of which the value of a group A division flag is set to 1 as boundaries, the images p1 through p100 to be subjected to clustering are divided into respective clusters (event clusters A) such as shown in FIG. 29.

Specifically, a cluster $A_1$ is made up of the images p1 through p17 included in the node n13, and a cluster $A_2$ is made up of the images p18 through p30 included in the node n17.

Also, a cluster $A_3$ is made up of the images p31 through p68 included in the node n18, and a cluster $A_4$ is made up of the images p69 through p93 included in the node n15. Further, a cluster $A_5$ is made up of the images p94 through p100 included in the node n16.

Clustering based on the grouping condition A is thus performed, and information representing which range of images each cluster stipulated with the grouping condition A includes, information representing to which cluster each image belongs, and the like are obtained as the clustering results based on the grouping condition A.

When clustering based on the grouping condition A is performed, grouping based on the grouping condition B is performed in the same way.

Specifically, at the hierarchy determining unit 92, a group B division flag of which the value is 1 is set to a node of which the division parameter th exceeds the threshold b set as the grouping condition B, and a group B division flag of which the value is 0 is set to a node of which the division parameter th does not exceed the threshold b.

When the settings of the values of group B division flags are completed, a node within the binary tree structure is observed in ascending order, images are sectioned with a child node of which the time interval is relatively longer than the time interval of photographing point-in-time of the entirety of images, i.e., a node to which a value of 1 is set as a group B division flag as a boundary, and clusters are stipulated with the grouping condition B.

Figure 30:
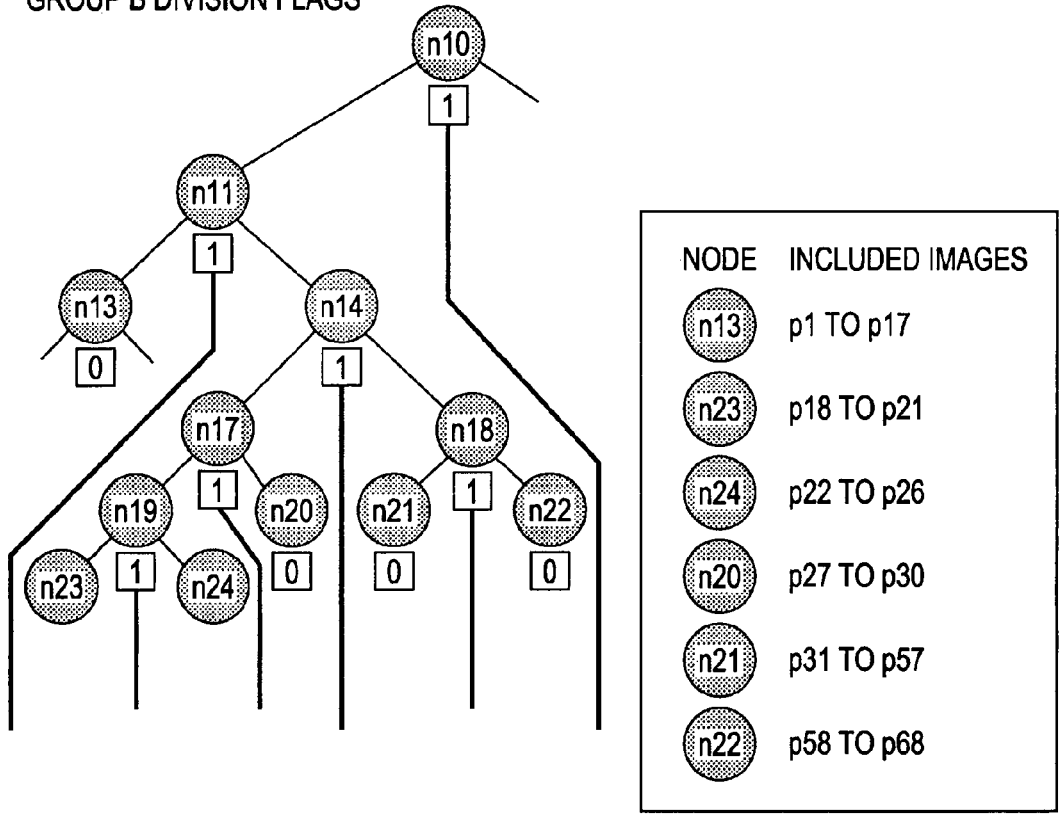
FIG. 30 is a diagram illustrating examples of the settings of group B division flags.

FIG. 30 is a diagram illustrating setting examples of group B division flags.

With the example shown in FIG. 30, a node n10 which is a node closest to the root node is connected with a node n11 as a left child node, and a node n11 is connected with nodes n13 and n14 as left and right child nodes respectively. Also, the node n14 is connected with nodes n17 and n18 as left and right child nodes respectively, and the node n17 is connected with nodes n19 and n20 as left and right child nodes respectively. Further, the node n18 is connected with nodes n21 and n22 as left and right child nodes respectively, and the node n19 is connected with nodes n23 and n24 as left and right child nodes respectively.

Also, with the example shown in FIG. 30, of these nodes, a value of 1 is set to each of the nodes n10, n11, n14, n17, n18, and n19 as a group B division flag, and with these node portions as boundaries, clusters are divided, such as shown with solid lines.

Now, as shown at the right side of FIG. 30, the node n13 is a node including images p1 through p17, and the node n23 is a node including images p18 through p21. Also, the node n24 is a node including images p22 through p26, and the node n20 is a node including images p27 through p30. The node n21 is a node including images p31 through p57, and the node n22 is a node including images p58 through p68.

Figure 31:
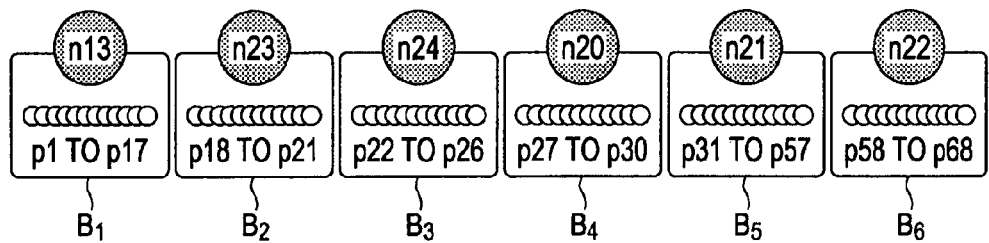
FIG. 31 is a diagram illustrating the result of clustering based on the group B division flags.

Accordingly, in the event that clusters are divided with the node portions of which the value of a group B division flag is set to 1 as boundaries, the images p1 through p68 of the images p1 through p100 to be subjected to clustering are divided into respective clusters (sub-event clusters B) such as shown in FIG. 31.

Specifically, a cluster $B_1$ is made up of the images p1 through p17 included in the node n13, and a cluster $B_2$ is made up of the images p18 through p21 included in the node n23.

Also, a cluster $B_3$ is made up of the images p22 through p26 included in the node n24, and a cluster $B_4$ is made up of the images p27 through p30 included in the node n20. Further, a cluster $B_5$ is made up of the images p31 through p57 included in the node n21, and a cluster $B_6$ is made up of the images p58 through p68 included in the node n22.

Clustering based on the grouping condition B is thus performed, and information representing which range of images each cluster stipulated with the grouping condition B includes, information representing to which cluster each image belongs, and the like are obtained as the clustering results based on the grouping condition B. The obtained the clustering results are output to the contents DB 34, and recorded.

Figure 32:
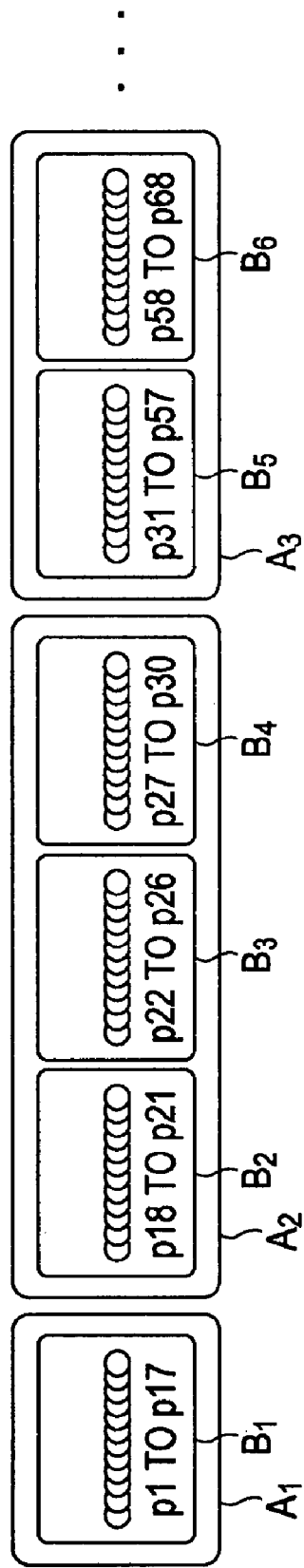
FIG. 32 is a diagram illustrating a nesting relation of clusters.

FIG. 32 is a diagram illustrating the clustering results based on the grouping condition A (FIG. 29), and the clustering results based on the grouping condition B (FIG. 31) in an overlapped manner.

As shown in FIG. 32, in the event that grouping is performed based on multiple grouping conditions, clusters serving as the clustering results have nesting relations.

With the example shown in FIG. 32, a cluster $A_1$ and a cluster $B_1$ are clusters including the same range of images, and clusters $B_2$ through $B_4$ are included in a cluster $A_2$. Also, clusters $B_5$ and $B_6$ are included in a cluster $A_3$.

In the event that each cluster has a relation such as shown in FIG. 32, for example, each of folders representing the clusters $B_2$ through $B_4$ is displayed as a hierarchically lower folder of a folder representing the cluster $A_2$, and each of folders representing the clusters $B_5$ and $B_6$ is displayed as a hierarchically lower folder of a folder representing the cluster $A_3$.

As described above, at the calculating unit 71, hierarchical clustering, and clustering based on dispersion (clustering with the average of photographing intervals of the entirety of images as reference) are performed. Thus, clustering is not simply performed such that images of which the photographing intervals are close are included in the same cluster, but performed such that images of which the photographing intervals are even are included in the same cluster.

Accordingly, clustering can be performed in a form following the user individual's subjectivity as compared with a case wherein clustering is performed such that images of which the photographing intervals are close are included in the same cluster.

In order to recognize the increments of an event the user wants, and create a cluster with the increments of event thereof, it is necessary to observe not a photographing interval itself but the frequency of photographing, a cluster obtained approaches the increments of event more by taking a portion where the frequency thereof is changed as a boundary portion. In order to know the frequency of photographing, it is necessary to statistically analyze the entirety of images photographed so far (the entirety of images to be subjected to clustering), hierarchical clustering as described above, and clustering based on dispersion are employed as a method thereof.

Also, each of images is managed in a form having a hierarchical structure, whereby the user can readily perform the rearrangement of clusters such as connecting multiple clusters to one cluster, dividing one cluster into multiple clusters, or the like by changing the threshold serving as a grouping condition. As described above, the grain size of a cluster can be made coarse, i.e., multiple clusters can be connected to one cluster by increasing the threshold, and conversely, the grain size of a cluster can be made fine, i.e., one cluster can be divided into multiple clusters by decreasing the threshold.

Thus, for example, when an image is observed with slide show playback, jumps can be performed in increments of events (in increments of event clusters), and jumps can be performed in increments of sub-events (in increments of sub-event clusters) by dividing an event into sub-events, as with so-called chapter jumping when watching a DVD video.

Further, a grouping condition can be set without considering the individual difference of photographing styles by clustering being performed with the average of photographing intervals of the entirety of images as reference. That is to say, even if the user is a person having an infrequent photographing style, or a person having a frequent photographing style, it is not necessary to set an individual grouping condition.

For example, in the event that images photographed within not greater than 30 minutes are taken as the images included in the same cluster, upon an interval of 30 minutes or longer having been provided since the previous image was photographed, the previous photographed image and the next photographed image are each taken as images of a different cluster, so when the user is a person having a photographing style who performs photographing infrequently (when the user is a person having a photographing style of providing an interval of 30 minutes or longer), images photographed during a travel are taken as images of a different cluster one at a time.

On the other hand, if the setting of the time interval which becomes reference of clustering is set too long, such that images photographed during one day are taken as the images of the same cluster, in spite of having taken a photograph in events which are completely different in the morning and afternoon, all of the photographed images are unintentionally taken as the images of the same cluster. Performing clustering with the average of the photographing intervals of the entirety of images as reference enables clustering in a form of following the photographing style of the user individual, whereby such an adverse effect can be prevented.

Figure 33:
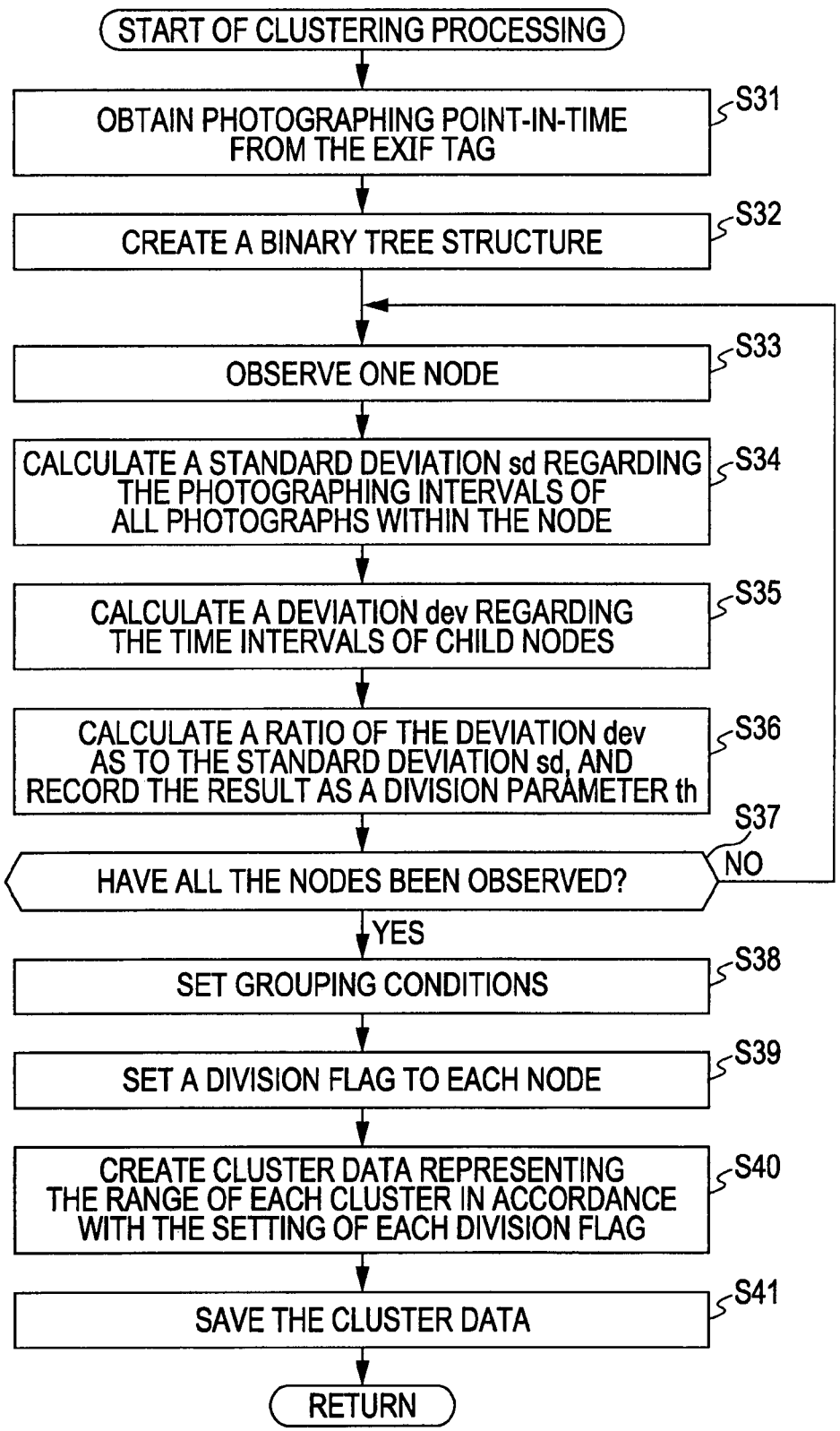
FIG. 33 is a flowchart describing clustering processing.

Next, description will be made regarding the processing of the image processing apparatus 1 shown in FIG. 16, which generates cluster data, with reference to the flowchart shown in FIG. 33. That is to say, description will be made regarding the details of the clustering processing to be executed in step S12 of FIG. 3.

In step S11 (FIG. 3), an EXIF tag, which is correlated with still images within a folder to be subjected to clustering of the still image DB 31, is read out by the tag reading unit 201. Information relating to the photographed date and time of a moving image stored in the moving image DB 32 is read out as necessary.

In step S31, the tag reading unit 201 obtains photographing point-in-time from the EXIF tag of a photographed image, and outputs the obtained photographing point-in-time to the calculating unit 71. That is to say, this example illustrates an example in the case of clustering being performed each time one image is photographed.

In step S32, the clustering unit 91 of the calculating unit 71 creates a binary tree structure made up of the entirety of images to be subjected to clustering based on the photographing point-in-time supplied from the tag reading unit 201, and the cluster data recorded in the contents DB 34, as described with reference to FIGS. 17 through 25.

In step S33, the hierarchy determining unit 92 observes one node of a predetermined hierarchy of the binary tree structure, proceeds to step S34, and calculates the standard deviation sd of the time intervals of photographing points-in-time of all the images within the node of interest.

In step S35, the hierarchy determining unit 92 calculates the deviation dev of the time interval between child nodes of which the parent node is the node of interest.

In step S36, the hierarchy determining unit 92 calculates the ratio of the deviation calculated in step S35 as to the standard deviation sd calculated in step S34, and records the calculated ratio in the node of interest as the division parameter th.

The hierarchy determining unit 92 determines in step S37 whether or not all of the nodes of the binary tree structure have been observed, and in the event that all of the nodes have not been observed, returns to step S33, switches a node to be observed, and repeats the subsequent processing.

On the other hand, in the event that the hierarchy determining unit 92 determines in step S37 that all of the nodes of the binary tree structure have been observed, proceeds to step S38, and sets the threshold serving as a grouping condition. In the event of obtaining a cluster having a different grain size with the same image as an object, multiple grouping conditions are set here.

In step S39, the hierarchy determining unit 92 compares the threshold serving as the grouping condition set in step S38, and the division parameter th set to each node, for example, sets a division flag having a value of 1 to a node of which the division parameter th exceeds the threshold, and sets a division flag having a value of 0 to a node of which the division parameter th does not exceed the threshold. In the event that multiple grouping conditions are set, the setting of the division parameter is performed as to each grouping condition.

In step S40, the hierarchy determining unit 92 observes each node of the binary tree structure in ascending order, divides clusters with a node of which the division flag is set to a value of 1 as a boundary, thereby creating cluster data representing each cluster range.

In step S41, the hierarchy determining unit 92 saves the created cluster data in the contents DB 34, and ends the processing.

Clustering is thus performed.

Such clustering is performed so as to obtain the final results depending on a placement template where the maximum images are disposed, of the placement templates prepared as placement templates. That is to say, in this case, the placement template where five images are disposed, such as shown in FIG. 9, is the placement template where the maximum images are disposed, so the above-mentioned clustering processing is performed such that the number of images included in one group is not greater than five.

Processing Relating to Selection and Setting of Placement Template

Next, description will be made regarding processing when a placement template is selected based on the clustering results. That is to say, description will be added regarding the details of placement template setting processing executed in step S14 shown in FIG. 3.

As described with reference to FIGS. 5 through 9 regarding a placement template, a placement template is a template when one through five images are disposed in a predetermined position with a predetermined size within one page.

Figure 34:
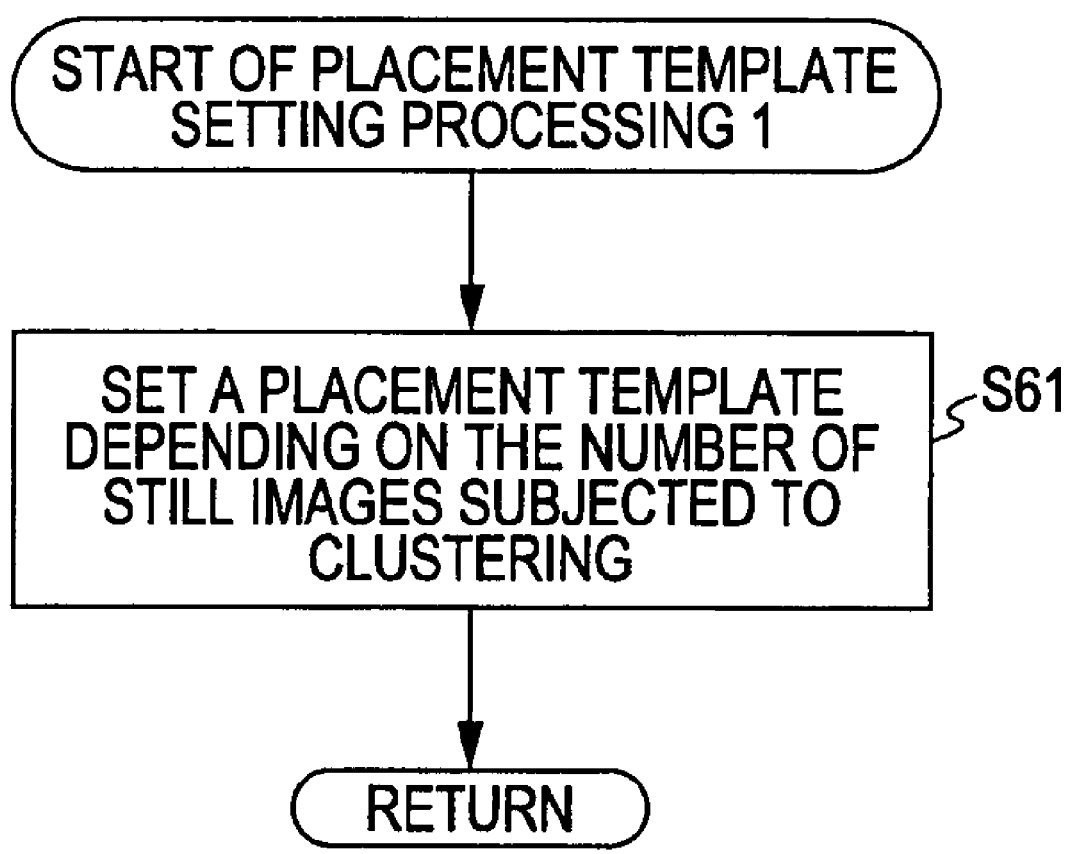
FIG. 34 is a flowchart describing the setting of a placement template.

FIG. 34 is a flowchart describing the details of the placement template setting processing executed in step S14. In step S61, the template setting unit 72 (FIG. 2) sets a placement template group in accordance with the number of still images subjected to clustering.

Let us say that as the results of the clustering processing thus executed, for example, grouping such as shown in FIG. 35 has been performed. A group 1 includes three images photographed on March 1, a group 2 includes two images photographed on March 2, a group 3 includes three images photographed on March 3, a group 4 includes two images photographed on March 3, a group 5 includes five images photographed on March 4, and a group 6 includes one image photographed on March 4 and four images photographed on March 5.

According to the above-mentioned clustering method, for example, the number of images photographed on March 3 is five, but these images are divided into the group 3 and group 4. Thus, even with an image group photographed on the same day, in the event that the photographed time of an image is apart from the photographed time of another image, these images are divided into a different group. In the event that the photographed time of an image is apart from the photographed time of another image, there is a high possibility that these images are photographed at different scenes (different events). Also, even with the same event, there is a great possibility that these images are photographed at different scenes.

Also, the group 6 includes one image photographed on March 4 and four images photographed on March 5. Thus, even with images having different dates, when determination is made that there is a consecutive relation in time, these images are classified as the same group. When there is a consecutive relation in photographed time, there is a great possibility that these images are photographed at the same scene (same event).

The images classified into the same group are displayed on the same page. It is desirable for the images displayed on the same page to have relationship, or a consecutive relation. As described above, the images seeming to have relationship are classified into the same group, so the images displayed on the same page are images of which the relationship is high.

The example shown in FIG. 35 is a case wherein the images photographed on from March 1 to March 5 are managed in a predetermined folder, so let us say that images included in one group are images photographed within a relatively short time. For example, this case is a case wherein one photograph is taken for every month, and consequently 12 photographs are included in a predetermined folder, and in the event that clustering is performed with the above-mentioned clustering method, though depending on a condition when clustering thereof, four groups are created, and images are classified such that one group includes three images. In other words, the images are classified for every season.

Thus, the photographing point-in-time of an image included in one group may be in the case of within a relatively short time, or in the case of within a separated time. However, let us say that images within one group have some sort of relationship or a consecutive relation.

Thus, images classified into each group following the clustering being performed have a high relationship, so are arranged to be displayed on the same page. In order to display these on the same page, a placement template is selected depending on the number of images managed within a predetermined group.

For example, with reference to FIG. 35, the group 1 includes the three images, a placement template group to be set to the group 1 is any one placement template 133 of the placement templates 133-1 through 133-3 (FIG. 7).

Also, the group 5 includes the five images, a placement template group to be set to the group 5 is any one placement template 136 of the placement templates 135-1 through 135-3 (FIG. 9).

Thus, a placement template group is selected with the number of images included in a group to be processed, and further one placement template is selected and set from the placement template group thereof.

With reference to FIG. 9 again, the three placement templates of the placement templates 135-1 through 135-3 are prepared as placement templates arranged to dispose five images. In the event that five images are included within a group to be processed, one placement template is selected from the placement templates 135-1 through 135-3, but the selection thereof is performed in accordance with a predetermined condition.

For example, it can be conceived to select a placement template at random. Even in the event of selecting a placement template at random, performing control so as not to select the same placement template consecutively makes it possible to offer an album which is rich in variety to a user.

Also, for example, placement templates may be selected in order. For example, placement templates may be selected in a predetermined order, such that following the placement template 135-1 being selected, the placement template 135-2 is selected.

Also, as described below, a template may be selected based on the photographing points-in-time of images within a group. Description will be made regarding another processing of the placement template setting processing executed in step S14 (FIG. 3) with reference to the flowchart shown in FIG. 36.

The template setting unit 72 sets a placement template depending on the number of still images subjected to clustering, and the photographing interval thereof.

Images are subjected to the clustering processing, whereby the images are classified into multiple groups as shown in FIG. 35 for example, and a state is provided wherein one or more images are included within each group. When comparing the photographing points-in-time of images within a group, as described above, the images are photographed within time having a consecutive relation.

For example, with reference to FIG. 35 again, the group 1 includes the three images, but with the photographing points-in-time of the three images thereof are "0:10", "0:12", and "0:13" on March 1 respectively. Also, the group 3 includes the three images, but with the photographing points-in-time of the three images thereof are "3:03", "3:43", and "4:03" on March 3 respectively.

The three images included in the group 1 are images photographed in three minutes, but the three images included in the group 3 are images photographed in one minute. Thus, even in the event that the number of images included in one group is the same, the difference value between the oldest photographing point-in-time and the newest photographing point-in-time differs. In other words, even in the event that the number of images included in, one group is the same, the interval of time when the images included in the group thereof were photographed (photographing interval) differs. Therefore, a placement template is arranged to be selected depending on the photographing interval between images.

An arrangement is made here wherein when the photographing interval between images is short, a placement template where images are disposed so as to allow the user to recognize (understand intuitively) this situation is selected, and when the photographing interval between images is long, a placement template where images are disposed so as to allow the user to recognize (understand intuitively) this situation is selected.

Figure 37:
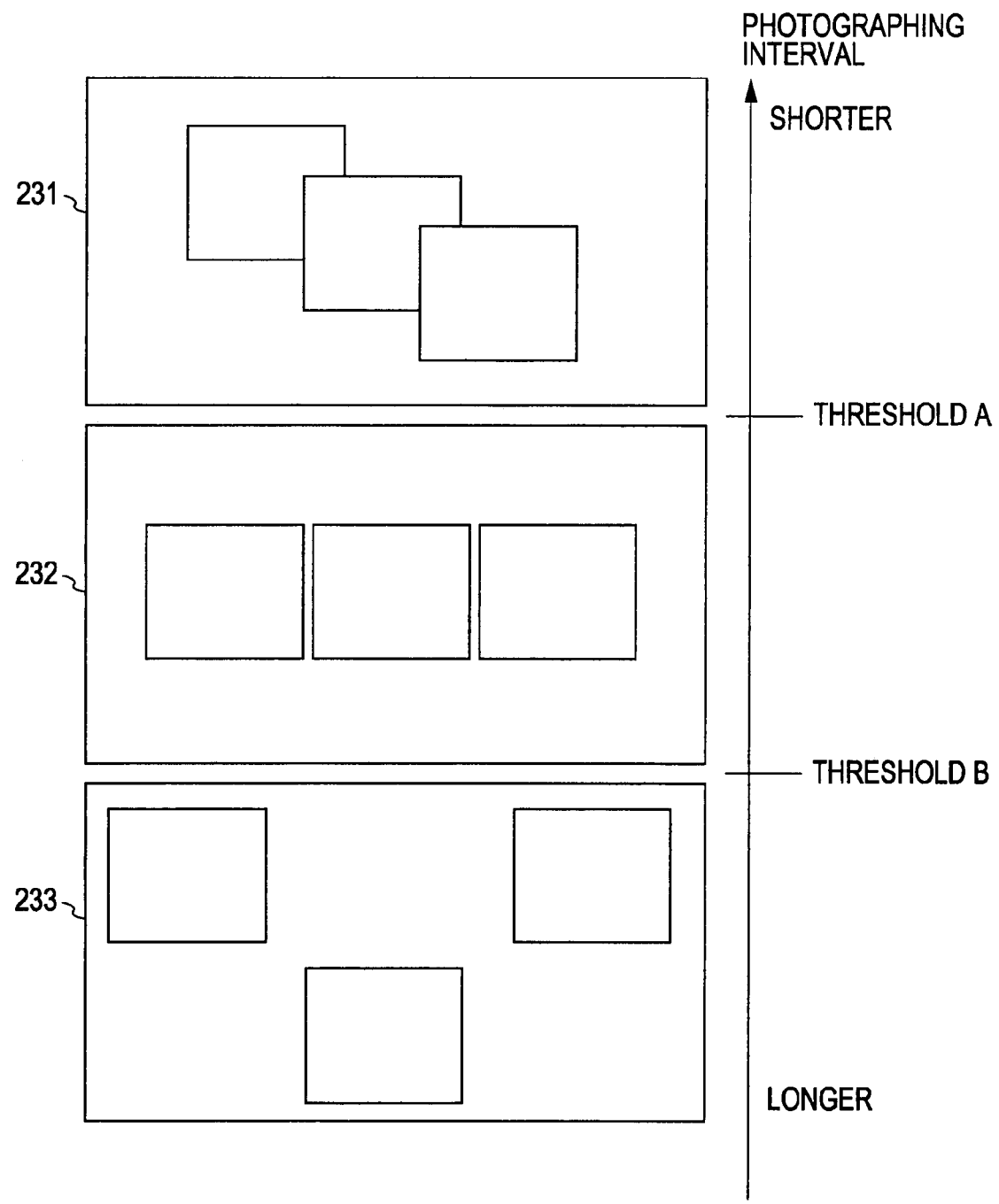
FIG. 37 is a diagram describing a relation between a photographing interval and a placement template.
Figure 38:
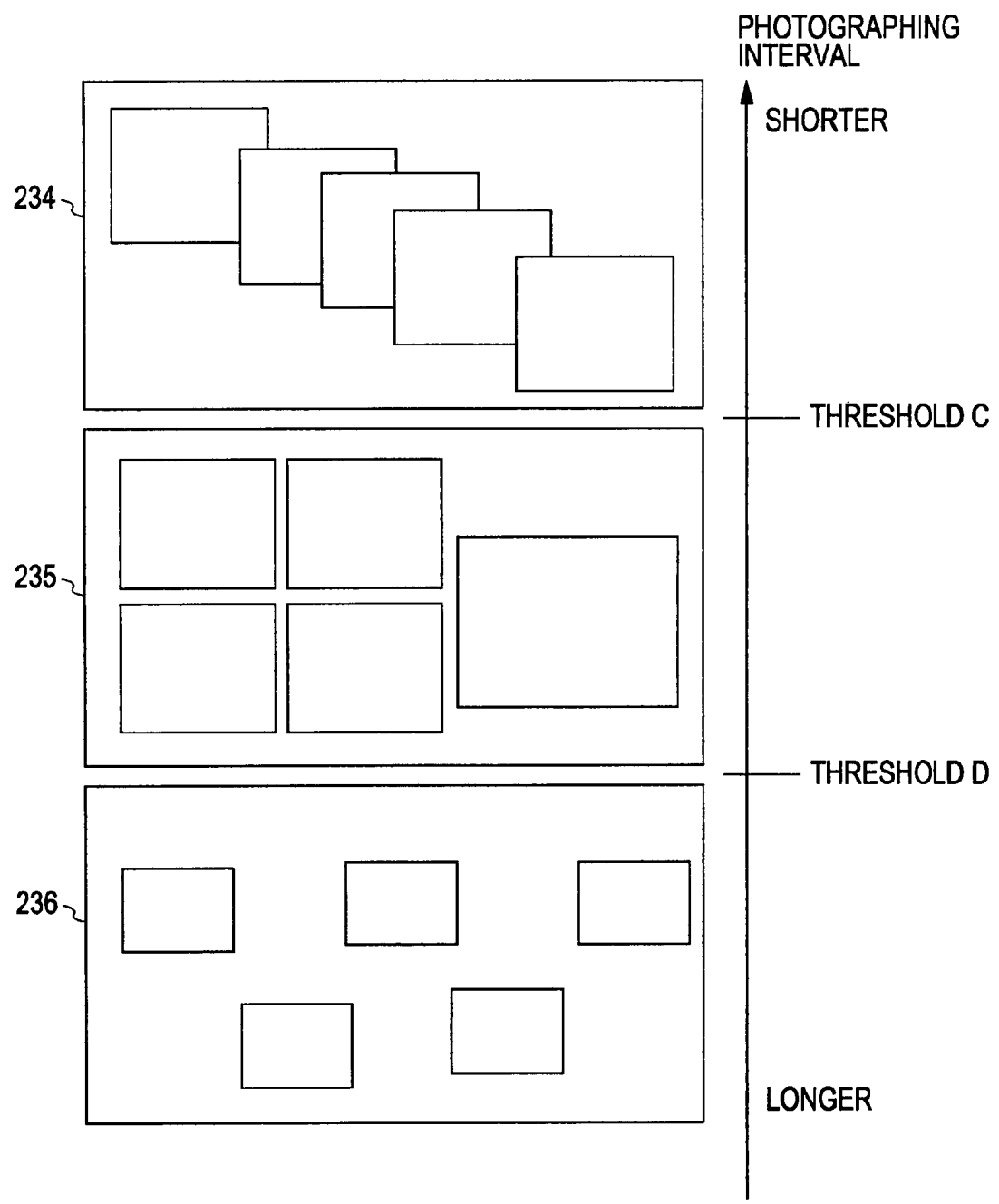
FIG. 38 is a diagram describing a relation between a photographing interval and a placement template.

A specific example is given and explained about such a selection with reference to FIGS. 37 and 38. FIG. 37 illustrates placement templates when three images are disposed, and FIG. 38 illustrates placement templates when five images are disposed. Note that the placement templates for three images shown in FIG. 37 illustrate different examples from the placement template for three images 133 shown in FIG. 7, and the placement templates for five images shown in FIG. 38 illustrate different examples from the placement template for five images 135 shown in FIG. 9.

The placement template 231 shown in FIG. 37 is a placement template to be set when the photographing interval is shorter than that of the placement template 232, and the placement template 232 is a placement template to be set when the photographing interval is shorter than that of the placement template 233.

That is to say, in this case, the placement template 231 is a placement template to be set when determination is made that the photographing interval is the shortest. As shown in FIG. 37, with the placement template 231, images are arranged to be disposed in a form where each of the images are overlapped to express that the photographing interval is short. Thus, an image itself is disposed close to another image, thereby enabling display so as to allow the user to recognize that the photographing interval is short.

On the other hand, in this case, the placement template 233 is a placement template to be set when determination is made that the photographing interval is the longest, but as shown in FIG. 37, in order to express that the photographing interval is long, each image is arranged to be disposed so as not to be overlapped, so as to be disposed apart, and also so as not to be arrayed on a straight line. Thus, each image itself is disposed apart, thereby enabling display so as to allow the user to recognize that the photographing interval is long.

The placement templates 234, 235, and 236 shown in FIG. 38 where five images are disposed are also the same. That is to say, in this case, the placement template 234 is a placement template to be set when determination is made that the photographing interval is the shortest, and the placement template 236 is a placement template to be set when determination is made that the photographing interval is the longest.

As shown in FIG. 38, the placement template 234 is a placement template which enables each of five images to be disposed in an overlapped manner to express that the photographing interval is short, as with the placement template 231 (FIG. 37). Also, the placement template 236 is a placement template which enables each of five images to be disposed so as not to be overlapped, so as to be disposed apart, and also so as not to be arrayed on a straight line to express that the photographing interval is long, as with the placement template 233 (FIG. 37).

Thus, an arrangement is made wherein the photographing interval between images is expressed with the placement of an image, and a placement template is selected depending on the photographing interval.

Description will be made again with reference to FIG. 37. As shown in FIG. 37, a threshold A and a threshold B are provided to select one placement template of the placement templates 231, 232, and 233, the placement template 231 is selected when the photographing interval is below the threshold A, the placement template 232 is selected when the photographing interval is not less than the threshold A and also not more than the threshold B, and the placement template 233 is selected when the photographing interval is above the threshold B.

Thus, thresholds relating to photographing time are provided, and a placement template is selected by comparing the photographing interval with the thresholds.

Similarly, a threshold C and a threshold D are provided to select one placement template of the placement templates 234, 235, and 236 shown in FIG. 38 which enables five images to be disposed. In this case, the placement template 234 is selected when the photographing interval is below the threshold C, the placement template 235 is selected when the photographing interval is not less than the threshold C and also not more than the threshold D, and the placement template 236 is selected when the photographing interval is above the threshold D.

Let us say that the threshold A, threshold B, threshold C and threshold D are each different values. Also, let us say that thresholds to which the same value can be set may be the same value.

For example, the threshold A and the threshold C are both thresholds to be employed when determination is made whether to select the placement template 231 (234) to be selected when determining that the photographing interval is the shortest, so may be set to the same value, or may be set to different values since a placement template to be selected differs. A value which enables an appropriate placement template to be appropriately selected may be set to such a threshold at a design stage or the like, or by the setting of the user.

Thus, a threshold and a photographing interval are compared, thereby setting a placement template. Let us say that the value of the photographing interval when a threshold and a photographing interval are compared is the value of the difference between the oldest photographing point-in-time and the newest photographing point-in-time, of the photographing points-in-time of images within a group to be processed.

Alternatively, an arrangement may be made wherein the difference between adjacent points-in-time when the photographing points-in-time of images within a group to be processed are arrayed in point-in-time order is calculated, and further the mean value of the difference thereof is calculated, and then the calculated mean value is employed as the value of the photographing interval.

Alternatively, an arrangement may be made wherein the difference between adjacent points-in-time when the photographing points-in-time of images within a group to be processed are arrayed in point-in-time order is calculated, and the smallest value of the difference is employed as the value of the photographing interval, or the greatest value of the difference is employed as the value of the photographing interval.

It is needless to say that the value of a photographing interval to be compared with a threshold may be determined using another method.

Also, when observing one threshold, the threshold may be a fixed value, or may be a variable value. For example, the threshold A may be taken as a fixed value so as to be set with the same value constantly. Also, the threshold A may be taken as a variable value so as to be set each time an image within one folder is processed.

In the event that a threshold is taken as a variable value, for example, the threshold may be set at the point of images within one folder being classified into multiple groups such as shown in FIG. 35.

In the event that a threshold is taken as a fixed value, for example, when images photographed in one year are classified, there is a high possibility that the photographing points-in-time of images within each group are relatively become long, and accordingly, there is a high possibility that the placement template 233 or placement template 236 to be selected when a photographing interval is long is selected.

If the same placement template is consecutively selected, a page configuration is rich in variety may not be provided. Also, consecutively selecting the same placement template makes it meaningless to prepare multiple placement templates, and consequently, the advantage obtained by preparing multiple placement templates fails to be obtained.

Accordingly, in order to prevent such a situation, even in the event that a threshold is taken as a fixed value, it is desirable to add some sort of processing depending on the photographing interval of an image within a folder to be processed.

Also, in the event that a threshold is taken as a variable value, an arrangement may be made wherein the difference between the oldest photographing point-in-time and the newest photographing point-in-time is calculated for each of classified multiple groups, and a threshold is determined using the difference for each group thereof. According to such an arrangement, for example, as shown in FIG. 35, a threshold to be employed when images photographed in five days are classified, and a threshold to be employed when images photographed in one year are classified (not shown) differs, whereby the more exact setting of a placement template can be performed.

In other words, taking a threshold as a variable value enables the same placement template setting to be performed even when an image group to be processed is an image group photographed over a short period, and even when an image group to be processed is an image group photographed over a long period.

Figure 36:
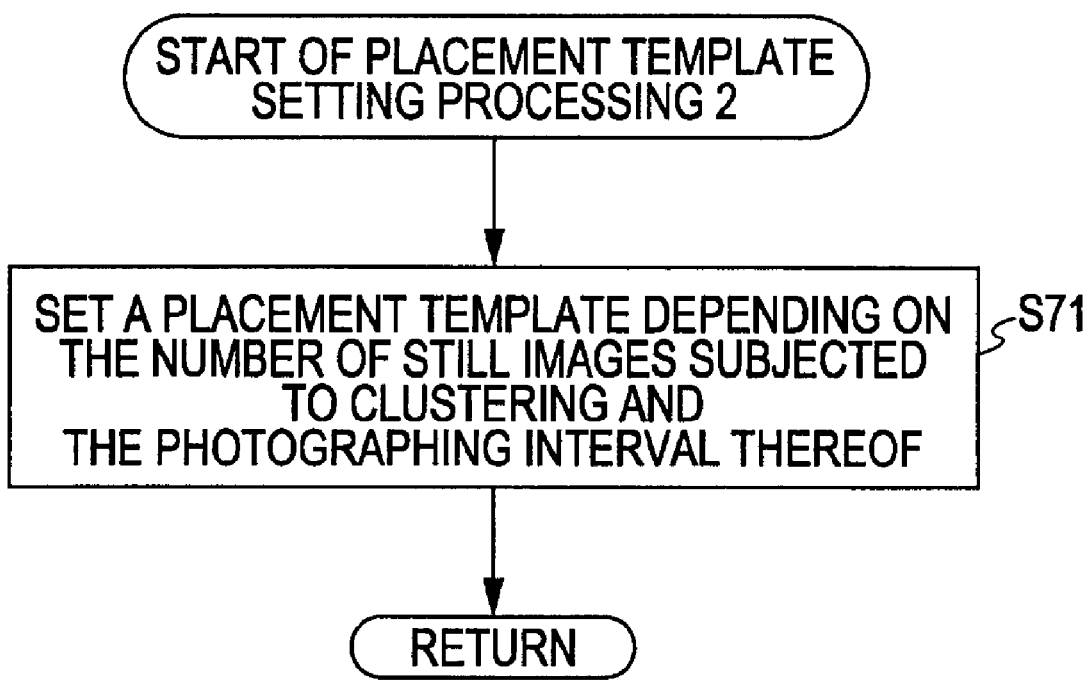
FIG. 36 is a flowchart describing the setting of a placement template.
Figure 39:
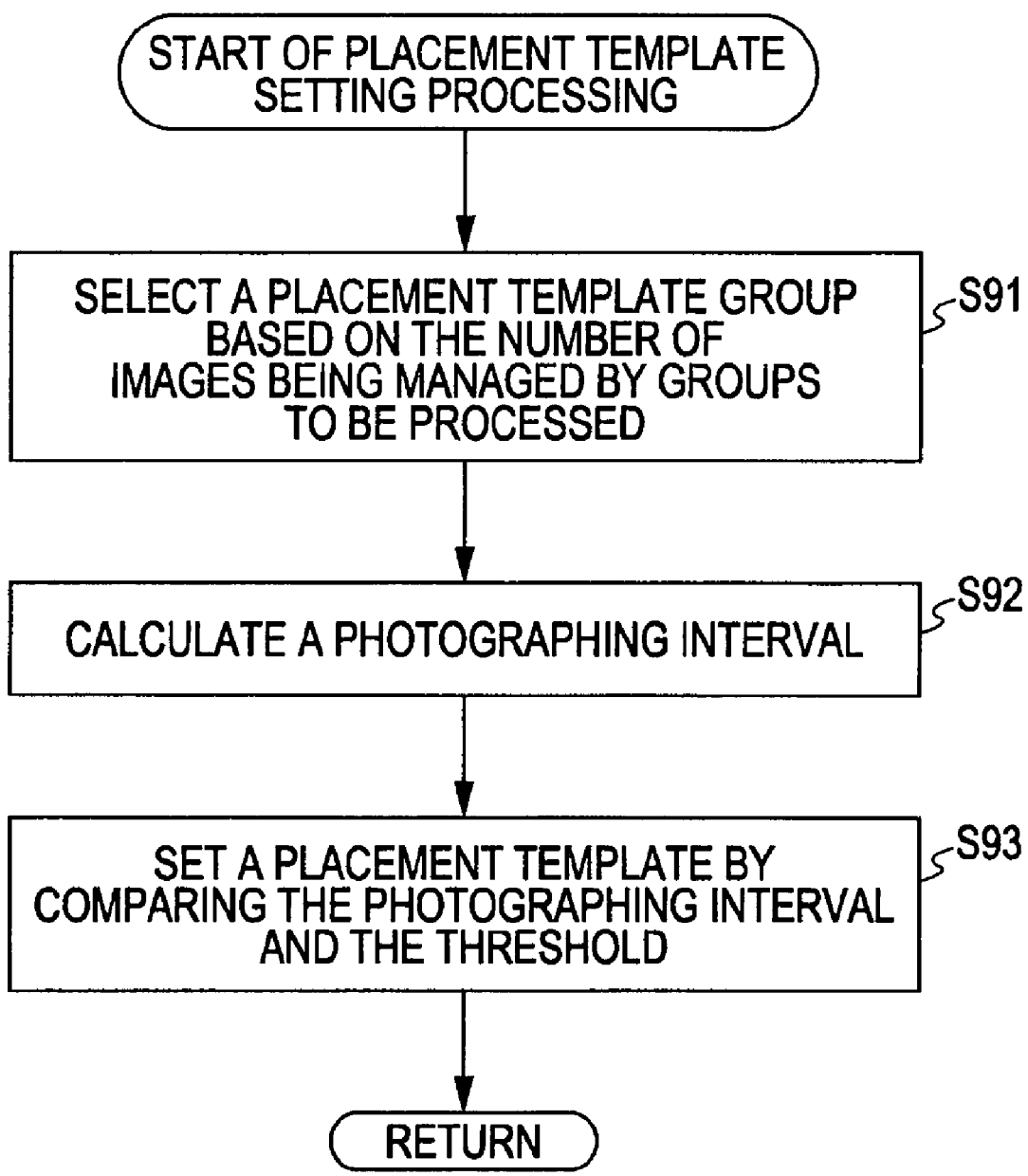
FIG. 39 is a flowchart describing the setting of a placement template.

Thus, the processing in step S71 in the flowchart shown in FIG. 36 is performed by comparing a photographing interval and a threshold. The details of the processing in step S71 have been described above, but description will be added simply with reference to the flowchart shown in FIG. 39 again.

In step S91, the number of images managed within a group to be processed is recognized, and a placement template group where images equivalent to the number thereof are disposed is selected. For example, in the event that four images are included in the group to be processed, a placement template group including the placement template 134-1 through 134-3 (FIG. 8) is selected.

In step S92, the photographing interval of the group to be processed is calculated. As for the photographing interval, as described above, a value obtained by calculating the difference, mean value, and so forth is employed.

In step S93, one placement template is selected from multiple placement templates included in the placement template group selected in step S91. This selection is performed, as described above, by comparing a photographing interval and a threshold. Subsequently, the selected placement template is set as the placement template as to the group to be processed.

The processing in step S93 is performed, as described above, by determining whether or not the photographing interval is equal to or greater than the threshold which is set. Also, when the threshold is taken as a variable value, for example, processing wherein a threshold is set is executed as processing between step S92 and step S93.

Such processing is performed, whereby a placement template as to each group shown in FIG. 35 is set such as shown in FIG. 40, for example. The example shown in FIG. 40 is in a state wherein the placement templates 231 through 233 shown in FIG. 37 are prepared as a placement template group where three images are disposed, and the placement templates 234 through 236 shown in FIG. 38 are prepared as a placement template group where five images are disposed. Note that the illustration and description of a placement template group where two images are disposed will be omitted.

As shown in FIG. 40, the group 1 includes three images, so the placement template group shown in FIG. 37 is selected. Subsequently, the photographing interval between images within the group 1 is determined as below the threshold A, and as a result thereof, the placement template 231 is set.

The group 3 includes three images, so the placement template group shown in FIG. 37 is selected. Subsequently, the photographing interval between images within the group 3 is determined as equal to or greater than the threshold A and also equal to or smaller than the threshold B, and as a result thereof, the placement template 232 is set.

The group 5 includes five images, so the placement template group shown in FIG. 38 is selected. Subsequently, the photographing interval between images within the group 5 is determined as equal to or greater than the threshold C and also equal to or smaller than the threshold D, and as a result thereof, the placement template 235 is set.

The group 6 includes five images, so the placement template group shown in FIG. 38 is selected. Subsequently, the photographing interval between images within the group 6 is determined as below the threshold C, and as a result thereof, the placement template 234 is set.

Thus, a placement template is set, whereby a monotonous album, such as an arrangement wherein the same image placement continues, can be prevented from being provided to the user, and an album of which the image placements are rich in variety can be provided to the user.

Image Pasting Processing

Upon a placement template being set thus, pasting of the images within the group is performed based on the placement template thereof. That is to say, image pasting processing is executed in step S15 in the flowchart shown in FIG. 3. Description will be added regarding the image pasting processing executed in step S15.

Figure 41:
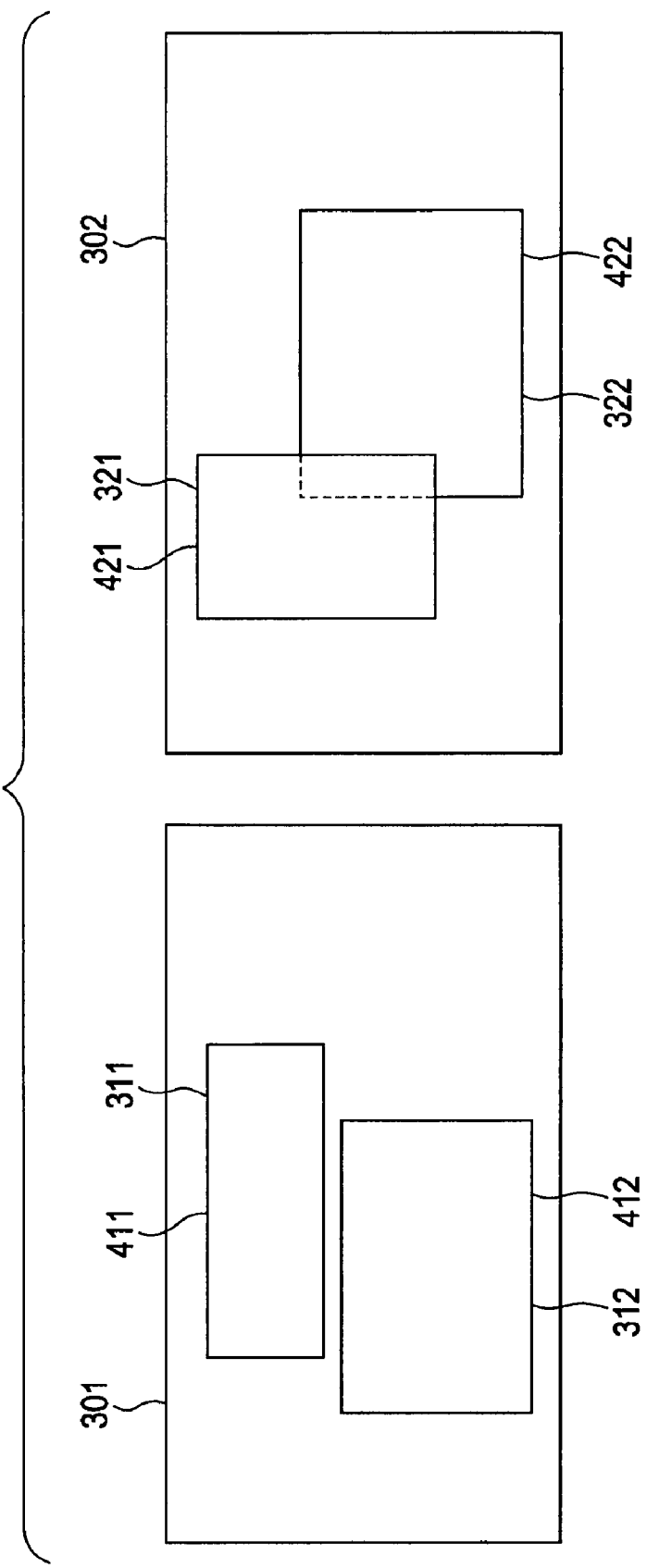
FIG. 41 is a diagram describing a relation between an aspect ratio and an image pasting region.

Now, description will be added regarding a placement template again. FIG. 41 illustrates a placement template 301 and a placement template 302. The placement template 301 and the placement template 302 are both placement templates to be employed when two images are pasted. The difference between the placement template 301 and the placement template 302 is that the placement template 301 is a placement template where images to be pasted are disposed without being overlapped, but the placement template 302 is a placement template where images to be pasted are disposed so as to be overlapped.

With the placement template 301 and the placement template 302, a region where one image is displayed is referred to as a display region. With the placement template 301, a display region 311 and a display region 312 are both squares. Also, the images managed within the group (the still images recorded in the still image DB 31) are usually squares. Accordingly, the form of the display region 311 (312) is identical to the form of an image to be displayed (the form of an image frame).

With the placement template 302, a display region 321 is a square, but a display region 322 is a hexagon. In this case, the form of the display region 322 differs from the form of a still image to be pasted. Even with such a case, a still image to be pasted is not pasted after being processed in a hexagon so as to match the form of the display region 322, but a square still image is pasted within the display region 322, and displayed.

A square shown with a dotted line in FIG. 41 (the portion overlapped with the display region 322 is illustrated with a solid line) is a region where an image is pasted. Hereafter, a region where an image is pasted is referred to as a pasted region.

Let us say that the display region 311 and a pasted region 411, the display region 312 and a pasted region 412, and the display region 321 and a pasted region 421, shown in FIG. 41, are each the same form and the same size. Accordingly, these regions are each overlapped, so only solid lines each representing a display region are described in FIG. 41.

However, as for the display region 322 and a pasted region 422, as described above, the display region 322 is a hexagon, but on the other hand, the pasted region 422 is a square. A still image to be pasted on a placement template is clipped so as to match the size of a pasted region (while the details such as a definition regarding this size and so forth will be described later, the size is based on aspect ratio).

Figure 42:
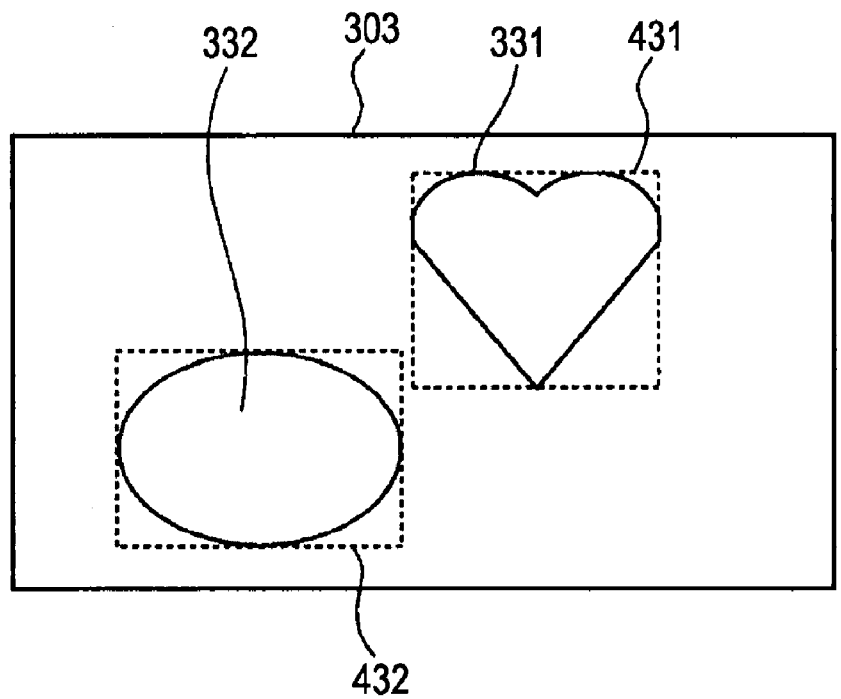
FIG. 42 is a diagram describing a relation between an aspect ratio and an image pasting region.

Further, description will be further made regarding a display region and a pasted region with reference to FIG. 42. With the placement template 303 shown in FIG. 42, a heart-shaped display region 331 and an oval display region 332 are provided as display regions. As described above, for example, even with the heart-shaped display region 331, a pasted region 431 is a square. A still image to be displayed is not clipped so as to match the heart shape of the display region 331, but is clipped so as to match the shape of the pasted region 431.

Similarly, even with an oval display region 332, a pasted region 432 is a square, and a still image to be clipped is a square having the same form as the pasted region 432.

Thus, for example, in the event that forms differ such as the display region 331 and the pasted region 431, a image is clipped in the form of the pasted region 431, and of the clipped image thereof, the portions other than the display region 331 are subjected to masking processing, whereby the image is processed so as to be displayed only within the display region 331.

Further, description will be made with reference to FIG. 43. In the event that a display region 341 is a region obliquely provided on a placement template 304, a square region including the display region 341 is taken as a pasted region 441. The display region 341 is disposed obliquely as to the placement template 304, but the form thereof is a square. Thus, in the event that even the form of the display region 341 is a square, but the display region 341 is disposed obliquely, an image is clipped with the image frame of the pasted region 441, and the portions other than the display region 341 are subjected to masking processing, whereby such as a page on which as if the image were pasted obliquely is provided to the user side.

Figure 43:
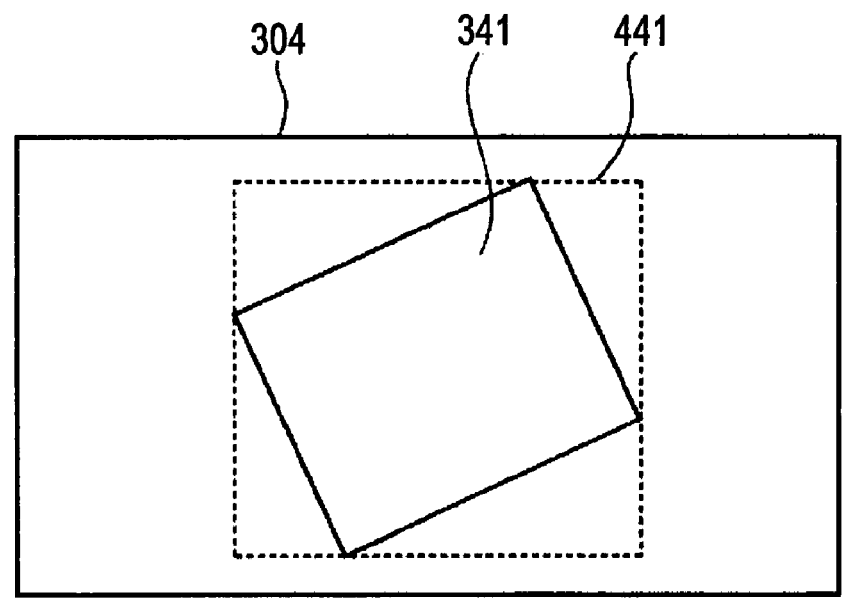
FIG. 43 is a diagram describing a relation between an aspect ratio and an image pasting region.

Note that as shown in FIG. 43, when an image is displayed on the display region 341 disposed obliquely, the same pasted region 441 as the display region 341 may be provided. If we say that the display region 341 and the pasted region 441 are the same, it is necessary to perform an image conversion wherein the image to be pasted is converted into an oblique image. In order to perform the image conversion, a great processing capability is needed, so there is a possibility that inconvenience is caused wherein just pages to which the placement template 304 such as shown in FIG. 43 is set, are displayed slowly.

In order to provide the user a page such as an image pasted obliquely without performing such an image conversion, as described above, an arrangement needs to be made wherein an image is clipped so as to match the square pasted region 441 including the size of the display region 341, the clipped image is subjected to masking processing, and the image is displayed only within the display region 341. According to such an arrangement, processing relating to display of a page can be executed using the same processing at the time of a page to which another placement template, for example, the placement template 301 (FIG. 41) is set, whereby the processing can be performed without requiring a great processing capability.

Thus, the processing is performed using the concept of two different regions of a display region and a pasted region, whereby processing capabilities relating to image display can be reduced, and also variations of an image can be provided to the user (e.g., providing a heart-shaped image such as shown in FIG. 42).

Thus, a pasted region is a square, regardless of the form of the display region.

A display region and a pasted region each have a fixed size within a placement template. A pasted region has a predetermined size, so in the event that an image to be pasted on the pasted region thereof is not the same size as the pasted region thereof, it is necessary to subject the image to some sort of processing. Description will be added regarding this processing. Note that with the above description, the term "processing" is processing referred to as "clipping of an image" and the like.

Figure 44:
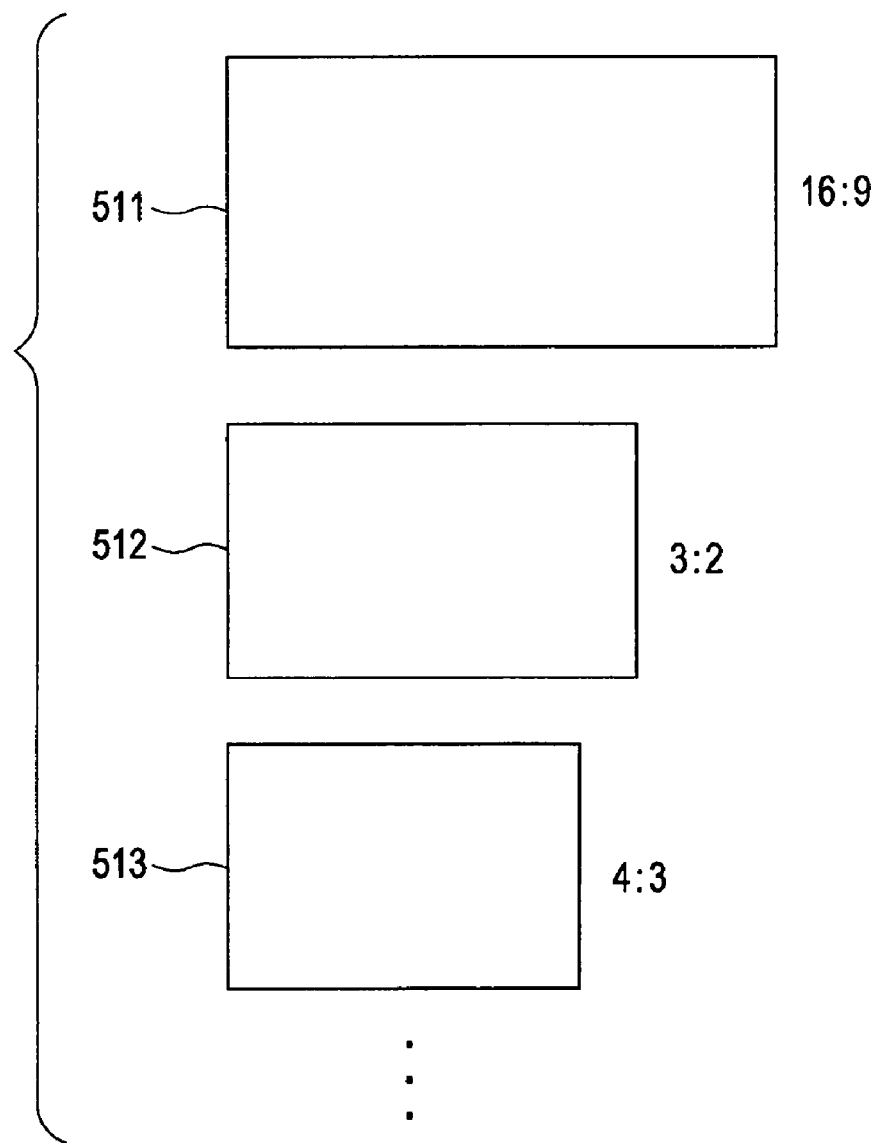
FIG. 44 is a diagram describing the aspect ratio of a still image.

The still images stored in the still image DB 31 (FIG. 2) include images including a different aspect ratio, as shown in FIG. 44. With the example shown in FIG. 44, the aspect ratio of an image 511 is "16:9", the aspect ratio of an image 512 is "3:2", and the aspect ratio of an image 513 is "4:3". Though not shown in the drawing, there is also an image having yet another aspect ratio by the user subjecting the image to processing or the like. Thus, it can be conceived that there are various aspect ratios of the still images recorded in the still image DB 31 (FIG. 2).

Figure 45:
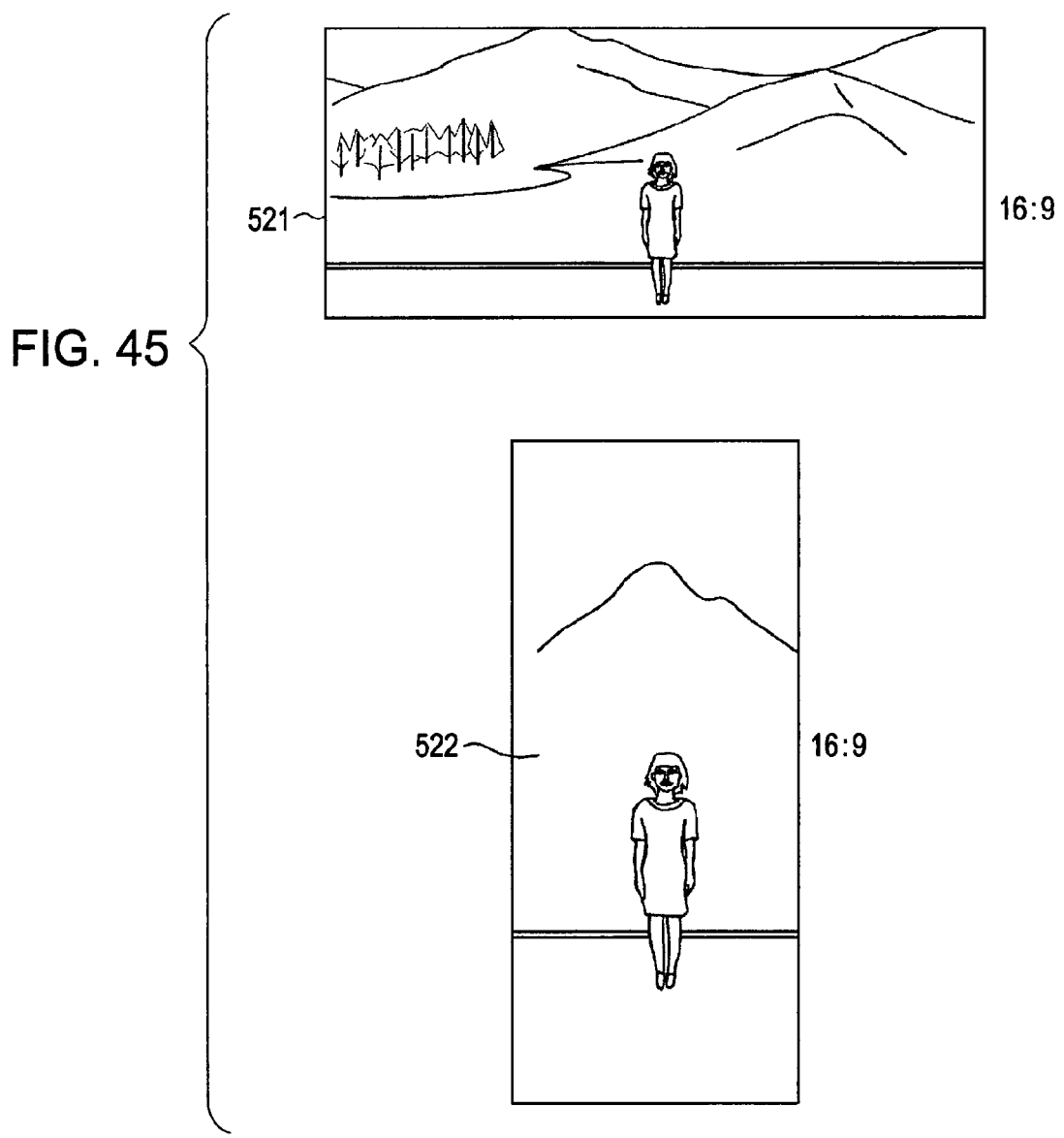
FIG. 45 is a diagram describing a vertically long still image and a horizontally long still image.

Also, images include a horizontally long image and a vertically long image. For example, as shown in FIG. 45, an image 521 and an image 522 have both an aspect ratio of "16:9", but the image 521 is a horizontally long image, and the image 522 is a vertically long image. Thus, the still images recorded in the still image DB 31 (FIG. 2) include a horizontally long image and a vertically long image (referred to as an image of which the direction differs).

An image matching the size of a pasted region is clipped from such an image of which the aspect ratio or direction differs.

Description will be made regarding clipping of an image with reference to FIG. 46. As shown in the upper diagram of FIG. 46, in the event that an image is clipped so as to have the maximum size in the form of a pasted region 411 from the image 511 of which the aspect ratio is "16:9", an image is clipped in a state in which a part of the upper side and a part of the lower side of the image 511 are cut.

The term "an image is clipped so as to have the maximum size in the form of a pasted region 411 from the image 511" means that an image is clipped from the image 511 in a state of keeping the aspect ratio of the pasted region 411, and also clipped such that the clipped image thereof includes the image 511 to the maximum extent possible.

Though description will be made later with reference to FIG. 47, when clipping an image, the size of a pasted region itself is not relevant, but the aspect ratio of a pasted region is relevant.

Figure 46:
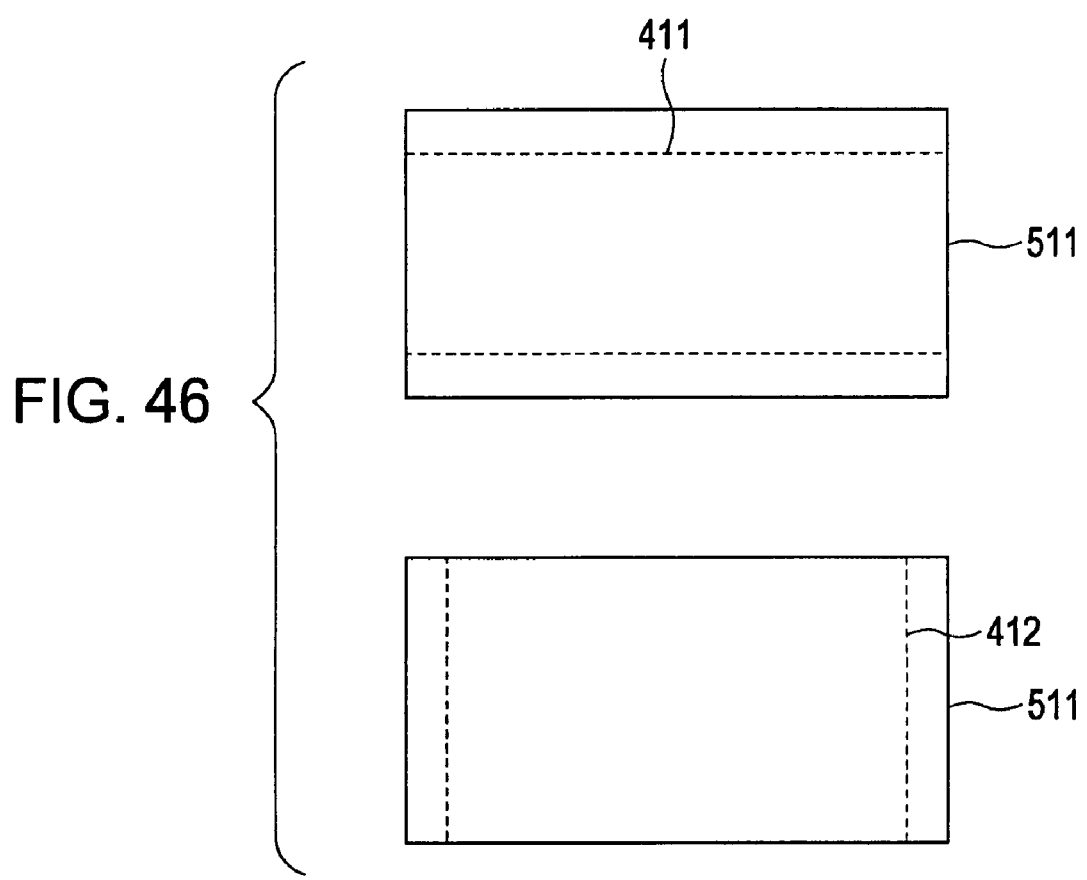
FIG. 46 is a diagram describing clipping of an image.

As shown in the lower diagram of FIG. 46, in the event that an image having the maximum size at the form of the pasted region 412 is clipped from the image 511 of which the aspect ratio is "16:9", an image is clipped in a state in which a part of the left side and a part of the right side of the image 511 are cut.

Thus, as shown in FIG. 46, even in the event that an image matching the pasted region is clipped from the same image 511, when the aspect ratio of the pasted region differs, the clipped region of the image 511 differs.

Description will be added regarding the aspect ratio of a pasted region with reference to specific numeric values.

Figure 47:
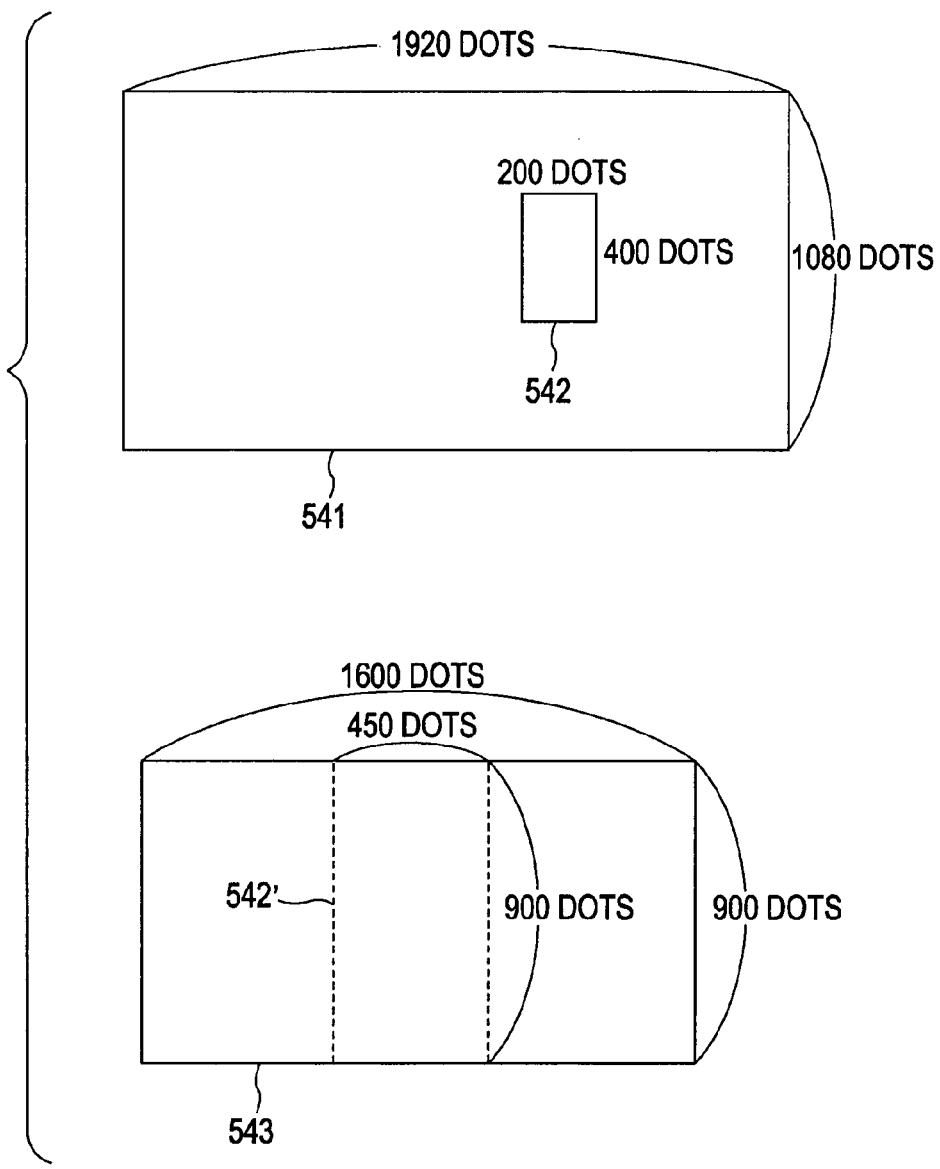
FIG. 47 is a diagram illustrating the relation between the aspect ratio of a pasted region and an image clipped region.

The upper diagram of FIG. 47 is a diagram illustrating the relation between a placement template and a pasted region, and the lower diagram of FIG. 47 is a diagram illustrating the relation between an image to be pasted on a pasted region (hereafter, referred to as an original image as appropriate) and the pasted region.

With reference to the upper diagram of FIG. 47, the horizontal length of a placement template 541 is 1920 dots, and the vertical length is 1080 dots. A pasted region 542 of which the horizontal length is 200 dots and the vertical length is 400 dots is provided on a placement template 541 having such an aspect ratio of "1920:1080", i.e., an aspect ratio of "16:9". The aspect ratio of the pasted region 542 is "200:400", i.e., "1:2".

In the event that an image to be pasted on the pasted region 542 having such an aspect ratio of "1:2" is an original image 543 such as shown in the lower diagram of FIG. 47, as shown in the lower diagram of FIG. 47, an image is clipped from the original image 543.

With the original image 543, the horizontal length is 1600 dots, and the vertical length is 900 dots. Accordingly, the aspect ratio of the original image is "16:9". The aspect ratio of the original image 543 is "16:9", and the aspect ratio of the pasted region 542 is "2:1", so it is thought that the original image 543 and the pasted region 542 have a different aspect ratio. In the event of such a different aspect ratio, control is performed so as to clip an image of the maximum size with the aspect ratio of the pasted region 542 from the original image 543.

As shown in the lower diagram of FIG. 47, it can be understood that when obtaining a region including the original image 543 to the maximum extent possible while keeping the aspect ratio of "2:1" of the pasted region 542, a region can be clipped with the horizontal length of 450 dots and the vertical length of 900 dots, and "450:900" is "2:1".

900 dots set as the vertical length are the same number of dots as the vertical length of the original image 543. That is to say, in this case, as for the vertical direction of the original image 543, the maximum region (length) can be secured.

In the event of setting the vertical direction to 900 dots, in order to maintain the aspect ratio of "1:2", the horizontal direction needs to be set to 450 dots. Accordingly, as described above, an image of "450 dots×900 dots" of which the aspect ratio is "1:2" is clipped from the original image 543.

With the example shown in FIG. 47, the size of the pasted region 542 is "200 dots×400 dots", and the size of the image to be clipped is "450 dots×900 dots". Accordingly, when comparing both regarding their sizes, the size of the pasted region 542 and the size of the image to be clipped differ.

Thus, with the present embodiment, an image having the same size as the pasted region 542 is not clipped from the original image 543, but an image having the same aspect ratio as the aspect ratio of the pasted region 542 is clipped from the original image 543.

It is needless to say that in the case of the example shown in FIG. 47, the image to be clipped is greater than the pasted region 542, so when the clipped image is pasted on the pasted region 542, the image is subjected to reduction processing and so forth, thereby pasting the image.

Incidentally, in the event that the image to be pasted is thus clipped from the original image based on the aspect ratio of the pasted region, as described with reference to FIG. 47, only a part of the original image 543 may be clipped. In other words, there may be cases wherein the entirety of the original image is not pasted on the pasted region, and only a part of the original image is pasted on the pasted region.

Figure 48:
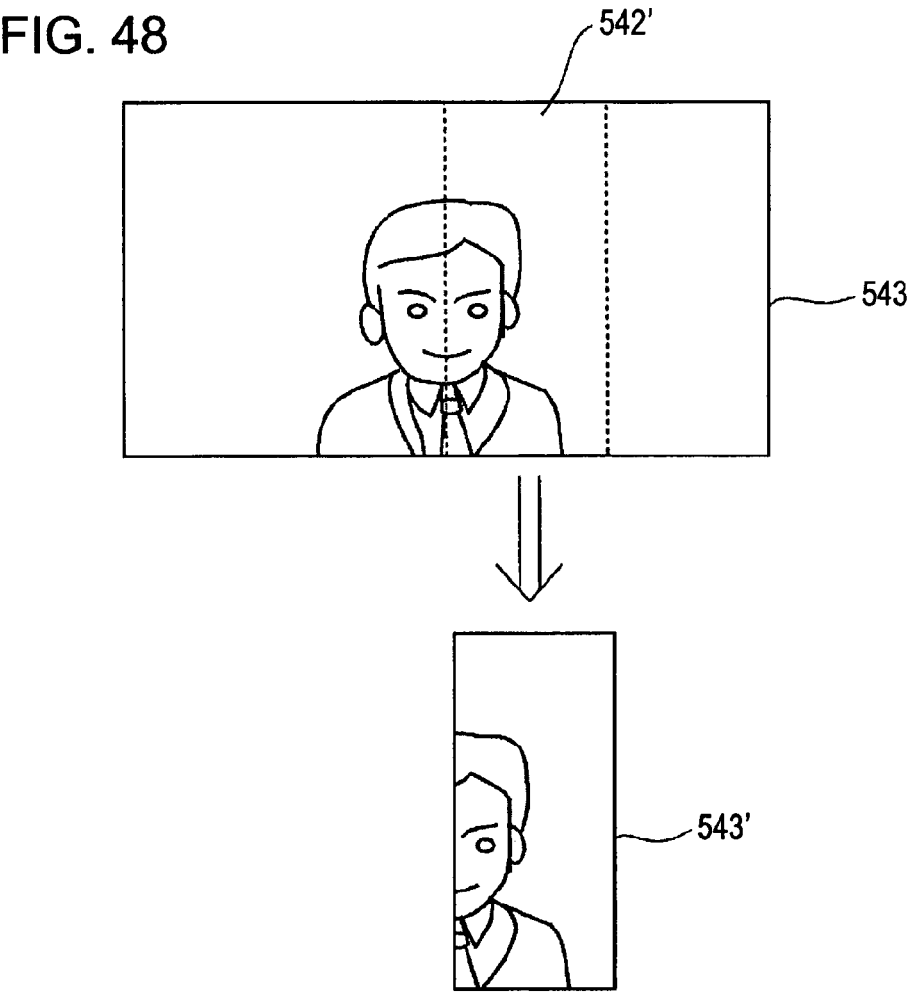
FIG. 48 is a diagram describing an inappropriate clipped region.

Thus, in the event that only a part of the original image is clipped, there is a possibility that an inappropriate image is provided to the user depending on the clipped position (region) thereof. For example, as shown in FIG. 48, in the event that an image is clipped with a pasted region 542' maintaining an aspect ratio as to the original image 543 where a human face is greatly taken, the clipped image 543' thereof becomes an image including only a part of the human face.

A photographer who photographed the original image 543 seems to have photographed the original image 543 with the intention to perform photography centered on a human face. In the event that the image 543' clipped from the original image 543 photographed under such an intention includes only a part of the human face, or in the event that an image such as including no human face at all is clipped, the clipped image does not agree with the photographer's intention, and accordingly, it can be said that such an image is an unsuitable image.

It is desirable to clip an image in a form reflecting the intention of the photographer who photographed the original image, regardless of whether the intention is to take a picture centered on a human face, or otherwise.

Accordingly, when performing clipping, i.e., when the processing arranged to paste an image on a placement template is executed, an arrangement is made wherein the image to be clipped and pasted becomes an image to which the intention of the photographer is reflected as much as possible. Description will be added regarding such processing.

Image Pasting Processing

Description will be continued further regarding the image pasting processing executed in step S15 in the flowchart shown in FIG. 3. As described above, an arrangement is made wherein clipping of an image to be displayed on a display region is performed so as to reflect the intention of the photographer. Now, description will be made regarding a case wherein processing is performed while observing a human face photographed on an image as an example.

Figure 49:
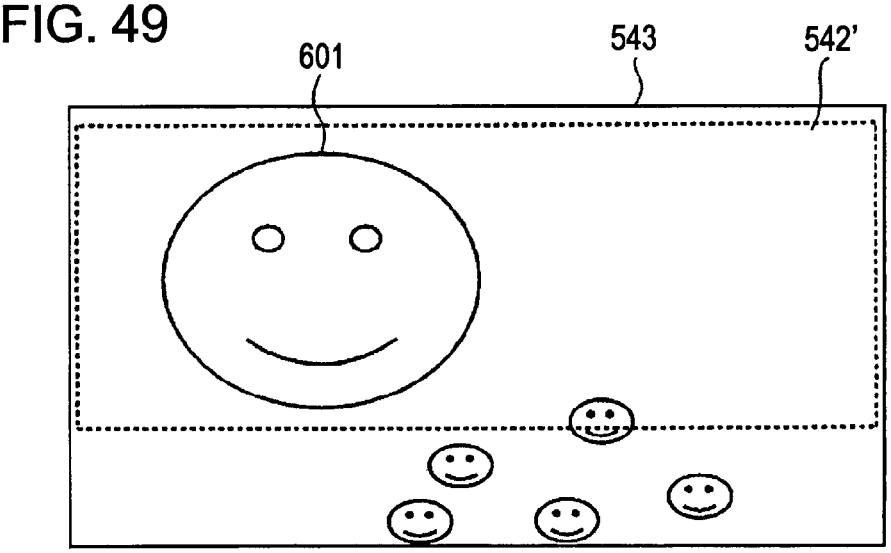
FIG. 49 is a diagram describing an algorithm relating to clipping of an image.

FIG. 49 illustrates an image where multiple faces are photographed on the original image 543. Of the multiple faces, a face 601 is greatly photographed as compared with the other faces (without reference numerals). That is to say, even with an image where multiple faces are photographed, in the event that only the face 601 is photographed in a close-up manner, it is thought that the photographer photographed the original image 543 with the intention to photograph the face 601. Accordingly, in the case of such an original image 543, the pasted region 542' is set so as to include the face 601, and the image within the pasted region 542' thereof is clipped from the original image 543.

As for an algorithm when clipping an image, an algorithm wherein a region including the face photographed most greatly within an original image is clipped is taken as an algorithm 1. In other words, the algorithm 1 is an algorithm wherein of faces having a region greater than a predetermined size within an original image, a region including a face having the greatest region is clipped.

The algorithm 1 is an algorithm suitable for a case wherein one person is fitted in a photo, or a case wherein a small group of persons are fitted in a photo.

Figure 50:
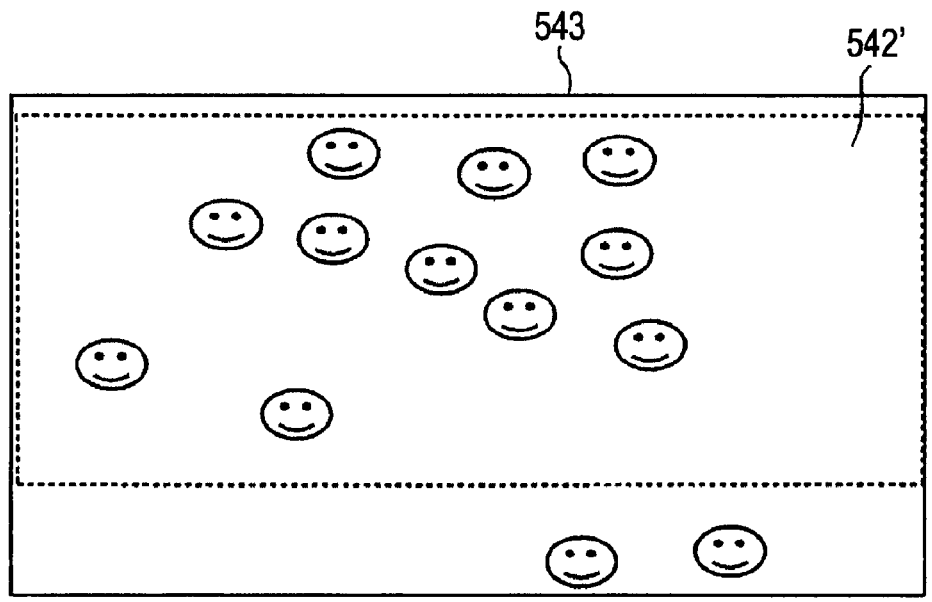
FIG. 50 is a diagram describing an algorithm relating to clipping of an image.

FIG. 50 is a diagram for making a description relating to an algorithm 2. Multiple faces (of which the reference numerals are omitted) are photographed on an original image 543 shown in FIG. 50. The original image 543 show in FIG. 50 and the original image 543 shown in FIG. 49 are both images where multiple faces are photographed, but there is a difference in that the original image 543 shown in FIG. 50 is an image including no face having a region equal to or greater than a predetermined size.

Thus, in the event that the original image 543 is an image where multiple faces are photographed, but there is no face having a region equal to or greater than a predetermined size, control is performed so as to clip a region including faces as many as possible. Such an image where multiple small faces are photographed is an image such as a group photo, and in the event of such a group photo, of the multiple faces photographed on the original image 543, it is thought that an image clipped with a region including faces as many as possible is an image matching the intention of the photographer.

The algorithm 2 is an algorithm wherein when there is no face having a region equal to or greater than a predetermined size within an original image, an image is clipped with a region including faces as many as possible from the original image. The algorithm 2 is an algorithm suitable for an image where many persons are photographed, such as a group photo or the like.

Figure 51:
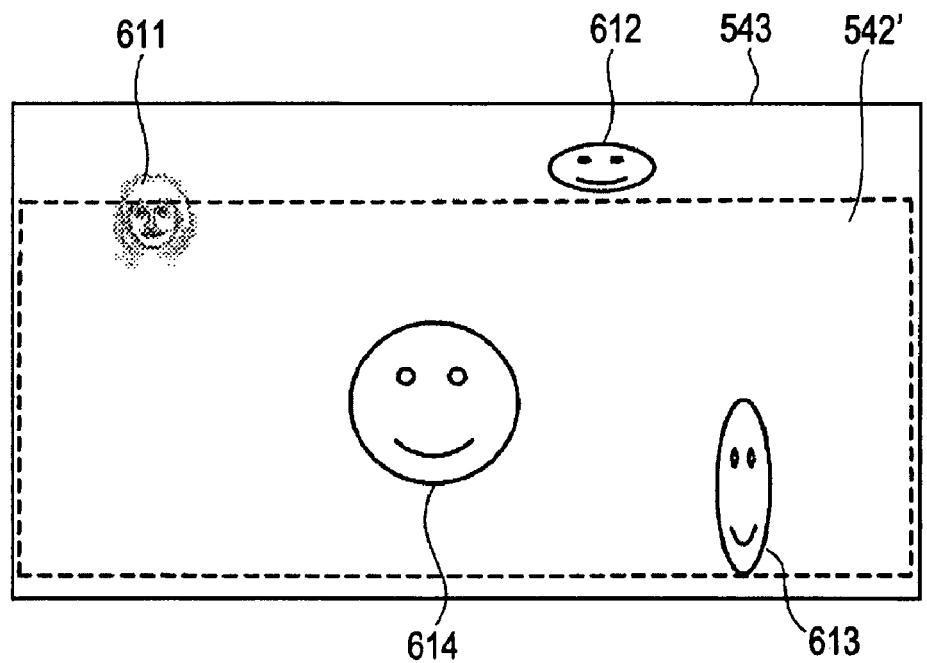
FIG. 51 is a diagram describing an algorithm relating to clipping of an image.

FIG. 51 is a diagram for making a description relating to an algorithm 3. Multiple faces are photographed on an original image 543 shown in FIG. 51. Of the faces photographed, a face 611, a face 612, and a face 613 are faces in a state of being distorted or out of focus, or a face which is a picture though recognized as a face. A face 614 is a face photographed most exactly as compared with the other faces, and accordingly is a face determined as the most appropriate face.

For example, there is an image which focuses on the face 614, but does not focus on portions including the other faces. Also, there is an image which is processed by a photographer, of which the portions other than the face 614 are distorted, or which is synthesized with another image. In the event that an image is clipped with a region matching the pasted region 542 from such an original image 543, an arrangement is made wherein a region including a face determined as the most appropriate face is set to the pasted region 542', and an image within the region thereof is clipped from the original image 543.

The algorithm 3 is an algorithm wherein when determination is made that multiple faces are included in the original image 543, a region including a face having a high possibility as being the most appropriate face is clipped.

Figure 52:
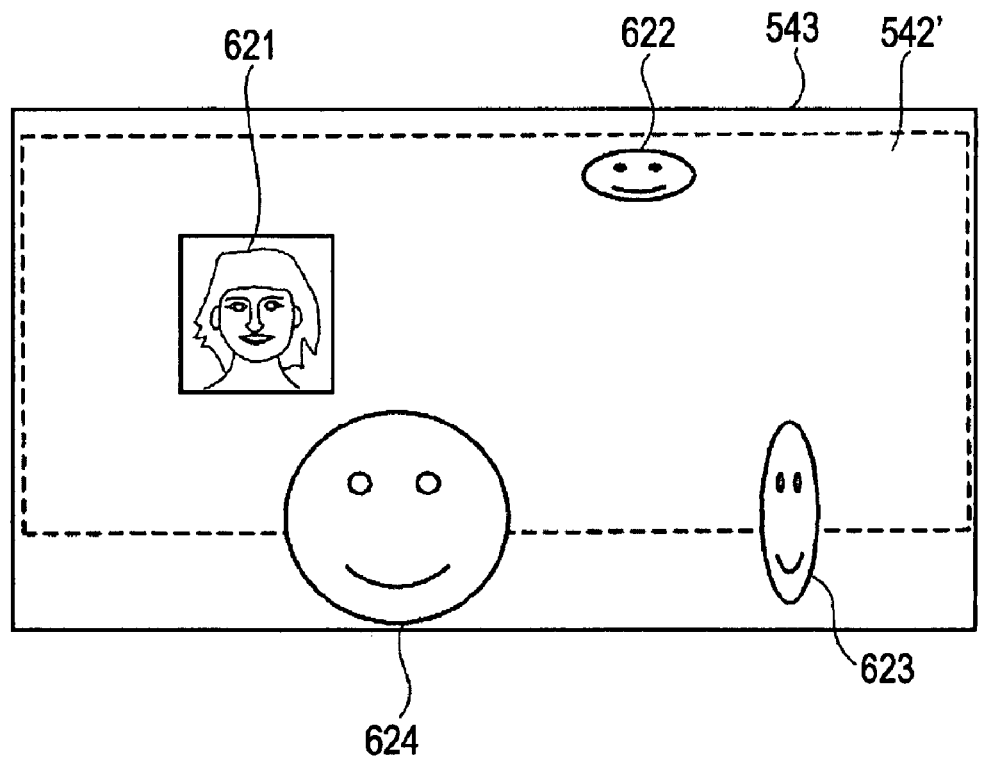
FIG. 52 is a diagram describing an algorithm relating to clipping of an image.

FIG. 52 is a diagram for making a description relating to an algorithm 4. Multiple faces are photographed on an original image 543 shown in FIG. 52. Of the faces photographed, a face 621 is, for example, a face drawn in a picture. A face 622, a face 623, and a face 624 are each actually taken photos.

For example, in the event that a photo was taken including a subject in front of a picture, the subject is of course photographed, and the picture is also photographed on the photo thereof. In the event that a face is drawn in the picture thereof, the face thereof is sometimes detected. As for a method arranged to detect a face from an image, while there is a description in later-described Documents, it is thought that detecting accuracy differs according to what kind of technique is employed. A face drawn in a picture or the like can be precisely extracted depending on the technique employed in some cases.

Thus, in the event that a face drawn in a picture or the like is extracted, a region including the face thereof may be clipped. In other words, a face drawn in a picture or the like is a face which is the most inappropriate face as compared an actually taken face.

The algorithm 4 is an algorithm wherein when determination is made that multiple faces are included on the original image 543, a region including a face having a low possibility as the most appropriate face is set as a pasted region 542', and an image within the pasted region 542' thereof is clipped from the original image 543.

The algorithm 4 is an algorithm which is contrary to the algorithm 3. When clipping is performed using the algorithm 3 alone, there is a possibility that an album is created such that the same person's face is consecutively displayed, but when clipping to which the algorithm 4 is applied as appropriate is performed, an album can be created such that a picture face is sandwiched between actually taken faces as suitable. Consequently, an album which is not a monotonous album can be provided to the user (an album which is rich in variety can be provided).

Figure 53:
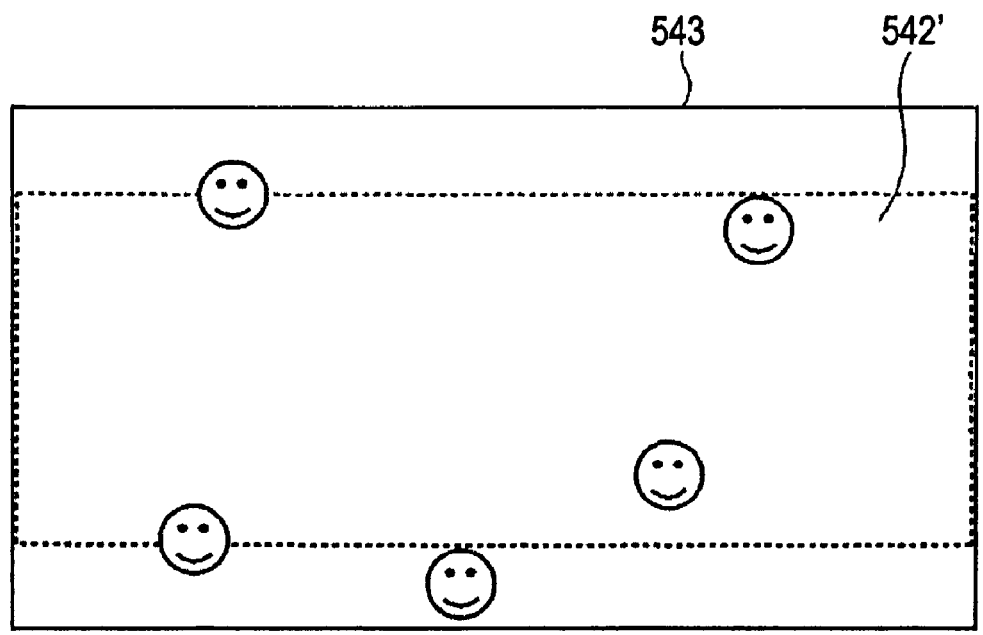
FIG. 53 is a diagram describing an algorithm relating to clipping of an image.

FIG. 53 is a diagram for making a description relating to an algorithm 5. Multiple faces are shown in an original image 543 shown in FIG. 53. The algorithm 5 is an algorithm wherein a pasted region 542' is set at random from the original image 543, thereby performing clipping.

For example, the algorithm 5 is applied to a case wherein multiple faces are detected, but it is difficult to perform processing using the algorithms 1 through 4.

Also, the algorithms 1 through 4 are processing arranged to reflect the intention of a photographer as much as possible, but in the case of applying the algorithm 5, there is a possibility that an image following the intention of a photographer will not be provided. However, for example, in the event that clipping of an image is performed in accordance with the algorithm 5, clipping of an image is performed based on the algorithm 5 each time an album is observed, and in the event of creating an album, even when the album to be created is an album handling the same still images, the image clipping method differs (clipping is executed at random), as if a different album were created, whereby the content of an album to be provided to the user can be changed for each observation.

Those who observe also have a liking, and some people feel that an album should always provide the same images, and desire that such an album be provided, but some people regard providing different images for each observation to be an interesting album. Accordingly, an arrangement may be made wherein the user who observes an album can make settings regarding whether or not the algorithm 5 is applied to the album.

Here, the algorithms 1 through 5 have been described as examples, but it should be noted that these algorithms 1 through 5 should not re interpreted restrictively regarding clipping of an image. It is needless to say that clipping may be performed with other algorithms besides than the algorithms 1 through 5. Further, the algorithms 1 through 5 may be algorithms to be employed individually, or may be algorithms to be employed in combination.

The algorithms 1 through 5 are algorithms relating to an arrangement wherein faces are detected, and determination is made how the detected faces are included in a clipped image. In order to apply such an algorithm, it is necessary to detect a region determined as a face from an image. As for a technique arranged to detect a region determined as a face from an image, for example, Japanese Patent Application No. 2004-93001 (Japanese Unexamined Patent Application Publication No. 2005-284348) or Japanese Patent Application No. 2004-94792 (Japanese Unexamined Patent Application Publication No. 2005-2844478), which have been previously filed by the present assignee, can be applied.

Depending on the technique applied, not only a region including a face, but also whether the face thereof is a male face or female face (sex) can be detected from an image, or whether the face thereof is a laughing face or angry face (expression) can be detected. Thus, in the event that not only a face, but also information accompanied with the features of a face such as sex, expression (feeling can be read from expression), and so forth can be detected, processing employing such accompanied information may be performed.

For example, in the event that information accompanied with a face to be detected is obtained, with an algorithm employing the accompanied information thereof as an algorithm 6, clipping of an image may be performed using the algorithm 6 thereof.

The algorithm 6 is an algorithm wherein when a face region is detected from an original image, and also when the information accompanied with the detected face is obtained, determination is made whether or not the face thereof is a face satisfying a specific face condition based on the accompanied information, and in the event that determination is made that the face thereof is a face satisfying a specific condition, clipping from the original image is performed such that the face thereof is disposed at the center of the image to be clipped.

The specific face condition is a condition to be determined from accompanied information, as described above, the expression of a face, the direction in which a face is facing, and sex, are examples of this condition.

For example, in the event that clipping of an image is performed based on the algorithm 6, when multiple faces are detected from an original image, of the detected multiple faces, a pasted region is set such that a laughing face is disposed at the center, and clipping is performed. Also, for example, in the event that a male face and a female face are detected from an original image, clipping is performed such that the two faces thereof are disposed at the center.

Thus, description will be made with reference to the flowchart shown in FIG. 54 regarding processing wherein an image matched to a pasted region is clipped from an original image employing the multiple algorithms, and the clipped image is pasted on the pasted region. The processing to be described with reference to the flowchart shown in FIG. 54 is the image pasting processing executed in step S15 shown in FIG. 3.

In step S111, facial recognition processing is performed. This facial recognition processing is processing arranged to detect faces included in an original image to be processed using a predetermined technique. As for this predetermined technique, the techniques described in the above-mentioned Documents can be employed, and now, the description thereof will be omitted. Also, even when a face can be detected with a technique other than the techniques described in the above-mentioned Documents, it is needless to say that the present invention can be applied thereto.

In step S111, upon a region where a face is photographed being detected from the original image to be processed, the processing proceeds to step S112. In step S112, of the detected face region, determination is made whether or not a face having a region equal to or greater than a predetermined size has been detected. This determination is determination to be performed to execute the above-mentioned algorithm 1.

In step S112, of the detected face region, in the event that determination is made that a face having a region equal to or greater than a predetermined size has been detected, the processing proceeds to step S113. In step S113, a region is set so as to include a face having a region equal to or greater than a predetermined size with the aspect ratio of a pasted region, and the image within the region thereof is clipped. In the event that multiple faces having a region equal to or greater than a predetermined size have been detected, a region is set so as to include a face having a region of the maximum size, and clipping of the image is performed.

Upon the image being clipped, in step S114 the clipped image is pasted on the pasted region of the placement template to be processed.

On the other hand, in the event that determination is made in step S112 that of the detected face region, a face having a region equal to or greater than a predetermined size has not been detected, the processing proceeds to step S115. In step S115, determination is made whether or not faces not less than a predetermined number have been detected. This determination is determination to be performed to execute the above-mentioned algorithm 2.

In the event that determination is made in step S115 that the number of detected faces is equal to or greater than a predetermined number, the processing proceeds to step S116. In step S116, a region is set such that the number of faces becomes the maximum with the aspect ratio of the pasted region, and clipping of the image is performed. Upon the image being clipped, in step S114 the clipped image is pasted on the pasted region of the placement template to be processed.

On the other hand, in the event that determination is made in step S115 that the number of detected faces is less than a predetermined number, the processing proceeds to step S117. In step S117, determination is made whether or not a face matching a specific condition has been detected. This determination is determination to be performed to execute the algorithm 6, in the event that the features of a face (accompanied information) can be obtained as well as detection of a face. Also, this determination is determination to be performed to execute the algorithm 3 or algorithm 4, in the event that the features of a face are not obtained.

In the event that the determination in step S117 is performed to execute the processing based on the algorithm 3 or algorithm 4, the specific condition is a condition determined as the most appropriate face, or a condition determined as the most inappropriate face.

In the event that the determination in step S117 is performed to execute the processing based on the algorithm 6, the specific condition is a condition arranged to determine the features of a face, such as a laughing face, a face facing the front, a male face, a female face, and so forth.

Upon the image being clipped, in step S114 the clipped image is pasted on the pasted region of the placement template to be processed.

On the other hand, in the event that determination is made in step S117 that a face matching the specific condition has not been detected, the processing proceeds to step S119. In the event that the processing proceeds to step S119, processing relating to clipping is executed based on the algorithm 5. That is to say, the image is clipped at random with the aspect ratio of the pasted region.

When the processing proceeds to step S119 is when faces are included in the original image, but it is difficult to determine whether or not the image is clipped while observing which face, so when the image is in such a state, for example, control is performed so as to clip a region including the center region of the original image.

Even in the event that the image is clipped at random, it is desirable to provide a predetermined condition, for example, a condition is set such that the image is clipped so as to include the center portion of the original image, or the image is clipped so as to include a region somewhat above the center of the original image, and clipping is performed based on the condition thereof.

Upon the image being clipped, in step S114 the clipped image is pasted on the pasted region of the placement template to be processed.

Such processing is repeated equivalent to the number of images to be disposed on the placement template, thereby creating one page making up an album. Examples of the created one page are the page 151 shown in FIG. 10, and the page 151' shown in FIG. 11.

Subsequently, creation for each page is repeated, thereby creating an album. An example of the created album is the album 181 shown in FIG. 12. The created album is recorded in the contents DB 34 (FIG. 2).

Observation of Created Album

Next, description will be added regarding observation of an album thus created.

Figure 55:
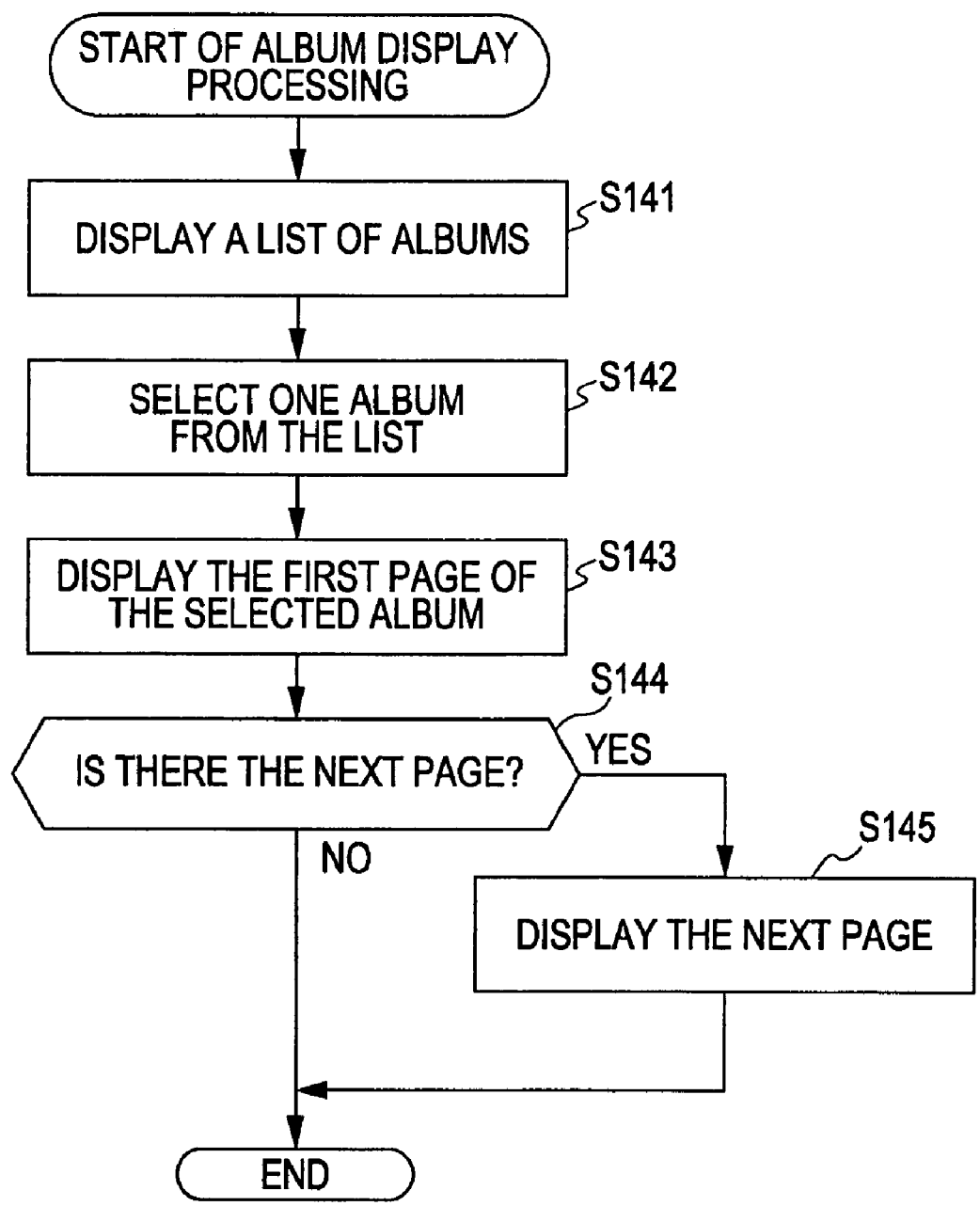
FIG. 55 is a flowchart describing album display processing.

FIG. 55 is a flowchart for describing display processing of albums.

In step S141, the recording/playback control unit 52 (FIG. 2) reads out information relating to the recorded albums from the recording/playback unit 18. The recording/playback control unit 52 supplies display data arranged to display a list of albums to the display control unit 53. The image processing apparatus 1 controls the monitor 2 to display the list of albums based on the control of the control unit 20.

Figure 56:
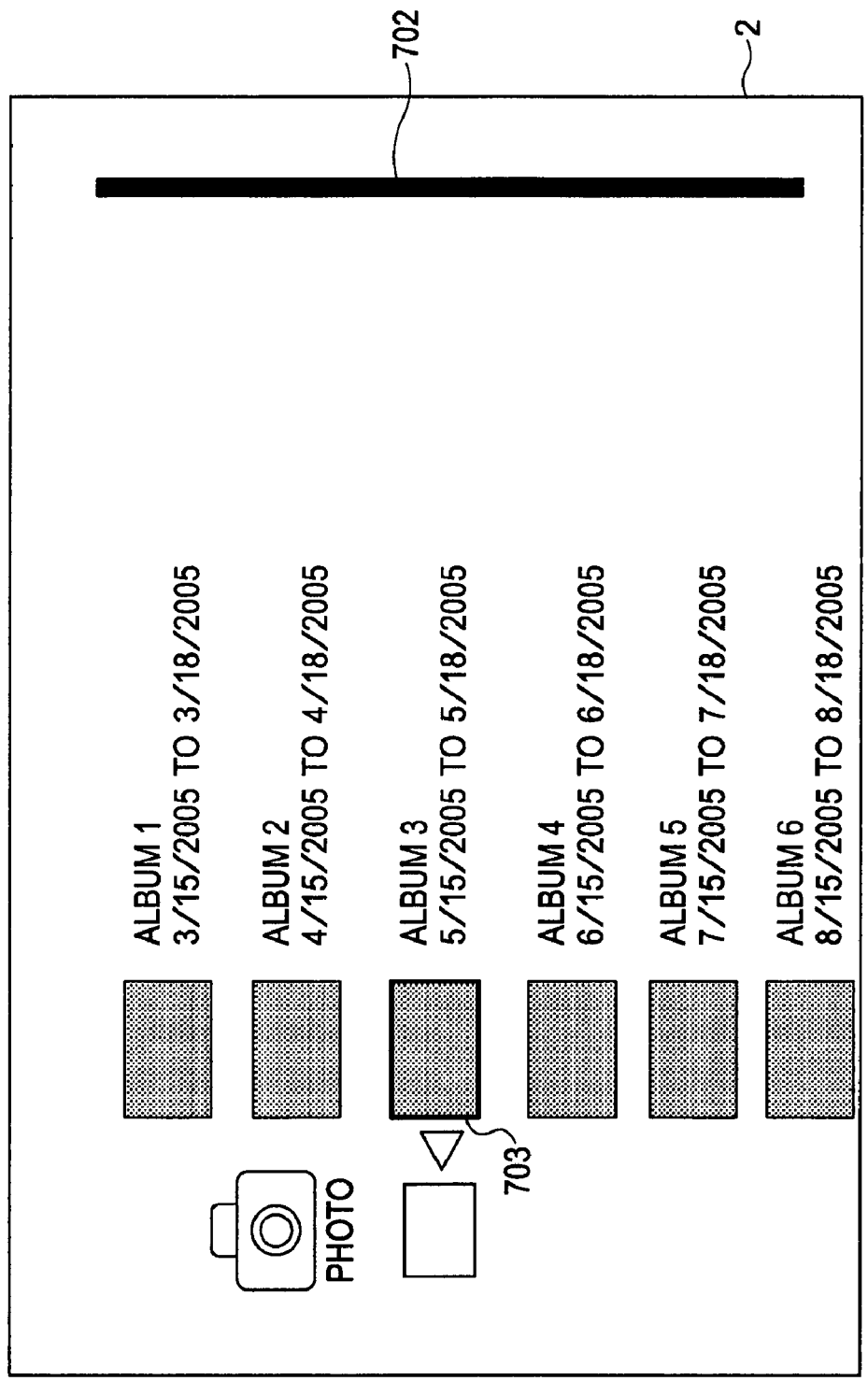
FIG. 56 is a diagram illustrating a screen example displayed on a monitor.

A display example of a list of albums to be displayed on the monitor 2 is shown in FIG. 56. The screen shown in FIG. 56 is provided with an album list display portion 701. On the album list display portion 701 an icon indicating each album, an album name at the right side of the icon thereof, and dates when images managed at the album thereof at the lower side of the album name are photographed are displayed.

On the album list display portion 701 of the screen shown in FIG. 56 six icons indicating albums 1 through 6, album names, and dates are displayed. Though the icons are indicated with a square in FIG. 56, for example, an image to become the cover of an album may be employed as an icon indicating each album.

In FIG. 56, for example, the dates when an album named "ALBUM 1" was photographed are displayed as "Mar. 15, 2005 TO Mar. 18, 2005". Thus, the dates displayed at the lower side of each album name are the date when the oldest photo of the album thereof was taken, and the date when the newest photo was taken.

A scroll bar 702 is displayed at the right side of the screen on the monitor 2, which is operated when displaying the icon of an album which overflows from the album list display portion 701. Further, a cursor 703 is displayed, which indicates which album is currently selected. With the example shown in FIG. 56, the cursor 703 is located on the icon of an album name named "ALBUM 3".

Such a screen is displayed on the monitor 2 in step S141.

In step S142, the selecting unit 51 supplies information indicating one album selected by the user from a list of albums to the recording/playback control unit 52 based on a signal indicating an operation of the user which selects one album from a list of albums displayed on the monitor 2, which is supplied from the operating unit 19.

For example, at the time of the screen state shown in FIG. 56, i.e., when the cursor 703 is located on the icon of "ALBUM 3", upon the user performing an operation instructing his/her determination, information for identifying the selected album is generated, and supplied to the recording/playback control unit 52.

In step S143, the recording/playback control unit 52 supplies display data to display the selected album to the display control unit 53 based on the supplied information indicating one album. The image processing apparatus 1 controls the monitor 2 to display the first page of the selected album based on the control of the control unit 20.

In step S144, the recording/playback control unit 52 determines whether or not there is the next page of the displayed album. In step S144, in the event that determination is made that there is no next page, the processing ends.

On the other hand, in the event that determination is made in step S144 that there is the next page, the processing proceeds to step S145. In step S145, the image processing apparatus 1 controls the monitor 2 to display the next page of the selected album based on the control of the control unit 20. The processing in steps S144 and S145 is repeated, whereby a page making up the album is sequentially provided to the user.

Thus, the image processing apparatus 1 can display an album.

Incidentally, display examples which are displayed as one page of an album are shown in FIGS. 10 and 11. With reference to FIG. 11 again, description has been made wherein the three images are displayed on the page 151', of these, the image 171 and the image 172 are still images read out from the still image DB 31 (FIG. 2), and the image 161 is a still image (thumbnail image) extracted from a moving image recorded in the moving image DB 32.

Thus, with the present embodiment, a thumbnail image, which is extracted from a moving image, representing one scene of the moving image thereof is also displayed as a still image on a page within an album. In order to perform such display, description has been made wherein at the time of clustering, clustering is performed in light of the photographed date of a moving image recorded in the moving image DB 32. One example as a result of clustering is shown in FIG. 35, but for example, the image photographed at 0:13 on March 1 of the group 1 is a moving image in some cases.

At the time of clustering, if clustering is performed with reference to the moving image DB 32 to include the photographed date of a moving image, as a result thereof an album to be provided to the user can include the thumbnail image of a moving image, which has been described above, so description thereof will be omitted here. Further, now, description will be added regarding processing when the user correlates the thumbnail image of a predetermined moving image with a predetermined album.

The user is allowed to correlate the thumbnail image of a desired moving image with a desired album for the sake of the following reasons.

As described above, at the time of clustering, if clustering is performed in light of the photographed date of a moving image, as a result thereof, the thumbnail image of the moving image can be displayed on a predetermined page, but according to clustering, only a moving image having a correlation with a still image (in this case, relationship of being located in the neighborhood in time) is displayed.

For example, with reference to FIG. 35 again, in the event that the image photographed at 0:13 on March 1 of the group 1 is a thumbnail image extracted from a moving image, this image is a moving image filmed by the neighborhood in time as to the still image photographed at 0:10 on March 1 and the still image photographed at 0:12 on March 1 within the group 1, so this image is classified into the group 1. However, for example, in the event that a moving image filmed on February 1 needs to be correlated with the group 1, or an album including the group 1, it is difficult to correlate between both using the above-mentioned clustering technique alone.

Figure 57:
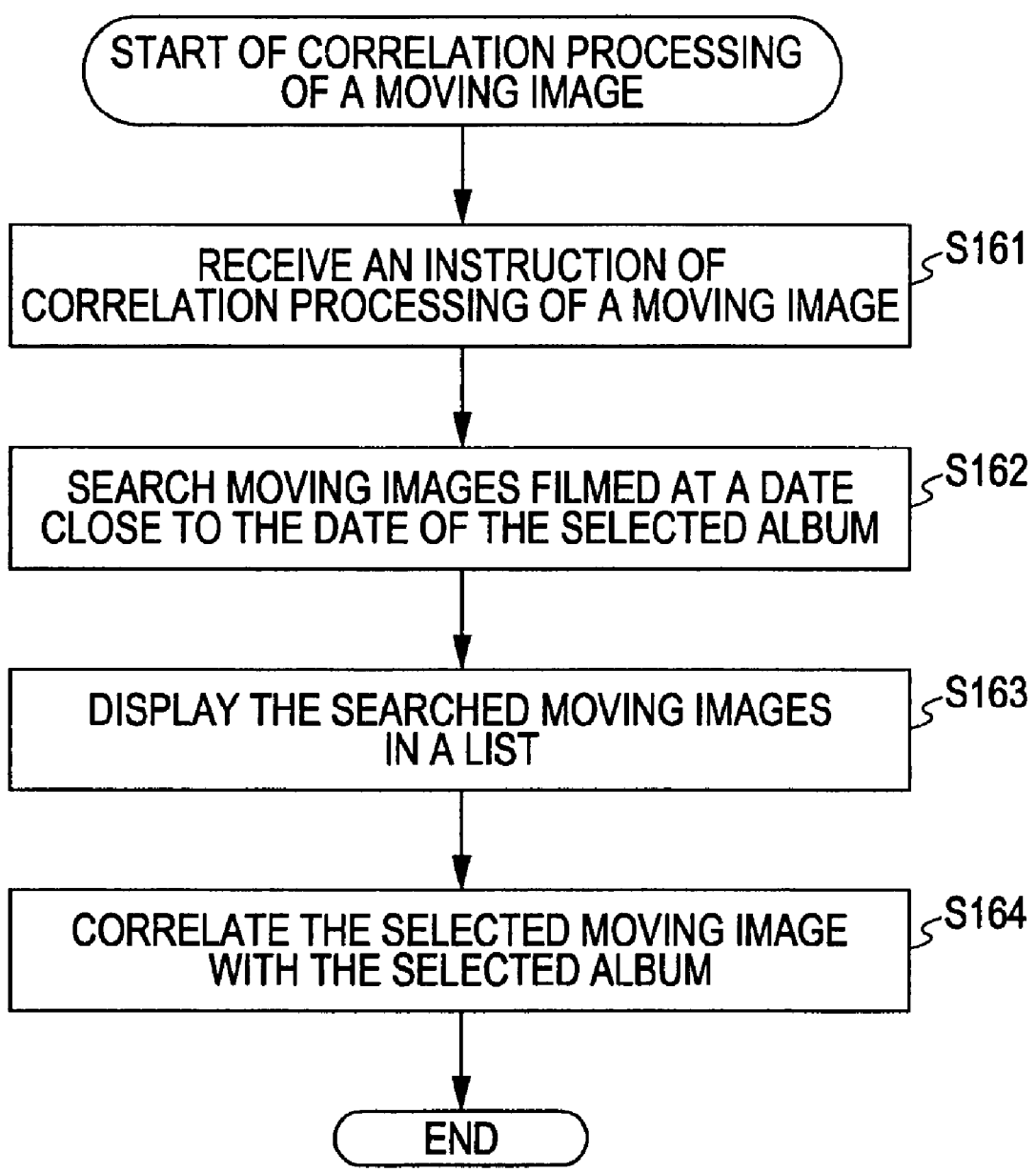
FIG. 57 is a flowchart describing correlation processing of a moving image.

Thus, even if images are separated in photographing date, in order to correspond to a request of the user side who wants to correlate the images with the same group (same album), the user is allowed to correlate the thumbnail image of a desired moving image with a desired album. Description will be made regarding such processing with reference to the flowchart shown in FIG. 57.

Figure 58:
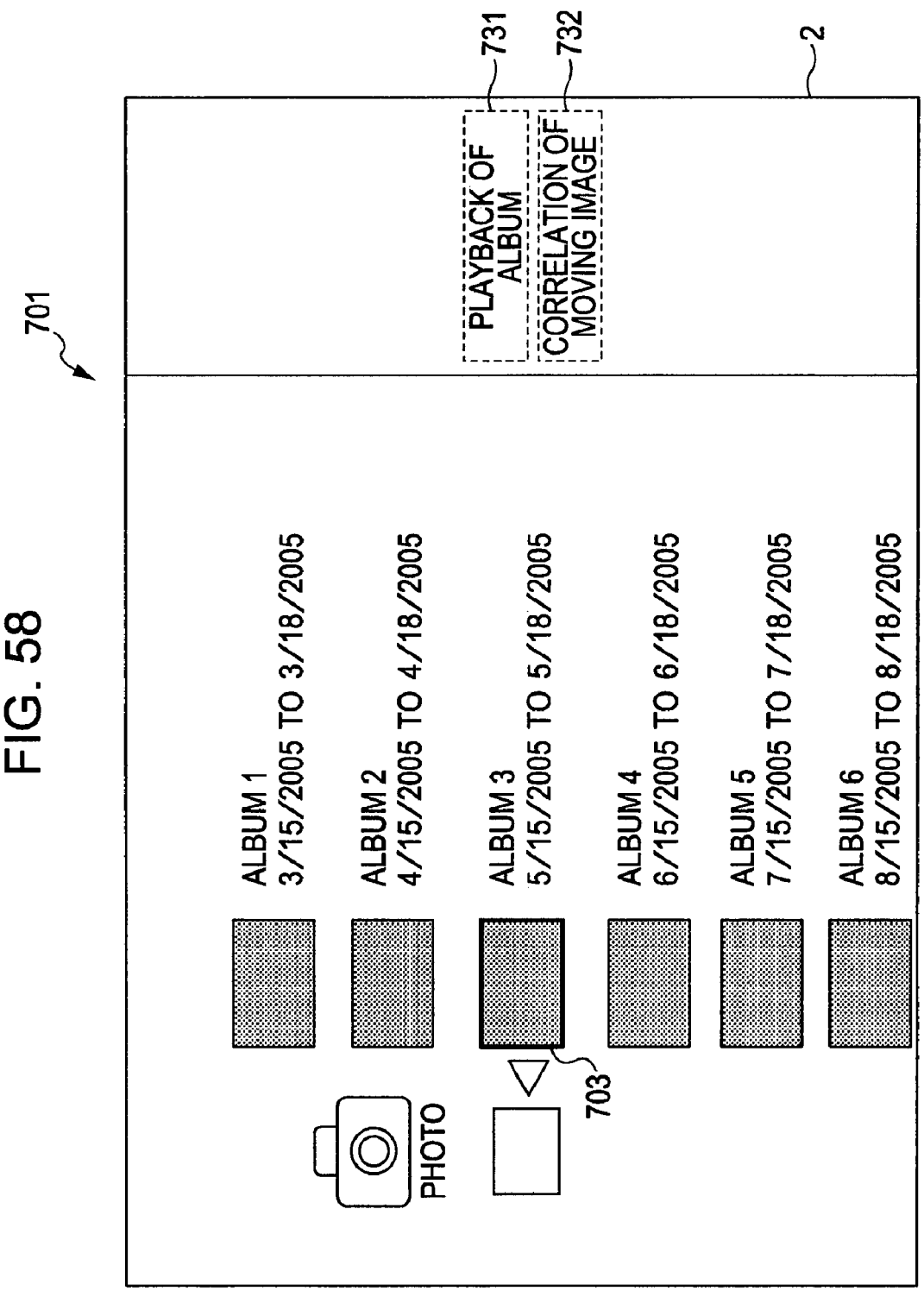
FIG. 58 is a diagram illustrating a screen example displayed on the monitor.

In step S161, an instruction is received from the user so as to execute correlation processing of a moving image. FIG. 58 illustrates a screen example to be displayed on the monitor 2 when the correlation of a moving image is instructed. The screen shown in FIG. 58 is a screen to be displayed on the monitor 2 when the user instructs display of a menu screen at the screen shown in FIG. 56.

The menu screen denotes a screen in a state in which two menu items shown at the right side in FIG. 58 are displayed. That is to say, with the screen shown in FIG. 58, an item 731 named "PLAYBACK OF ALBUM" and an item 732 named "CORRELATION OF MOVING IMAGE" are displayed as the menu items of the menu screen. Of such items, in the event that the item 732 named "CORRELATION OF MOVING IMAGE" is selected, determination is made in step S161 that an instruction is received from the user so as to execute the correlation processing of a moving image, and the processing proceeds to step S162.

Note that of the menu screen shown in FIG. 58, in the event that the item 731 named "PLAYBACK OF ALBUM" is selected, at the point thereof the playback of the selected album (with the screen example shown in FIG. 58, the album named "ALBUM 3" where the cursor 703 is located) is started. That is to say, the processing based on the flowchart shown in FIG. 55 is started.

In step S162, moving images photographed on a date close to the date of the selected album are searched. Let us say that the objects to be searched are moving images filmed by the user, which including no moving image of television broadcasting and so forth. In other words, only individual moving images are the objects to be searched. Regarding whether or not a moving image is an individual moving image (whether or not a moving image is a moving image including a copyright such as television broadcasting), determination can be made by referencing meta data accompanying a moving image.

Now, description will be continued, assuming that only individual moving images are objects to be searched, but note that it is possible to take moving images, such as television broadcasting, as objects to be searched.

For example, with the screen example shown in FIG. 58, in the event that the item 732 named "CORRELATION OF MOVING IMAGE" is selected, the selected album is the album having an album name named "ALBUM 3" where the cursor 703 is located. Accordingly, the dates of the album having an album name named "ALBUM 3" are "May 15, 2005 TO May 18, 2005", so moving images filmed on date close to these dates are searched from the moving image DB 32.

Figure 59:
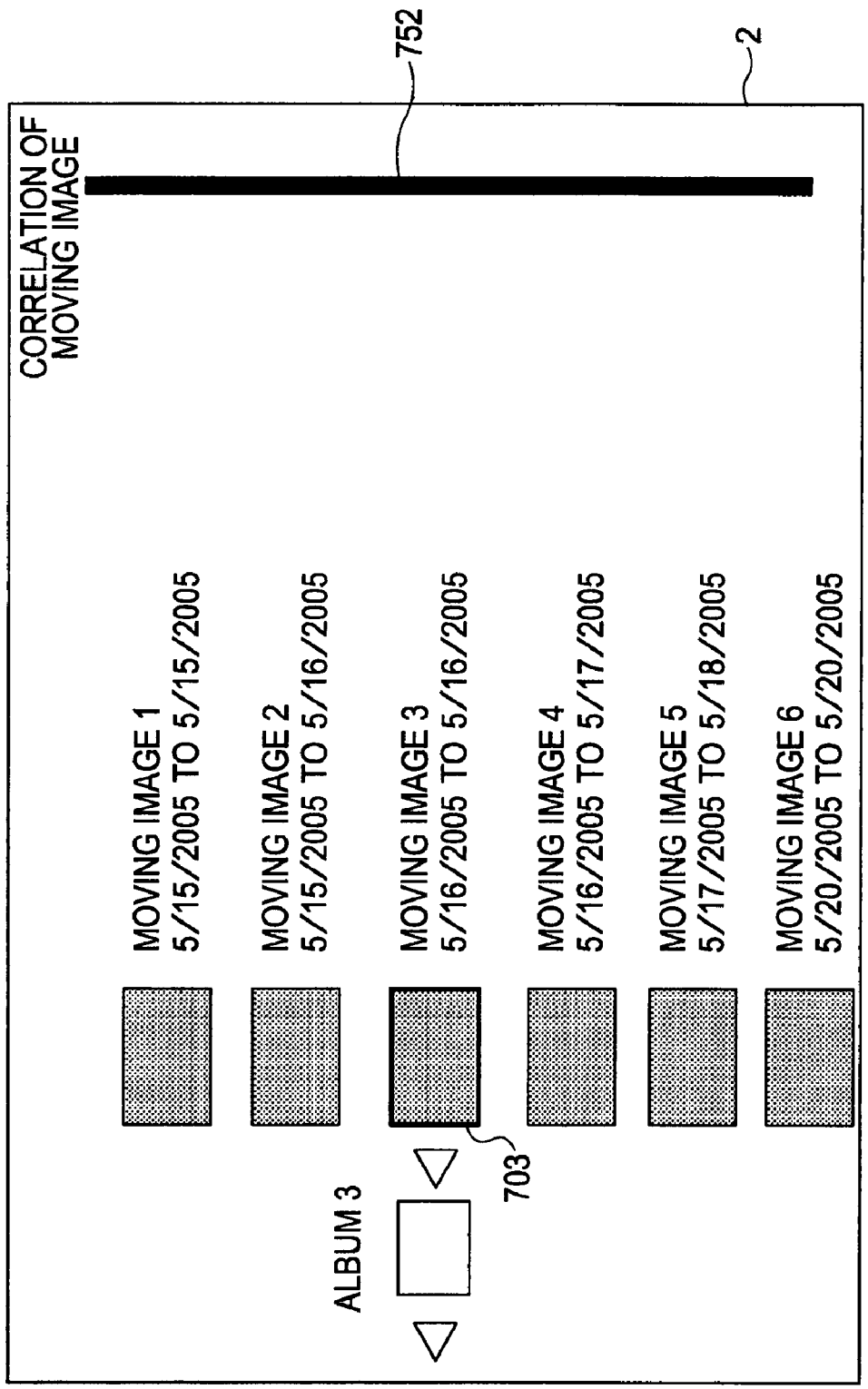
FIG. 59 is a diagram illustrating a screen example displayed on the monitor.

In step S163 (FIG. 57), a list of the searched moving images is displayed employing the search results. Consequently, a screen such as shown in FIG. 59 is displayed on the monitor 2. The screen shown in FIG. 59 is provided with a moving-image list display portion 751. On the moving-image list display portion 751, an icon indicating each moving image, a moving image name at the right side of the icon thereof, and dates when the moving image thereof was filmed (the date when filming was started and the date when filming was completed) at the lower side of the moving image name thereof are displayed.

Note that the reason why moving images filmed on date close to the dates of the selected album are searched in step S162 is that when the searched moving images are displayed in a list in step S163, the searched images are arranged to be displayed in the order of the searched moving images of which the dates are close to the photographed dates of images included in the selected album. This is because it is thought that there is a high possibility that the searched moving images of which the dates are close to the photographed dates of images included in the selected album are correlated with the album thereof.

When the moving images are displayed in a list, for example, in the event that the moving images are displayed in the old order or new order of filmed date, the search of the moving images in step S162 is performed such that display is performed in the setting order thereof.

On the moving-image list display portion 751 of the screen shown in FIG. 59 six icons each indicating moving images 1 through 6, moving image names, and dates are displayed. In FIG. 59, the icons are illustrated with squares, but for example, a thumbnail image showing one scene of a moving image may be employed as an icon indicating each moving image.

In FIG. 59, for example, the dates when a moving image named "MOVING IMAGE 3" was photographed are displayed as "May 16, 2005 TO May 16, 2005". Thus, the dates displayed at the lower side of each moving image name are the date when the moving image thereof was filmed, and the date when filming was completed.

A scroll bar 752, which is operated when displaying the icon and so forth of a moving image which cannot all be displayed within the moving-image list display portion 751, is displayed at the right side of the screen on the monitor 2. Further, a cursor 703 which indicates whether or not the moving image is in a selected state is also displayed. With the display example shown in FIG. 59, the cursor 703 is situated over an icon with a moving image name of "MOVING IMAGE 3".

Such a screen is displayed on the monitor 2 in step S163. Note that a screen configuration where a moving-image list is displayed, and a screen configuration where an album list is displayed are, as each shown in FIGS. 58 and 59, basically the same configuration.

Figure 60:
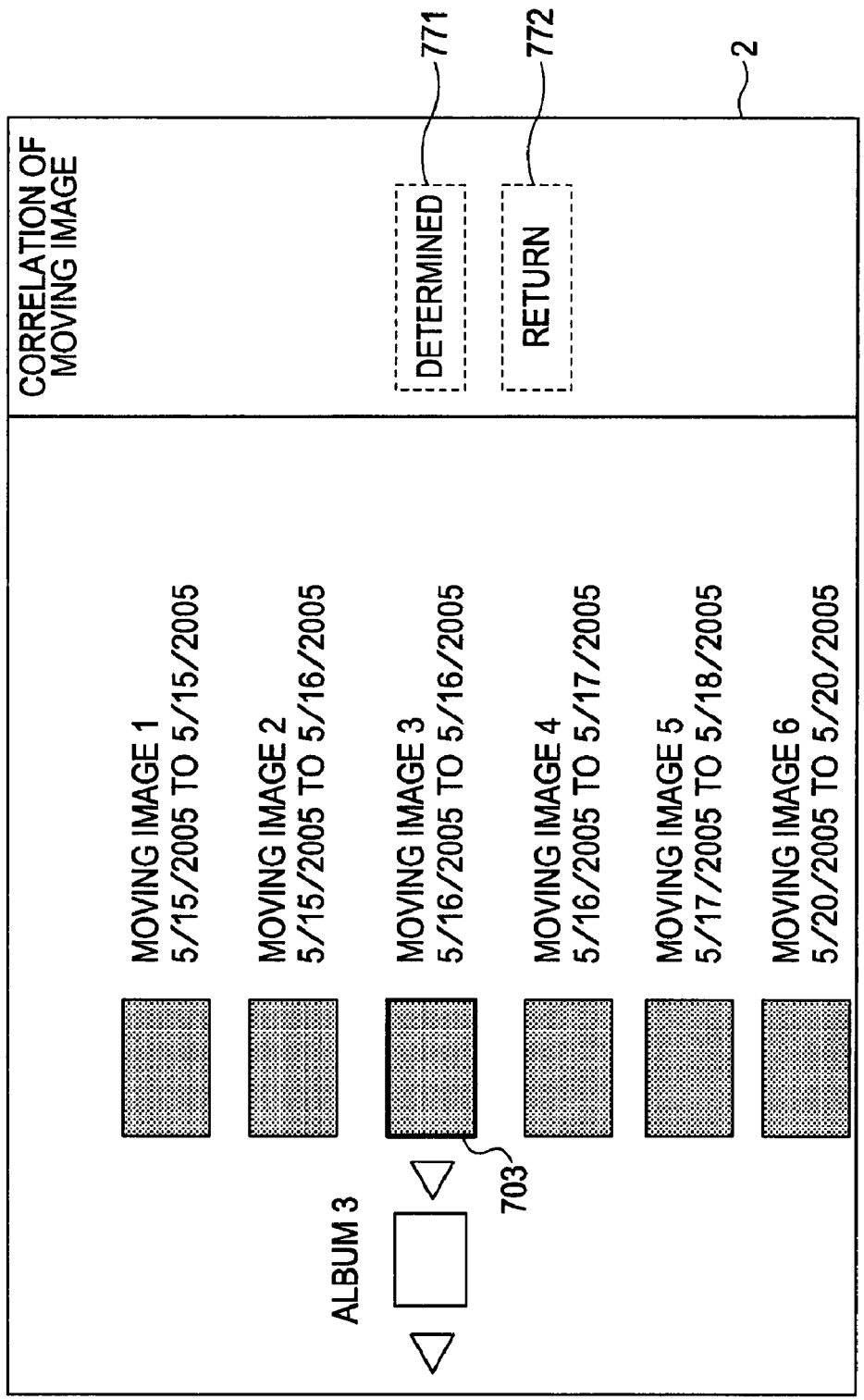
FIG. 60 is a diagram illustrating a screen example displayed on the monitor.

When the screen such as shown in FIG. 59 is displayed on the monitor 2, upon the user operating the operating unit 19 to perform a predetermined operation, the screen of the monitor 2 is switched into the menu screen shown in FIG. 60. On the screen shown in FIG. 60, at the right side of the monitor 2, two menu items are displayed. With the screen shown in FIG. 60, an item 771 named "DETERMINED" and an item 772 named "RETURN" are displayed as the menu items of the menu screen.

In the event that of such items the item 771 named "DETERMINED" is selected, determination is made that an instruction has been received in step S164 from the user, to correlate the selected moving image with the selected album, and the processing corresponding to the instruction thereof is executed.

In FIG. 60, the cursor 703 is located on the icon indicating the moving image named "MOVING IMAGE 3" as a moving image name. That is to say, the state of the screen shown in FIG. 60 is a state in which the moving image named "MOVING IMAGE 3" as a moving image name is selected by the user as an object to be correlated with the album. In order to allow the user to recognize the album to be correlated, an album name named "ALBUM 3" is displayed at the left side of the icon indicating "MOVING IMAGE 3", and also the icon indicating the album named "MOVING IMAGE 3" as an album name is displayed.

With the screen shown in FIG. 60, when the item 771 named "DETERMINED" is operated, in step S164 processing arranged to correlate "ALBUM 3" with "MOVING IMAGE 3" is executed, and when the item 772 named "RETURN" is operated, the screen of the monitor 2 is returned to the screen shown in FIG. 59 or FIG. 58, and the processing to be performed on these screens is executed, whereby an album and a moving image are correlated, and when the album is played, the thumbnail of the moving image is displayed on the played album.

Deletion of Moving Image

Incidentally, the data size of a moving image is great as compared with a still image. Therefore, in the event that the recording remaining capacity of the moving image DB 32 is not enough to record a new moving image, old moving image data is deleted, processing arranged to increase capacity is performed. Such processing is sometimes performed by an instruction of the user, or by the determination of the image processing apparatus 1.

Thus, a moving image recorded in the moving image DB 32 is sometimes deleted. It is needless to say that there is a possibility that a still image recorded in the still image DB 31 will be deleted, but the data size of a still image is small as compared with a moving image, so the possibility that a situation will occur wherein it is necessary to delete a still image due to insufficient capacity is small, and accordingly, it is thought that the probability that a still image will be deleted is low as compared with that of a moving image. Accordingly, description will now be continued, assuming that a moving image will be deleted.

As described above, a moving image is correlated with an album at the time of clustering or receiving an instruction of the user or the like, but in the event that the correlated moving image thereof is deleted unintentionally, an inconvenience occurs such that on the page where a still image extracted from the moving image is displayed, the still image is not displayed.

Figure 61:
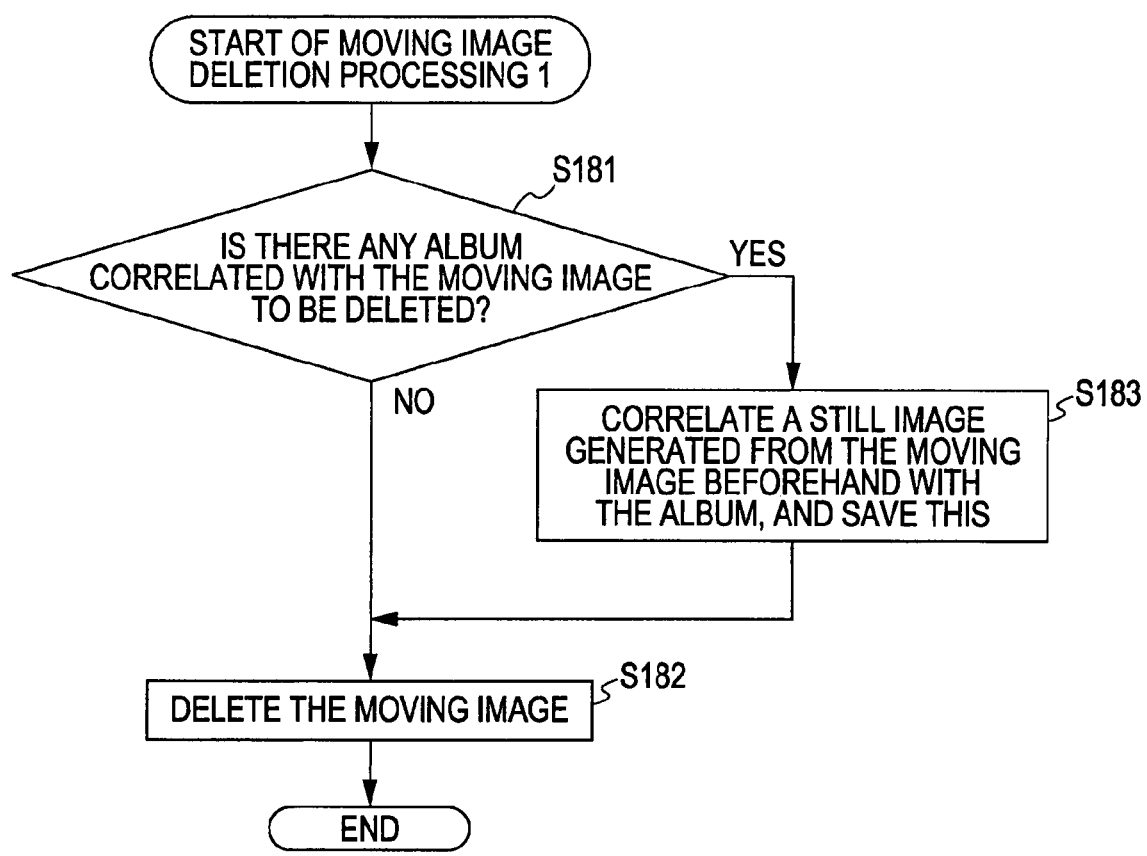
FIG. 61 is a flowchart describing processing relating to deletion of a moving image.

Now, description will be made regarding processing when a moving image is deleted with reference to the flowchart shown in FIG. 61. The processing of the flowchart shown in FIG. 61 is executed when a deletion instruction is issued as to a predetermined moving image of the moving images recorded in the moving image DB 32.

In step S181, determination is made whether or not there is an album correlated with the moving image selected as an object to be deleted by the user. In the event that determination is made in step S181 that there is no album correlated with the moving image to be deleted, the processing proceeds to step S182, where the moving image to be deleted is deleted from the moving image DB 32.

On the other hand, in the event that determination is made in step S181 that there is an album correlated with the moving image to be deleted, the processing proceeds to step S183. In step S183, a still image, which is generated from the moving image beforehand, correlated with the moving image, and recorded, is correlated with the album with which the moving image was correlated instead of the moving image, and saved.

As for a still image which is generated from the moving image beforehand, and correlated with the moving image, a thumbnail image indicating one scene of the moving image can be employed. Also, that such a thumbnail image is correlated with the album with which the moving image was correlated instead of the moving image, and saved, means that a thumbnail image is newly recorded in the still image DB 31. Also, when the thumbnail image is recorded in the still image DB 31, the filmed date (the date when filming was started, the date when filming was completed, or the intermediate date between the date when filming was started and the date when filming was completed) of the moving image is recorded as the date of the thumbnail image thereof.

In step S183, upon the still image being recorded in the still image DB 31, the processing proceeds to step S182, where the moving image to be deleted is deleted from the moving image DB 32.

Description will be added simply with reference to FIG. 62 again regarding the processing relating to deletion of a moving image described with reference to the flowchart shown in FIG. 61. A moving image 161' is recorded in the moving image DB 32, and a thumbnail image (still image 161) extracted from the moving image 161' thereof is correlated with the moving image 161', and recorded.

Figure 62:
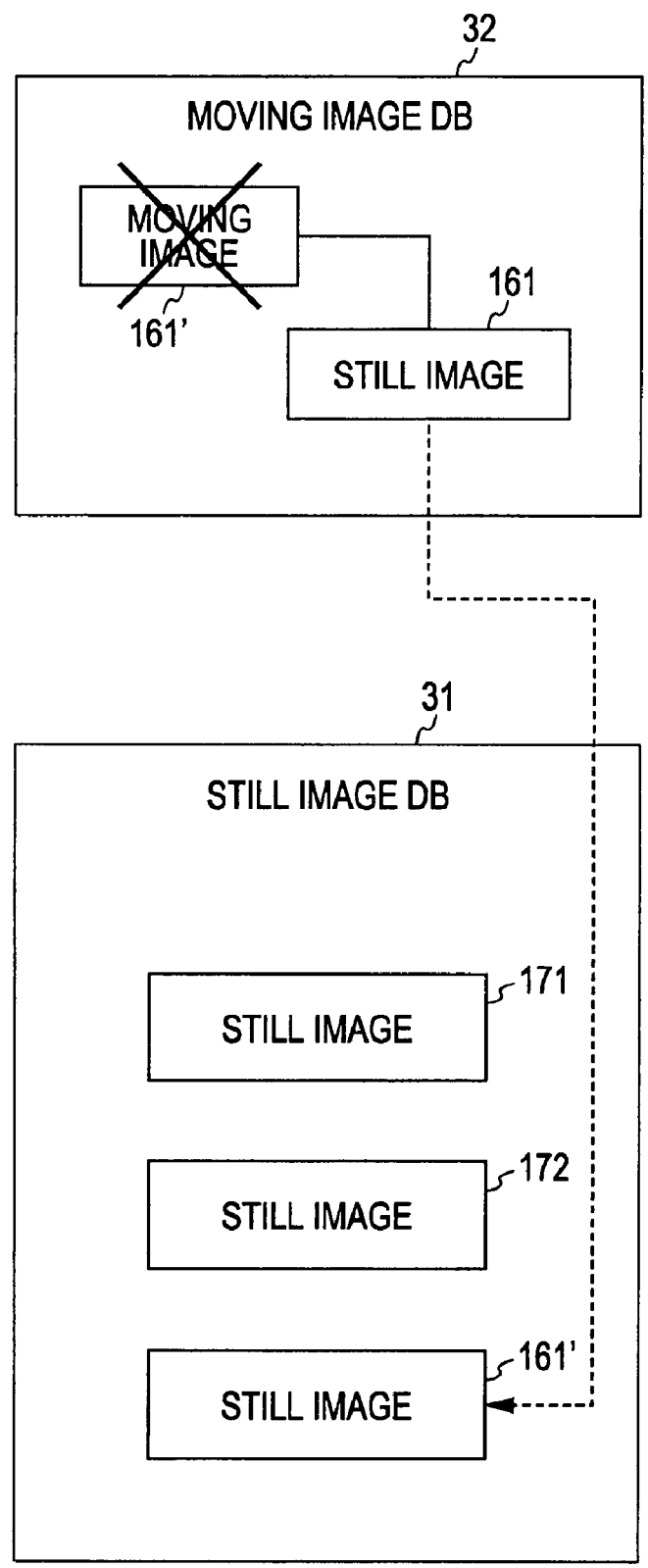
FIG. 62 is a diagram describing processing relating to deletion of a moving image.

Also, a still image 171 and a still image 172 are recorded in the still image DB 31. At the time of a state such as shown in FIG. 62 (at the time of a situation before the moving image 161' is deleted), the page 151' such as shown in FIG. 11 is provided to the user as one page of an album.

In the event that the moving image 161' recorded in the moving image DB 32 is selected as an object to be deleted, the still image 161 correlated with the moving image 161' is moved to the still image DB 31. Accordingly, the still image DB 31 is in a state in which the still image 171, still image 172, and still image 161' are recorded.

Thus, in the event that a still image extracted from a moving image is recorded in the still image DB 31, the thumbnail image thereof is handled equivalent to other still images, and displayed on an album.

With reference to FIG. 11 again, FIG. 11 illustrates a display example of a predetermined page within an album, but in the event that there is the thumbnail image (still image 161) extracted from the moving image on the page 151', the mark 162 named "Video" is displayed, which has been already described.

Even in the event that the moving image 161' which is the origin of the still image 161 is deleted, according to the above-mentioned processing being performed, the still image 161 itself is not deleted but recorded in the still image DB 31, so the still image 161 is displayed on the page 151' as well as the still image 171 and still image 172. However, the moving image 161' is deleted, so the page 151' where the mark 162 named "Video" is not displayed is provided to the user.

Figure 63:
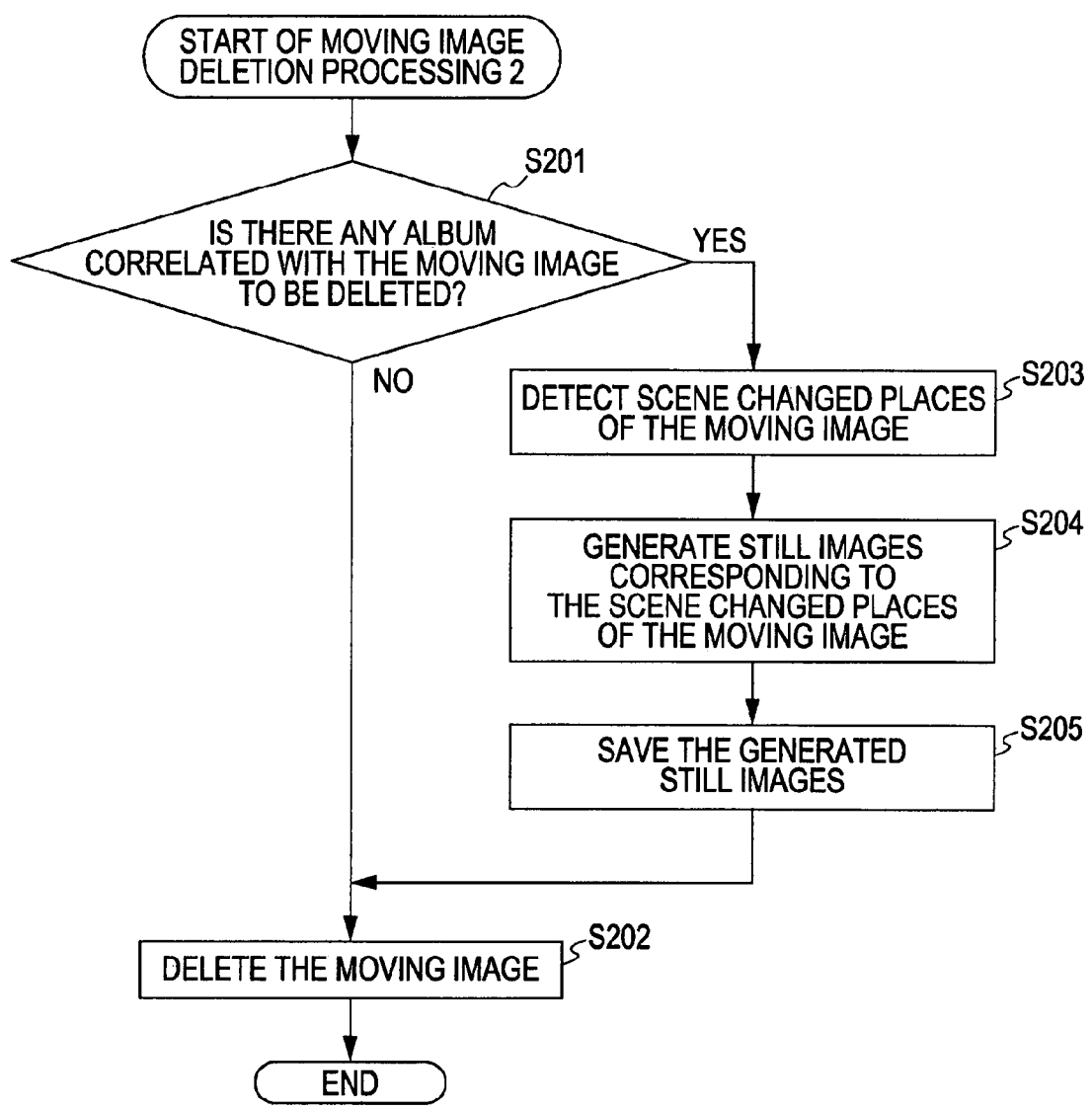
FIG. 63 is a flowchart describing processing relating to deletion of a moving image.

Description will be made regarding another processing relating to deletion of a moving image with reference to the flowchart shown in FIG. 63. The processing described with reference to FIG. 61 is processing wherein there is a still image correlated with a moving image beforehand, and the still image thereof is correlated with an album instead of the moving image, but the processing which will be described with reference to the flowchart shown in FIG. 63 is processing wherein when a moving image is deleted, a still image is generated from the moving image thereof, and is correlated with an album.

In step S201, determination is made whether or not there is an album correlated with a moving image which is selected as an object to be deleted by the user. In step S201, in the event that determination is made that there is no album correlated with a moving image which is selected as an object to be deleted, the processing proceeds to step S202, where the still image to be deleted is deleted from the moving image DB 32.

On the other hand, in the event that determination is made in step S201 that there is an album correlated with a moving image which is selected as an object to be deleted, the processing proceeds to step S203. In step S203, scene-change places of the moving image are detected. As for a technique arranged to detect scene-change places from a moving image, for example, Japanese Patent Application No. 2002-254562 (Japanese Patent No. 3731657), which have been previously filed by the present assignee, can be employed.

Upon scene-change places being detected from the moving image to be deleted in step S203, the still images corresponding to the detected scene-change places are generated in step S204. In this case, a still image is generated for each scene-change place, so consequently still images are generated by the same number as the number of scene-change places.

Note that if there are many scene-change places, the number of still images will also increase, so processing may be performed as appropriate such that the upper limit is set to the number of still images to be generated, and the generated still images are thinned out according to the setting thereof, or the like.

Also, an arrangement has been made here wherein the scene-change places of the moving image are detected, and still images are generated from the portions thereof, but an arrangement may be made wherein a still image is generated at an arbitrary portion specified by the user.

Further, when the number of generated still images is two or more, still images may be extracted from the generated still images by the same number as the number of moving images which were correlated with an album, and deleted (as a premise, multiple still images are extracted from one moving image, and these still images are correlated with an album).

Thus, the reason why an arrangement is made wherein a still image is generated from a moving image to be deleted, is that the data size of a still image is small as compared with a moving image, so even if a still image is recorded instead of a moving image, it is thought that this does not have a great influence on the remaining capacity of the database, and also there is demand from users desiring to observe the album in a form including the thumbnail images of the moving image even if a moving image is deleted, as long as the album correlated with the moving image thereof is not deleted.

A still image generated in step S204 is recorded in the still image DB 31 in step S205.

Thus, when a still image is generated from a moving image, and recorded in the still image DB 31, in step S202 a moving image to be deleted is deleted from the moving image DB 32.

Thus, when a still image is generated from a moving image, and recorded in the still image DB 31, the still image thereof is handled equivalent to the other still images recorded in the still image DB 31. Accordingly, when the album is played, playback of the album is performed, which includes the still image generated from the moving image.

Note that in the event that multiple still images are generated, the generated multiple still images are all included in the album, it is difficult to simply paste the generated multiple still images on the portion where one thumbnail image of the moving image is displayed, so processing is performed as appropriate such that the album including the multiple still images is generated through reediting, or the like.

File Management

Incidentally, with the above-mentioned embodiment, as shown in FIG. 2, an arrangement has been made wherein the still image DB 31 and the moving image DB 32 are provided separately, and still images and moving images are managed separately by each of the databases. Also, an arrangement has been made wherein when still images and moving images are managed by each of the databases, upon a moving image being deleted, the processing of the flowcharts shown in FIGS. 61 and 63 is executed.

That is to say, still images and moving images are managed by each of the databases separately, so when a predetermined moving image is deleted from the moving image DB 32, processing is performed wherein a still image extracted from the moving image to be deleted is newly recorded in the still image DB 31.

It is needless to say that the present invention can be applied to only when still images and moving images are managed by different databases, but also even when still images and moving images are managed with the same database or the same folder.

Figure 64:
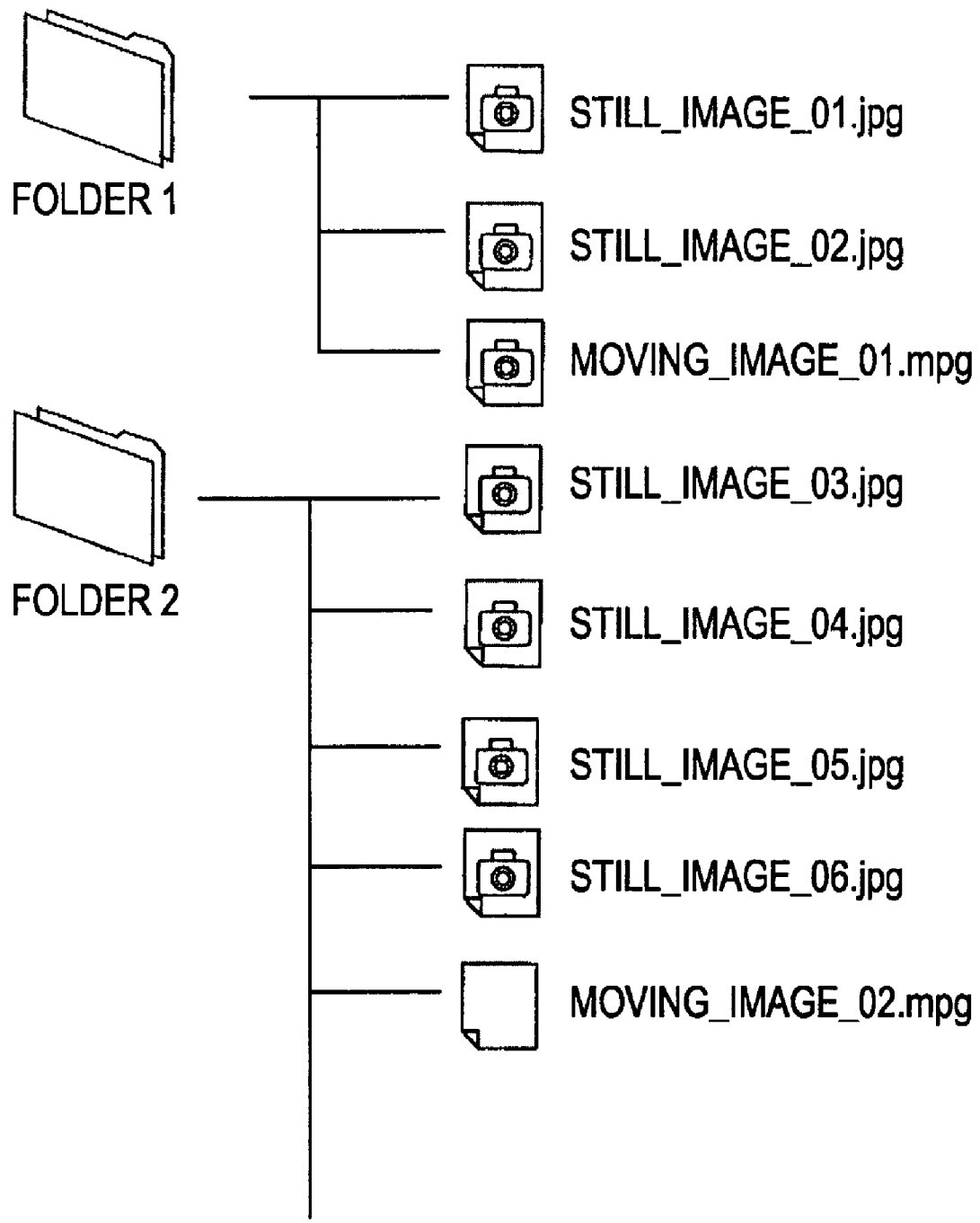
FIG. 64 is a diagram describing management of images within a folder.

In the event that still images and moving images are managed with the same folder, for example, a data configuration such as shown in FIG. 64 can be employed. That is to say, with the folder configuration shown in FIG. 64, a folder 1 and a folder 2 are provided as folders. The folder 1 manages "still_image_01.jpg", "still_image_02.jpg", and "moving_image_01.mpg", and the folder 2 manages "still_image_03.jpg", "still_image_04.jpg", "still_image_05.jpg", "still_image_06.jpg", and "moving_image_02.mpg".

Thus, with the configuration examples of folders shown in FIG. 64, the folder 1 manages the two still images, and the one moving image, and the folder 2 manages the four still images, and the one moving image. Thus, still images and moving images may be managed within one folder. In other words, still images and moving images are not managed with different folders or databases, but still images and moving images may be managed with the same folder or database.

Figure 65:
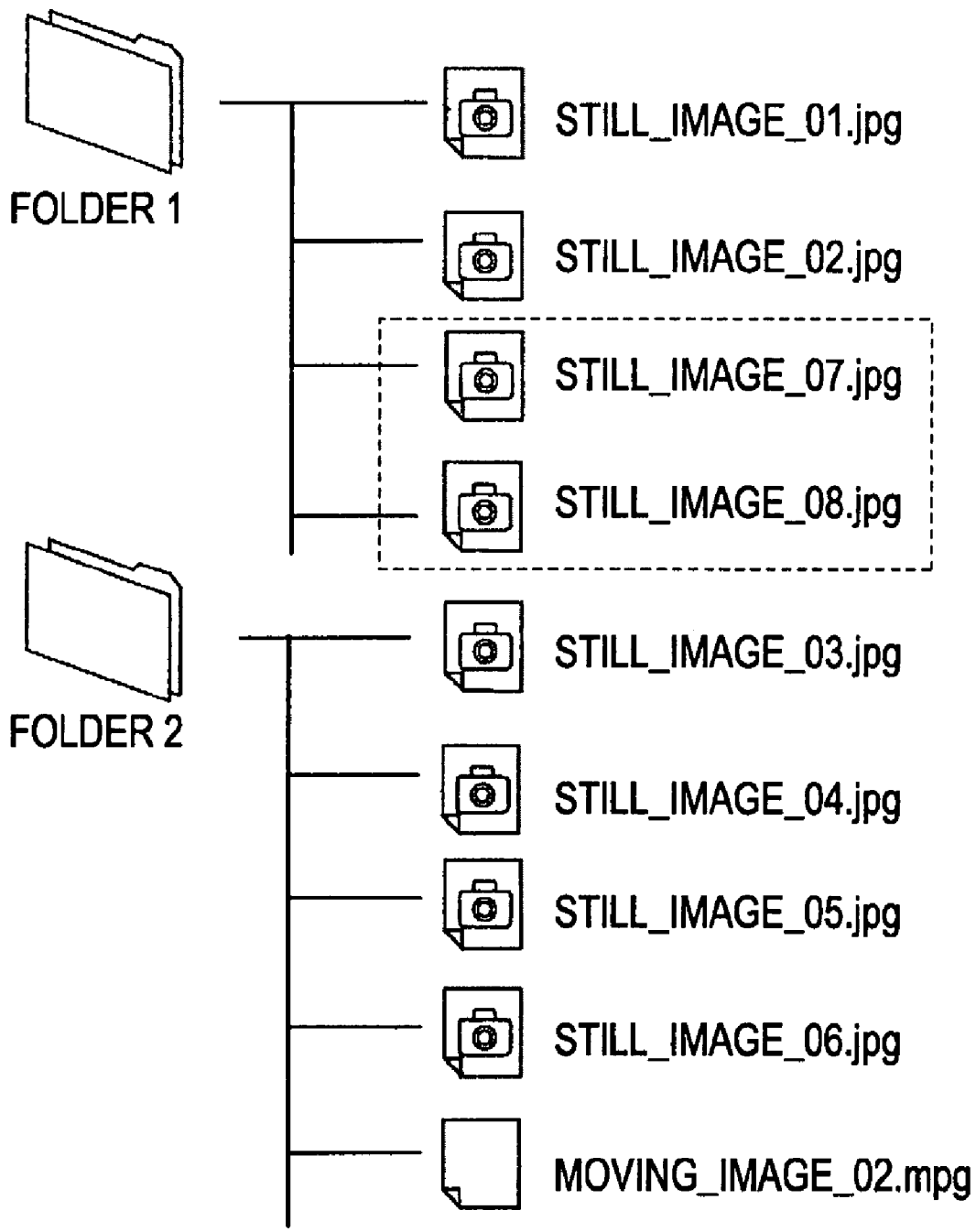
FIG. 65 is a diagram describing management of images within a folder.

When employing the folder configuration shown in FIG. 64, in the event that "moving_image_01.mpg" managed in the folder 1 is selected as an object to be deleted, as shown in above, for example, still images are generated for each scene-change place of "moving_image_01.mpg", after "moving_image_01.mpg" is deleted, the folder configuration is changed to the folder configuration such as shown in FIG. 65.

When "moving_image_01.mpg" is deleted, upon "still_image_07.jpg" and "still_image_08.jpg" being generated from "moving_image_01.mpg", as shown in FIG. 65, "still_image_07.jpg" and "still_image_08.jpg" are recorded in the folder 1 instead of "moving_image_01.mpg".

Thus, in the event that still images and moving images are managed within one folder, instead of a deleted moving image, still images extracted from the deleted moving image are recorded.

Description will be made with reference to the flowchart shown in FIG. 66 regarding processing relating to deletion of a moving image when still images and moving images are thus managed within one folder.

In step S221, determination is made whether or not there is a folder correlated with a moving image which was selected as an object to be deleted by the user. In the event that determination is made in step S221 that there is no folder correlated with a moving image which was selected as an object to be deleted, the processing proceeds to step S222, where the moving image is deleted.

On the other hand, in the event that determination is made in step S221 that there is a folder correlated with a moving image which was selected as an object to be deleted, the processing proceeds to step S223. In step S223, the scene-change places of the moving image are extracted. Subsequently, in step S224, the still images corresponding to the detected scene-change places are generated. In step S225, the generated still images instead of the moving image to be selected as an object to be deleted are recorded in the folder managing the moving image thereof.

Thus, upon the still images being generated from the moving image, and recorded within the folder, in step S222 the moving image selected as an object to be deleted is deleted.

Thus, with the present embodiment, in the event that there is an album or folder correlated with a moving image, when the moving image thereof is deleted, still images are generated from the moving image thereof. Subsequently, instead of the moving image to be deleted, the generated still images are recorded.

Note that even in the event that the still image DB 31 and moving image DB 32 such as shown in FIG. 2 are each provided, and still images and moving images are each managed with the different databases, as described above (e.g., as described with reference to the flowchart shown in FIG. 3), an album is created with images recorded in one folder as objects to be processed. Accordingly, even in the event that moving images and still images are managed within a folder, an album can be created with the same processing as that in the above-mentioned embodiment.

For example, with the file configuration such as shown in FIG. 64, when "FOLDER1" is selected as an album to be created, the album including still images to be extracted from "moving_image_01.mpg" is created in the same way as the above-mentioned embodiment. However, in this case, moving images and still images are managed within one folder, so processing such as reading out the filmed date of a moving image with reference to the moving image DB 32 (processing equivalent thereto) can be omitted, the filmed date of a moving image can be obtained only by reading out the filmed date of the image recorded in the folder.

Also, even after "moving_image_01.mpg" is deleted, as shown in FIG. 64, "still_image_07.jpg" and "still_image_08.jpg" extracted from "moving image_01.mpg" are recorded in the folder 1, so an album including these still images is created in the same way as the above-mentioned embodiment.

That is to say, with the present invention, even in the event that moving images and still images coexist within a folder, an album can be created with basically the same processing as the above-mentioned processing.

Thus, when relatively large capacity data (with the above-mentioned example, moving image data) is deleted, this data is transformed into relatively small capacity data (with the above-mentioned example, still image data), and this small capacity data is employed instead of the large capacity data thereof, whereby such as the case of the above-mentioned album example, data once created can be effectively used, data once provided to the user can be provided again in a form close to a state of being provided previously even though the content of the data has been modified.

Also, the example of an album has been shown here, and also description has been made regarding the case of moving images and still images as an example, but such an arrangement wherein when relatively large capacity data is deleted, the large capacity data is transformed into relatively small capacity data, and this small capacity data is employed instead of the large capacity data thereof, can be applied without being restricted to the above example such as an album, moving images, still images, and so forth.

Also, with the above-mentioned embodiment, the image processing apparatus 1 has been described as an example. For example, the file configuration such as shown in FIG. 64 is, for example, the same as a file configuration when data is managed with a personal computer. That is to say, with a personal computer and the like, different types of data are managed with one folder in some cases.

Upon such a situation being taken into consideration, the processing described with reference to FIGS. 64 through 66, i.e., the processing wherein when relatively large capacity data is deleted, the large capacity data is transformed into relatively small capacity data, and this small capacity data is employed instead of the large capacity data thereof, is processing applicable not only to the image processing apparatus 1 but also a personal computer and so forth.

Recording Medium

FIG. 67 is a block diagram illustrating a configuration example of a personal computer which executes the above-mentioned series of processing using a program. A CPU (Central Processing Unit) 1001 executes various types of processing in accordance with a program stored in ROM (Read Only Memory) 1002 or a storage unit 1008. A program executed by the CPU 1001, data, and so forth are stored in RAM (Random Access Memory) 1003 as necessary. The CPU 1001, ROM 1002, and RAM 1003 are connected mutually via a bus 1004.

Note that as for the CPU 1001, the Cell described in "Birth of the Cell", the Nikkei Electronics, Nikkei BP, Feb. 28, 2005, pp 89 through 117 can be employed.

The CPU 1001 is also connected with an input/output interface 1005 via the bus 1004. The input/output interface 1005 is connected with an input unit 1006 made up of a keyboard, a mouse, a microphone, and so forth, and an output unit 1007 made up of a display, speakers, and so forth. The CPU 1001 executes various types of processing in response to an instruction input from the input unit 1006. Subsequently, the CPU 1001 outputs the processing results to the output unit 1007.

The storage unit 1008 connected to the input/output interface 1005 is, for example, made up of a hard disk, and stores a program executed by the CPU 1001, and various types of data. A communication unit 1009 communicates with an external apparatus via a network such as the Internet, a local area network, or the like.

Also, an arrangement may be made wherein a program is obtained via the communication unit 1009, and stored in the storage unit 1008.

A drive 1010 connected to the input/output interface 1005, when a removable medium 1011 such as a magnetic disk, optical disc, magneto-optical disc, or semiconductor memory is mounted, drives the mounted medium 1011, and obtains a program, data, and so forth recorded therein. The obtained program and data are transferred to the storage unit 1008 as necessary.

The above-mentioned series of processing can be executed by hardware, and also can be executed by software. In the event that the series of processing is executed by software, a program making up the software thereof is installed from a program storing medium in a computer built in dedicated hardware, or a general-purpose personal computer capable of executing various types of functions by installing various types of programs, or the like.

A program storing medium configured to store a program which is installed in a computer, and is changed into an executable state by the computer, as shown in FIG. 67, is made up of the removable medium 1011 which is a package medium made up of a magnetic disk (including a flexible disk), an optical disc (including CD-ROM (Compact Disc-Read Only Memory) and DVD (Digital Versatile Disc)), a magneto-optical disc (including MD (Mini-Disc)), or semiconductor memory, or the ROM 1002 in which a program is temporarily or permanently stored, a hard disk making up the storage unit 1008, or the like. Storing a program in a program storing medium is performed via the communication unit 1009 which is an interface such as a router, modem, or the like using a cable or wireless communication medium such as a local area network, the Internet, digital satellite broadcasting, or the like.

Note that with the present Specification, steps describing a program to be stored in a program storing medium include not only processing to be performed in the described time sequence as a matter or course, but also processing to be executed in parallel or individually even if not necessarily processed in time-sequence.

Also, with the present Specification, the term "system" represents the entirety of devices made up of multiple devices.

Note that embodiments of the present invention are not restricted to the above-mentioned embodiments, and various modifications can be made without departing from the spirit and scope of the present invention.

What is claimed is:

1. An image processing apparatus comprising:
a detection processing unit configured to detect a face region from a first image;
a determination processing unit configured to determine a size of the detected face region; and
a clipping processing unit configured to:
use the determination processing unit to determine whether any face region detected by the detection processing unit from the first image has a size equal to or greater than a selected threshold size;
if it is determined that multiple face regions detected by the detection processing unit from the first image have sizes equal to or greater than the selected threshold size, identify a greatest face region from the multiple face regions detected by the detection processing unit from the first image and clip, from the first image, a second image with a selected aspect ratio so as to include the greatest face region;
if it is determined that no face region detected by the detection processing unit from the first image has a size equal to or greater than the selected threshold size, determine whether more than a selected threshold number of face regions were detected by the detection processing unit from the first image;
if it is determined that more than the selected threshold number of face regions were detected by the detection processing unit from the first image, clip, from the first image, the second image with the selected aspect ratio so as to include as many faces as possible;
a management processing unit configured to manage a template for setting placement of one or more images on a page of a plurality of pages in an album, wherein managing the template comprises determining a placement of the second image on the template; and
a synthesis processing unit configured to synthesize the second image clipped from said first image with said template.

2. The image processing apparatus according to claim 1, wherein said clipping processing unit clips said second image with said selected aspect ratio so as to include said first image to a maximum.

3. The image processing apparatus of claim 1, wherein the clipping processing unit is further configured to:
if it is determined that no more than the selected threshold number of face regions were detected by the detection processing unit, determine whether any face region detected by the detection processing unit from the first image satisfies at least one specific condition; and
if it is determined that at least one face region detected by the detection processing unit from the first image satisfies the at least one specific condition, clip, from the first image, the second image with the selected aspect ratio so as to include a face region satisfying the at least one specific condition.

4. The image processing apparatus of claim 3, wherein the at least one specific condition is selected from a group consisting of: facial expression, direction, and sex.

5. The image processing apparatus of claim 3, wherein the clipping processing unit is further configured to:
if it is determined that no face region detected by the detection processing unit from the first image satisfies the at least one specific condition, clip at random, from the first image, the second image with the selected aspect ratio.

6. At least one computer-readable storage medium having stored thereon computer executable instructions that, when executed, perform a method comprising:

detecting a face region from a first image;
 determining a size of the detected face region;
 determining whether any face region detected from the first image has a size equal to or greater than a selected threshold size;
 if it is determined that multiple face regions detected from the first image have sizes equal to or greater than the selected threshold size, identifying a greatest face region from the multiple face regions detected from the first image;
 clipping, from the first image, a second image with a selected aspect ratio so as to include the greatest face region;
 if it is determined that no face region detected from the first image has a size equal to or greater than the selected threshold size, determining whether more than a selected threshold number of face regions were detected from the first image;
 if it is determined that more than the selected threshold number of face regions were detected from the first image, clipping, from the first image, the second image with the selected aspect ratio so as to include as many faces as possible;
 managing a template for setting placement of one or more images on a page of a plurality of pages in an album, wherein managing the template comprises determining a placement of the second image on the template; and
 synthesizing the second image clipped from said first image with said template.

7. An image processing method comprising:

detecting a face region from a first image;
 determining a size of the detected face region;
 determining whether any face region detected from the first image has a size equal to or greater than a selected threshold size;
 if it is determined that multiple face regions detected from the first image have sizes equal to or greater than the selected threshold size, identifying a greatest face region from the multiple face regions detected from the first image;
 clipping, from the first image, a second image with a selected aspect ratio so as to include the greatest face region;
 if it is determined that no face region detected from the first image has a size equal to or greater than the selected threshold size, determining whether more than a selected threshold number of face regions were detected from the first image;
 if it is determined that more than the selected threshold number of face regions were detected from the first image, clipping, from the first image, the second image with the selected aspect ratio so as to include as many faces as possible;
 managing a template for setting placement of one or more images on a page of a plurality of pages in an album, wherein managing the template comprises determining a placement of the second image on the template; and
 synthesizing the second image clipped from said first image with said template.

8. The image processing method according to claim 7, wherein the second image is clipped with said selected aspect ratio so as to include said first image to a maximum in said act of clipping.

* * * * *